(12) United States Patent
Nurvitadhi et al.

(10) Patent No.: US 12,014,265 B2
(45) Date of Patent: Jun. 18, 2024

(54) MACHINE LEARNING SPARSE COMPUTATION MECHANISM FOR ARBITRARY NEURAL NETWORKS, ARITHMETIC COMPUTE MICROARCHITECTURE, AND SPARSITY FOR TRAINING MECHANISM

(71) Applicant: Intel Corporation, Santa Clara, CA (US)

(72) Inventors: Eriko Nurvitadhi, Hillsboro, OR (US); Amit Bleiweiss, Yad Binyamin (IL); Deborah Marr, Portland, OR (US); Eugene Wang, Pittsburgh, PA (US); Saritha Dwarakapuram, Sunnyvale, CA (US); Sabareesh Ganapathy, Santa Clara, CA (US)

(73) Assignee: Intel Corporation

( * ) Notice: Subject to any disclaimer, the term of this patent is extended or adjusted under 35 U.S.C. 154(b) by 0 days.

(21) Appl. No.: 18/302,889

(22) Filed: Apr. 19, 2023

(65) Prior Publication Data

US 2023/0316058 A1  Oct. 5, 2023

Related U.S. Application Data

(63) Continuation of application No. 15/859,203, filed on Dec. 29, 2017, now Pat. No. 11,636,327.

(51) Int. Cl.
*G06T 1/20* (2006.01)
*G06F 7/52* (2006.01)
(Continued)

(52) U.S. Cl.
CPC ............... *G06N 3/063* (2013.01); *G06F 7/52* (2013.01); *G06F 16/9024* (2019.01);
(Continued)

(58) Field of Classification Search
None
See application file for complete search history.

(56) References Cited

U.S. PATENT DOCUMENTS 7,873,812 B1   1/2011  Mimar
10,437,637 B1 * 10/2019  Koneru ..................... G06F 8/44
(Continued)

FOREIGN PATENT DOCUMENTS

CN   109993683       7/2019
EP   3518176 A1     7/2019

OTHER PUBLICATIONS

Goodfellow, et al. "Adaptive Computation and Machine Learning Series", Book, Nov. 18, 2016, pp. 98-165, Chapter 5, The MIT Press, Cambridge, MA.
(Continued)

*Primary Examiner* — Joni Hsu
(74) *Attorney, Agent, or Firm* — Jaffery Watson Mendonsa & Hamilton LLP

(57) ABSTRACT

An apparatus to facilitate processing of a sparse matrix for arbitrary graph data is disclosed. The apparatus includes a graphics processing unit having a data management unit (DMU) that includes a scheduler for scheduling matrix operations, an active logic for tracking active input operands, and a skip logic for tracking unimportant input operands to be skipped by the scheduler. Processing circuitry is coupled to the DMU. The processing circuitry comprises a plurality of processing elements including logic to read operands and a multiplication unit to multiply two or more operands for the arbitrary graph data and customizable circuitry to provide custom functions.

20 Claims, 68 Drawing Sheets

(51) Int. Cl.

| | |
|---|---|
| *G06F 16/901* | (2019.01) |
| *G06F 17/16* | (2006.01) |
| *G06F 18/214* | (2023.01) |
| *G06N 3/04* | (2023.01) |
| *G06N 3/044* | (2023.01) |
| *G06N 3/045* | (2023.01) |
| *G06N 3/063* | (2023.01) |
| *G06N 3/08* | (2023.01) |
| *G06N 3/084* | (2023.01) |
| *G06N 20/00* | (2019.01) |
| *G06T 15/00* | (2011.01) |
| *G06N 3/047* | (2023.01) |

(52) U.S. Cl.
 CPC ............ *G06F 17/16* (2013.01); *G06F 18/214* (2023.01); *G06N 3/04* (2013.01); *G06N 3/044* (2023.01); *G06N 3/045* (2023.01); *G06N 3/08* (2013.01); *G06N 3/084* (2013.01); *G06N 20/00* (2019.01); *G06T 1/20* (2013.01); *G06T 15/005* (2013.01); *G06N 3/047* (2023.01)

(56) References Cited

U.S. PATENT DOCUMENTS

| | | | |
|---|---|---|---|
| 10,528,864 | B2 | 1/2020 | Dally et al. |
| 10,860,922 | B2 | 12/2020 | Dally et al. |
| 10,891,538 | B2 | 1/2021 | Dally et al. |
| 2013/0141448 | A1* | 6/2013 | Yokota ................. G06T 15/005 345/522 |
| 2016/0062947 | A1 | 3/2016 | Chetlur et al. |
| 2016/0179574 | A1* | 6/2016 | Merrill, III ............. G06F 7/523 718/106 |
| 2016/0275395 | A1* | 9/2016 | Amir ........................ G06N 3/08 |
| 2017/0032487 | A1* | 2/2017 | Ashari ..................... G06T 1/20 |
| 2017/0161081 | A1* | 6/2017 | Wu .......................... G06F 9/445 |
| 2018/0046474 | A1* | 2/2018 | Wang ................. G06F 9/44521 |
| 2018/0046906 | A1 | 2/2018 | Dally et al. |
| 2018/0189105 | A1* | 7/2018 | Sanghvi ................ G06F 9/5027 |
| 2018/0322179 | A1* | 11/2018 | Kalinin ................... G06F 9/544 |
| 2019/0138890 | A1* | 5/2019 | Liang ..................... G06N 3/042 |
| 2019/0205746 | A1 | 7/2019 | Nurvitadhi |

OTHER PUBLICATIONS

Ross, et al. "Intel Processor Graphics: Architecture & Programming", Power Point Presentation, Aug. 2015, 78 pages, Intel Corporation, Santa Clara, CA.

Shane Cook, "CUDA Programming", Book, 2013, pp. 37-52, Chapter 3, Elsevier Inc., Amsterdam Netherlands.

Nicholas Wilt, "The CUDA Handbook; A Comprehensive Guide to GPU Programming", Book, Jun. 22, 2013, pp. 41-57, Addison-Wesley Professional, Boston, MA.

Stephen Junkins, "The Compute Architecture of Intel Processor Graphics Gen9", paper, Aug. 14, 2015, 22 pages, Version 1.0, Intel Corporation, Santa Clara, CA.

Communication pursuant to Article 94(3) for EP18209316.1, 11 pages, Feb. 15, 2022.

Nurvitadhi Eriko et al: "Hardware accelerator for analytics of sparse data", Design, Automation & Test in Europe Conference & Exhibition, Mar. 14, 2016, pp. 1616-1621, XP032895188.

Nurvitadhi Eriko et al: "A sparse matrix vector multiply accelerator for Support vector machine", Int. Conf. on Compilers, Architecture and Synthesis for Embedded Systems, IEEE, Oct. 4, 2015, pp. 109-116, XP032809059.

Shaohuai Shi et al: "Speeding up Convolutional Neural Networks by Exploiting the Sparsity of Rectifier Units" In: "Speeding up Convolutional Neural Networks by Exploiting the Sparsity of Rectifier Units", May 15, 2017, XP55596073, pp. 1-7.

Ashariarash et al: "Fast Sparse Matrix-Vector Multiplication on GPUs for Graph Applications", Int. Conf. for High Performance Computing, Networking, Storage and Analysis, IEEE, Nov. 16, 2014, pp. 781-792, XP032725190.

Extended European Search Report for EP18209316.1, 13 pages, Jul. 2, 2019.

Judd et al., "Stripes: Bit-Serial Deep Neural Network Computing", 12 pages, 2016.

Sundaram et al., "GraphMat: High Performance Graph Analytics Made Productive", 12 pages, Mar. 5, 2015.

Notice of Allowance for U.S. Appl. No. 15/859,203 mailed Dec. 22, 2022, 13 pages.

\* cited by examiner

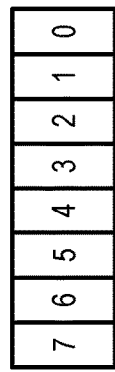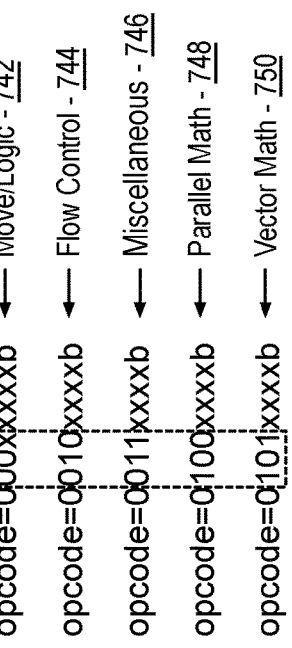
FIG. 7

FIG. 9A  GRAPHICS PROCESSOR COMMAND FORMAT
900
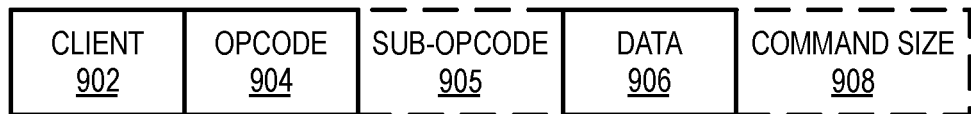
FIG. 9B  GRAPHICS PROCESSOR COMMAND SEQUENCE
910
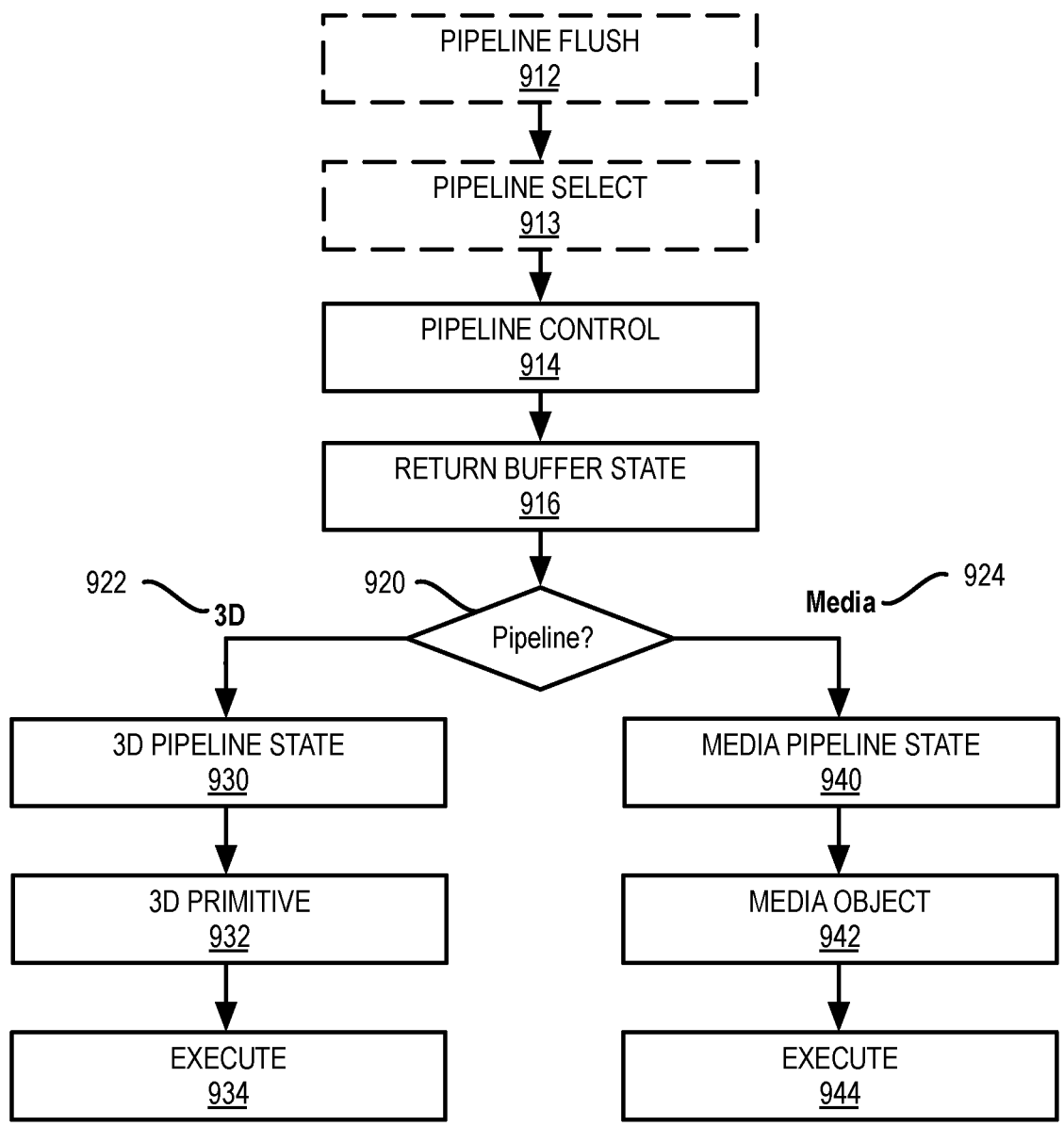

MACHINE LEARNING SPARSE COMPUTATION MECHANISM FOR ARBITRARY NEURAL NETWORKS, ARITHMETIC COMPUTE MICROARCHITECTURE, AND SPARSITY FOR TRAINING MECHANISM

CROSS REFERENCE TO RELATED APPLICATIONS

The present patent application is a continuation application claiming priority from U.S. application Ser. No. 15/859,203, filed Dec. 29, 2017, now U.S. Pat. No. 11,636,327, the contents of which are incorporated herein in their entirety by reference.

FIELD

Embodiments relate generally to data processing and more particularly to data processing via a general-purpose graphics processing unit.

BACKGROUND OF THE DESCRIPTION

Current parallel graphics data processing includes systems and methods developed to perform specific operations on graphics data such as, for example, linear interpolation, tessellation, rasterization, texture mapping, depth testing, etc. Traditionally, graphics processors used fixed function computational units to process graphics data; however, more recently, portions of graphics processors have been made programmable, enabling such processors to support a wider variety of operations for processing vertex and fragment data.

To further increase performance, graphics processors typically implement processing techniques such as pipelining that attempt to process, in parallel, as much graphics data as possible throughout the different parts of the graphics pipeline. Parallel graphics processors with single instruction, multiple thread (SIMT) architectures are designed to maximize the amount of parallel processing in the graphics pipeline. In an SIMT architecture, groups of parallel threads attempt to execute program instructions synchronously together as often as possible to increase processing efficiency. A general overview of software and hardware for SIMT architectures can be found in Shane Cook, *CUDA Programming* Chapter 3, pages 37-51 (2013).

BRIEF DESCRIPTION OF THE DRAWINGS

The present invention is illustrated by way of example and not limitation in the figures of the accompanying drawings in which like references indicate similar elements, and in which:

FIG. 7 is a block diagram illustrating graphics processor instruction formats according to some embodiments;

FIG. 9A is a block diagram illustrating a graphics processor command format according to some embodiments;

FIG. 9B is a block diagram illustrating a graphics processor command sequence according to an embodiment;

FIGS. 29A-29B illustrate inner product matrix multiplication and outer product matrix multiplication;

DETAILED DESCRIPTION

In embodiments, mechanisms for performing sparse matrix processing for arbitrary neural networks are disclosed. The mechanisms efficiently execute arbitrary graphs (e.g., irregular, regular). Arithmetic compute microarchitecture and sparsity for training mechanisms are also disclosed.

In some embodiments, an apparatus includes a graphics processing unit having a data management unit (DMU) that includes a scheduler for scheduling matrix operations, an active logic for tracking active input operands, and a skip logic for tracking unimportant input operands to be skipped by the scheduler. Processing circuitry is coupled to the DMU. The processing circuitry comprises a plurality of processing elements including logic to read operands and a multiplication unit to multiply two or more operands.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

System Overview

Figure 1:
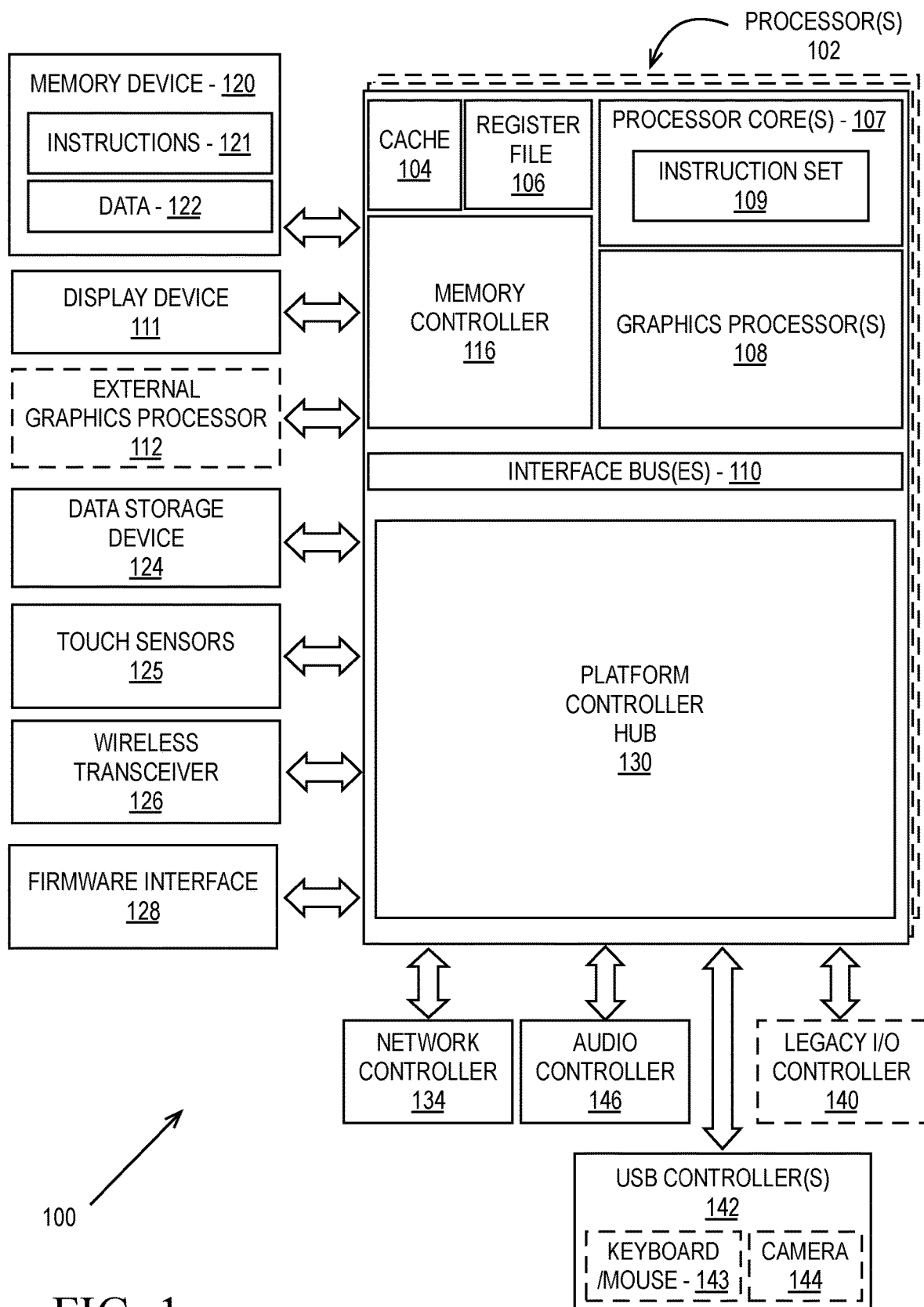
FIG. 1 is a block diagram of a processing system, according to an embodiment.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

In one embodiment the system 100 can include, or be incorporated within a server-based gaming platform, a game console, including a game and media console, a mobile gaming console, a handheld game console, or an online game console. In some embodiments the system 100 is a mobile phone, smart phone, tablet computing device or mobile Internet device. The processing system 100 can also include, couple with, or be integrated within a wearable device, such as a smart watch wearable device, smart eyewear device, augmented reality device, or virtual reality device. In some embodiments, the processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 112, which may communicate with the one or more graphics processors 108 in processors 102 to perform graphics and media operations. In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., hard disk drive, flash memory, etc.). The data storage device 124 can connect via a storage interface (e.g., SATA) or via a peripheral bus, such as a Peripheral Component Interconnect bus (e.g., PCI, PCI Express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, or Long Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 112. In one embodiment the platform controller hub 130 and/or memory controller 116 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

Figure 2:
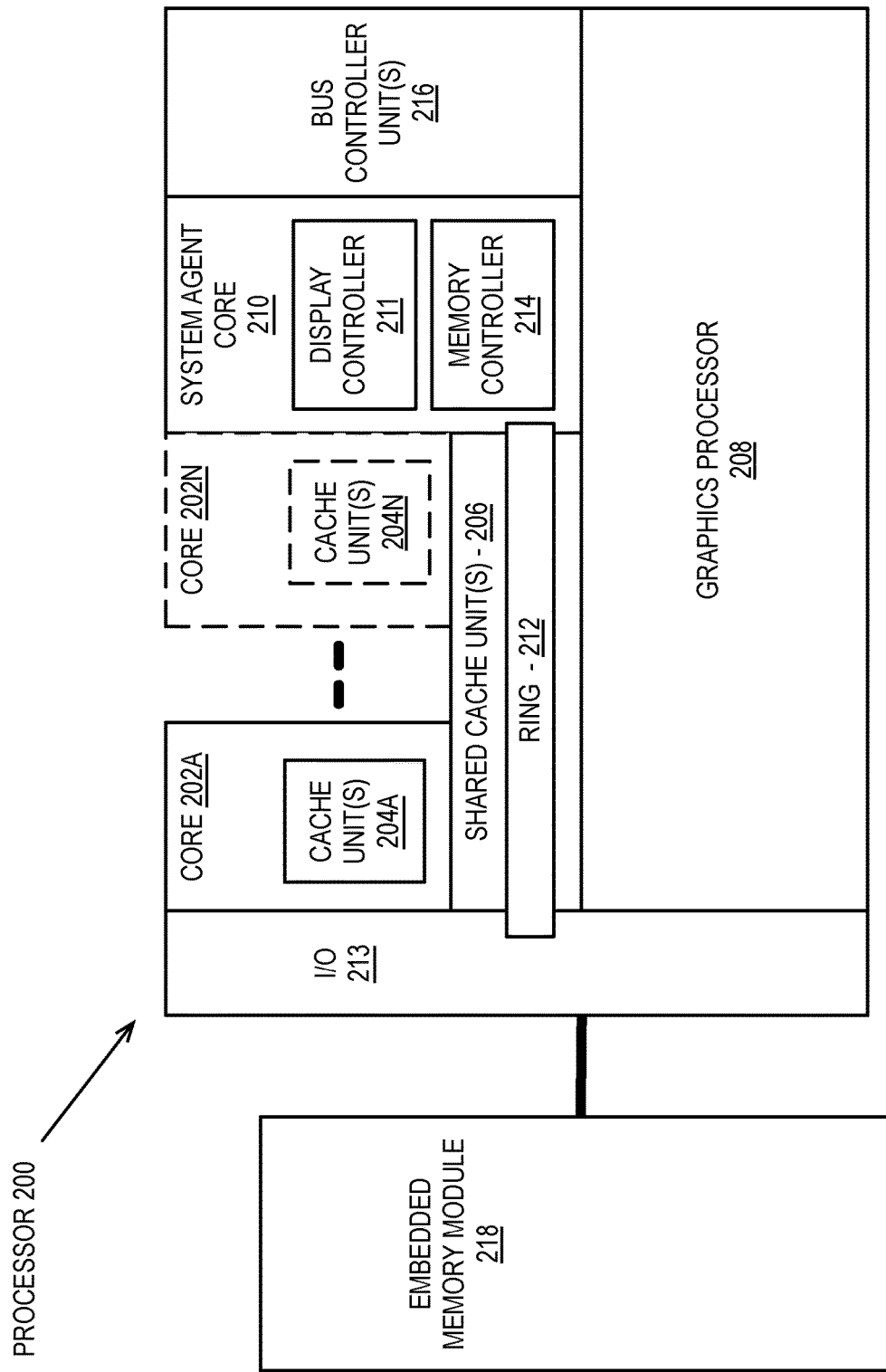
FIG. 2 is a block diagram of an embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring-based interconnect 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring-based interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
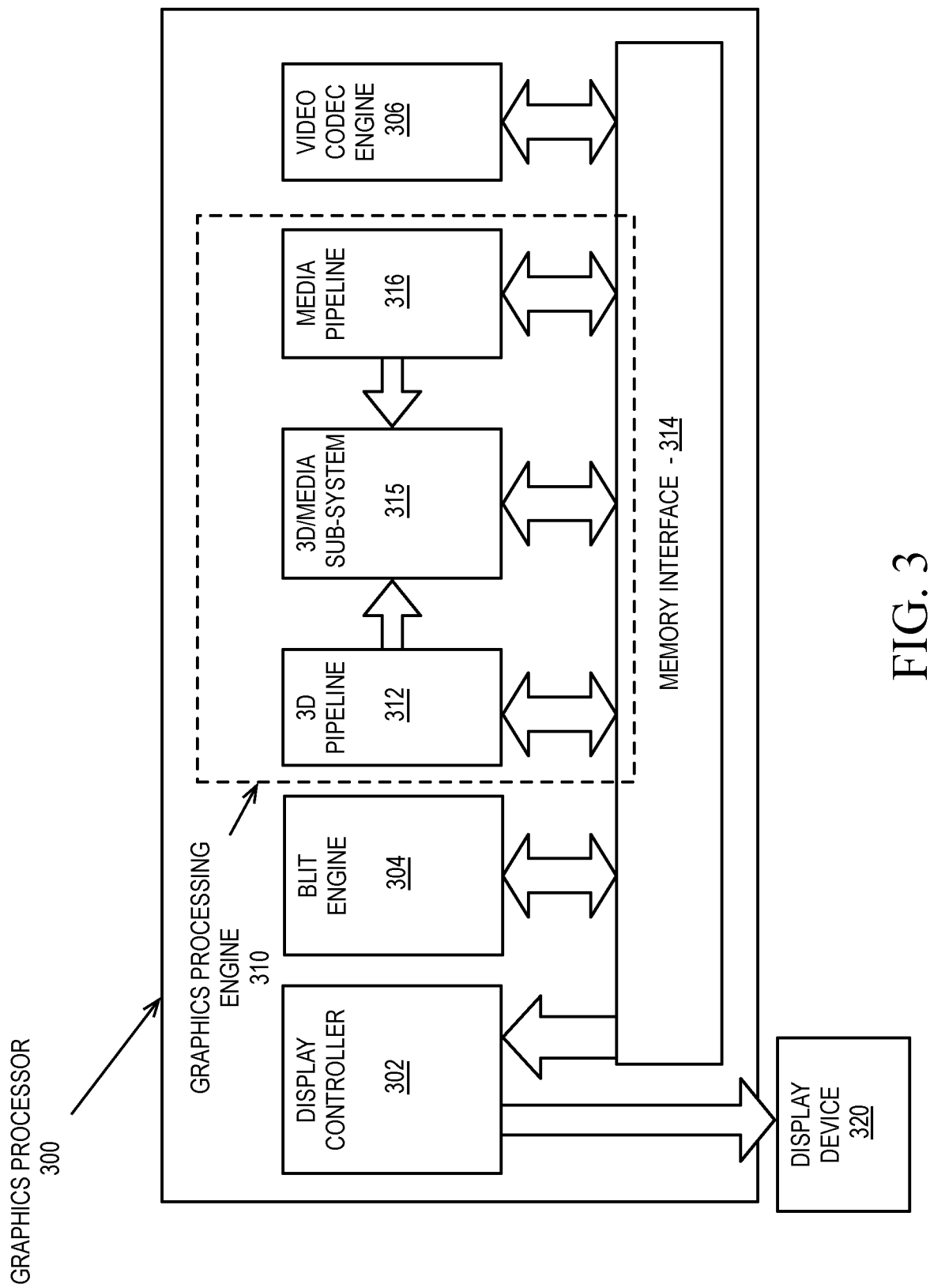
FIG. 3 is a block diagram of a graphics processor, which may be a discrete graphics processing unit, or may be a graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. The display device 320 can be an internal or external display device. In one embodiment the display device 320 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media sub-system 315 includes logic for executing threads spawned by 3D pipeline 312 and media pipeline 316. In one embodiment, the pipelines send thread execution requests to 3D/Media sub-system 315, which includes thread dispatch logic for arbitrating and dispatching the various requests to available thread execution resources. The execution resources include an array of graphics execution units to process the 3D and media threads. In some embodiments, 3D/Media sub-system 315 includes one or more internal caches for thread instructions and data. In some embodiments, the subsystem also includes shared memory, including registers and addressable memory, to share data between threads and to store output data.

The terms "logic", "module", "component", "engine", "mechanism", "tool", "circuit", and "circuitry" are referenced interchangeably throughout this document and may include, by way of example, software, hardware, firmware, or any combination thereof.

Graphics Processing Engine

Figure 4:
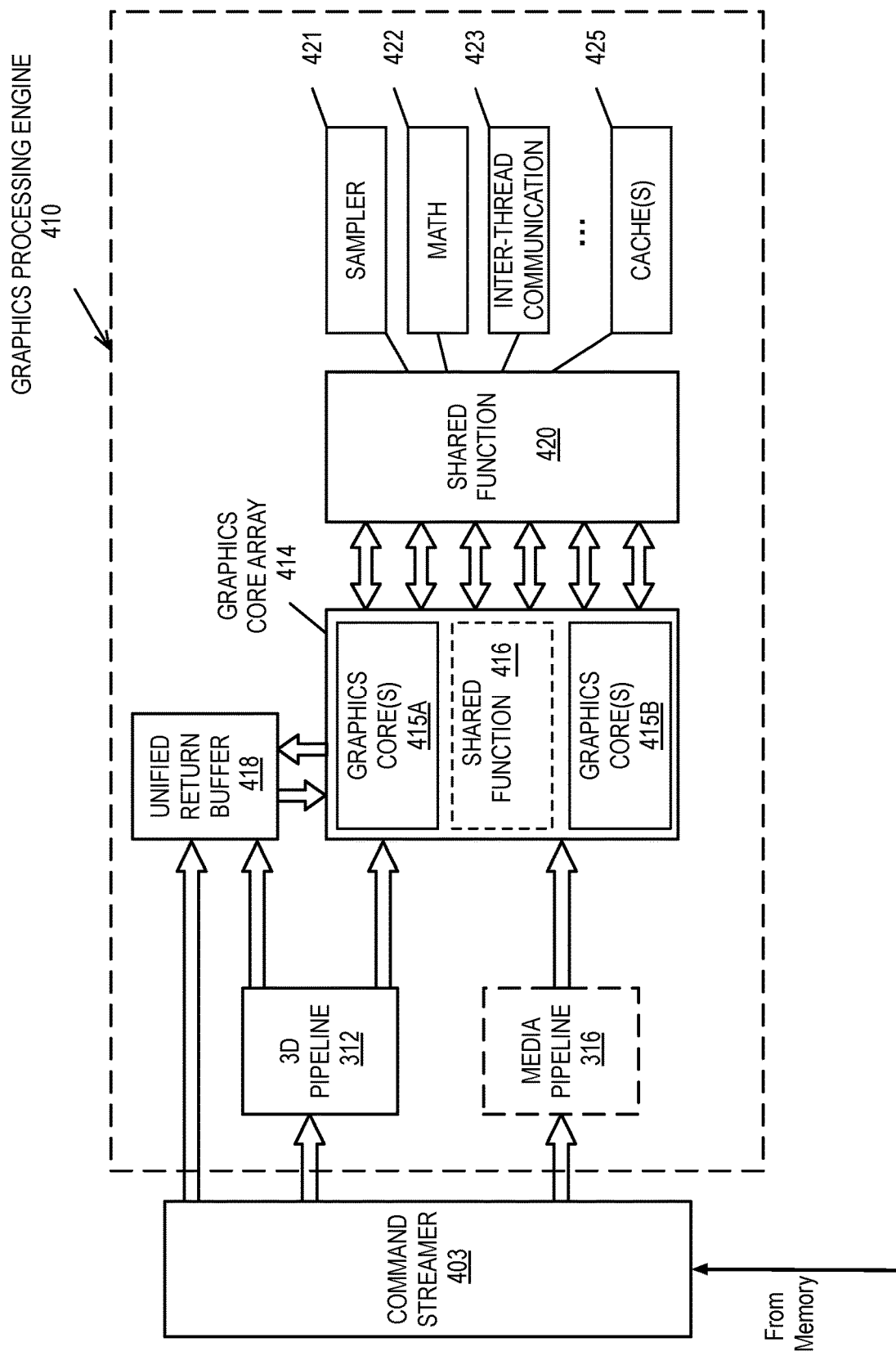
FIG. 4 is a block diagram of a graphics processing engine of a graphics processor in accordance with some embodiments.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 312 includes fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphics core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function circuitry 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function circuitry 420 that includes multiple resources that are shared between the graphics cores in the graphics core array. The shared functions within the shared function circuitry 420 are hardware logic units that provide specialized supplemental functionality to the graphics core array 414. In various embodiments, shared function circuitry 420 includes but is not limited to sampler 421, math 422, and inter-thread communication (ITC) 423 logic. Additionally, some embodiments implement one or more cache(s) 425 within the shared function circuitry 420.

A shared function is implemented where the demand for a given specialized function is insufficient for inclusion within the graphics core array 414. Instead a single instantiation of that specialized function is implemented as a stand-alone entity in the shared function circuitry 420 and shared among the execution resources within the graphics core array 414. The precise set of functions that are shared between the graphics core array 414 and included within the graphics core array 414 varies across embodiments. In some embodiments, specific shared functions within the shared function circuitry 420 that are used extensively by the graphics core array 414 may be included within shared function logic 416 within the graphics core array 414. In various embodiments, the shared function logic 416 within the graphics core array 414 can include some or all logic within the shared function circuitry 420. In one embodiment, all logic elements within the shared function circuitry 420 may be duplicated within the shared function logic 416 of the graphics core array 414. In one embodiment the shared function circuitry 420 is excluded in favor of the shared function logic 416 within the graphics core array 414.

Figure 5:
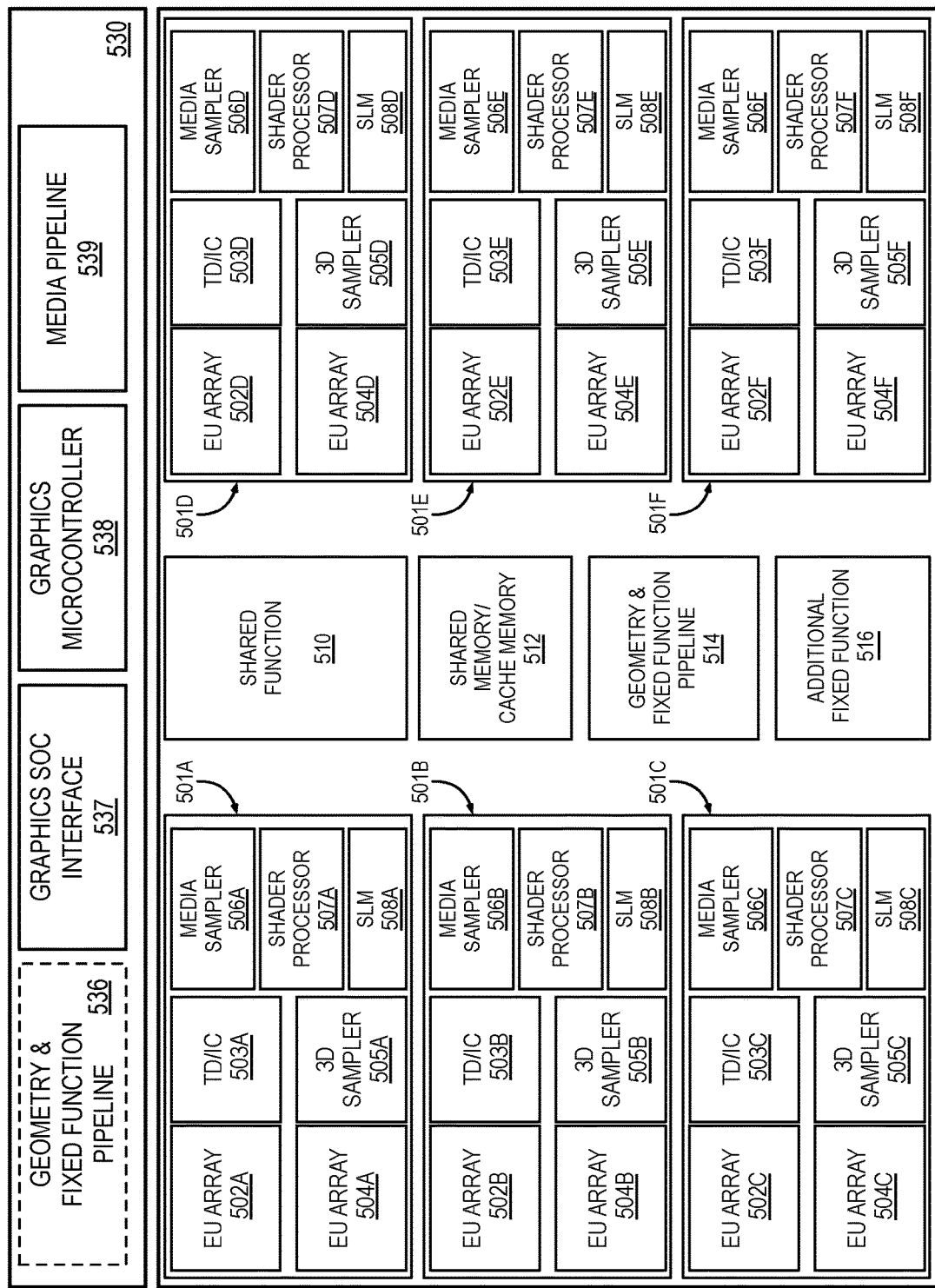
FIG. 5 is a block diagram of hardware logic of a graphics processor core, according to some embodiments described herein.

FIG. 5 is a block diagram of hardware logic of a graphics processor core 500, according to some embodiments described herein. Elements of FIG. 5 having the same reference numbers (or names) as the elements of any other figure herein can operate or function in any manner similar to that described elsewhere herein, but are not limited to such. The illustrated graphics processor core 500, in some embodiments, is included within the graphics core array 414 of FIG. 4. The graphics processor core 500, sometimes referred to as a core slice, can be one or multiple graphics cores within a modular graphics processor. The graphics processor core 500 is exemplary of one graphics core slice, and a graphics processor as described herein may include multiple graphics core slices based on target power and performance envelopes. Each graphics core 500 can include a fixed function block 530 coupled with multiple sub-cores 501A-501F, also referred to as sub-slices, that include modular blocks of general-purpose and fixed function logic.

In some embodiments the fixed function block 530 includes a geometry/fixed function pipeline 536 that can be shared by all sub-cores in the graphics processor 500, for example, in lower performance and/or lower power graphics processor implementations. In various embodiments, the geometry/fixed function pipeline 536 includes a 3D fixed function pipeline (e.g., 3D pipeline 312 as in FIG. 3 and FIG. 4) a video front-end unit, a thread spawner and thread dispatcher, and a unified return buffer manager, which manages unified return buffers, such as the unified return buffer 418 of FIG. 4.

In one embodiment the fixed function block 530 also includes a graphics SoC interface 537, a graphics microcontroller 538, and a media pipeline 539. The graphics SoC interface 537 provides an interface between the graphics core 500 and other processor cores within a system on a chip integrated circuit. The graphics microcontroller 538 is a programmable sub-processor that is configurable to manage various functions of the graphics processor 500, including thread dispatch, scheduling, and pre-emption. The media pipeline 539 (e.g., media pipeline 316 of FIG. 3 and FIG. 4) includes logic to facilitate the decoding, encoding, pre-processing, and/or post-processing of multimedia data, including image and video data. The media pipeline 539 implement media operations via requests to compute or sampling logic within the sub-cores 501-501F.

In one embodiment the graphics SoC interface 537 enables the graphics core 500 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 537 can also enable communication with fixed function devices within the SoC, such as camera imaging pipelines, and enables the use of and/or implements global memory atomics that may be shared between the graphics core 500 and CPUs within the SoC. The graphics SoC interface 537 can also implement power management controls for the graphics core 500 and enable an interface between a clock domain of the graphics core 500 and other clock domains within the SoC. In one embodiment the SoC interface 537 enables receipt of command buffers from a command streamer and global thread dispatcher that are configured to provide commands and instructions to each of one or more graphics cores within a graphics processor. The commands and instructions can be dispatched to the media pipeline 539, when media operations are to be performed, or a geometry and fixed function pipeline (e.g., geometry and fixed function pipeline 536, geometry and fixed function pipeline 514) when graphics processing operations are to be performed.

The graphics microcontroller 538 can be configured to perform various scheduling and management tasks for the graphics core 500. In one embodiment the graphics microcontroller 538 can perform graphics and/or compute workload scheduling on the various graphics parallel engines within execution unit (EU) arrays 502A-502F, 504A-504F within the sub-cores 501A-501F. In this scheduling model, host software executing on a CPU core of an SoC including the graphics core 500 can submit workloads one of multiple graphics processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 538 can also facilitate low-power or idle states for the graphics core 500, providing the graphics core 500 with the ability to save and restore registers within the graphics core 500 across low-power state transitions independently from the operating system and/or graphics driver software on the system.

The graphics core 500 may have greater than or fewer than the illustrated sub-cores 501A-501F, up to N modular sub-cores. For each set of N sub-cores, the graphics core 500 can also include shared function circuitry 510, shared and/or cache memory 512, a geometry/fixed function pipeline 514, as well as additional fixed function circuitry 516 to accelerate various graphics and compute processing operations. The shared function circuitry 510 can include logic units associated with the shared function circuitry 420 of FIG. 4 (e.g., sampler, math, and/or inter-thread communication logic) that can be shared by each N sub-cores within the graphics core 500. The shared and/or cache memory 512 can be a last-level cache for the set of N sub-cores 501A-501F within the graphics core 500, and can also serve as shared memory that is accessible by multiple sub-cores. The geometry/fixed function pipeline 514 can be included instead of the geometry/fixed function pipeline 536 within the fixed function block 530 and can include the same or similar logic units.

In one embodiment the graphics core 500 includes additional fixed function circuitry 516 that can include various fixed function acceleration logic for use by the graphics core 500. In one embodiment the additional fixed function circuitry 516 includes an additional geometry pipeline for use in position only shading. In position-only shading, two geometry pipelines exist, the full geometry pipeline within the geometry/fixed function pipeline 516, 536, and a cull pipeline, which is an additional geometry pipeline which may be included within the additional fixed function circuitry 516. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function circuitry 516 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function circuitry 516 can also include machine-learning acceleration logic, such as fixed function matrix multiplication logic, for implementations including optimizations for machine learning training or inferencing.

Within each graphics sub-core 501A-501F includes a set of execution resources that may be used to perform graphics, media, and compute operations in response to requests by graphics pipeline, media pipeline, or shader programs. The graphics sub-cores 501A-501F include multiple EU arrays 502A-502F, 504A-504F, thread dispatch and inter-thread communication (TD/IC) logic 503A-503F, a 3D (e.g., texture) sampler 505A-505F, a media sampler 506A-506F, a shader processor 507A-507F, and shared local memory (SLM) 508A-508F. The EU arrays 502A-502F, 504A-504F each include multiple execution units, which are general-purpose graphics processing units capable of performing floating-point and integer/fixed-point logic operations in service of a graphics, media, or compute operation, including graphics, media, or compute shader programs. The TD/IC logic 503A-503F performs local thread dispatch and thread control operations for the execution units within a sub-core and facilitate communication between threads executing on the execution units of the sub-core. The 3D sampler 505A-505F can read texture or other 3D graphics related data into memory. The 3D sampler can read texture data differently based on a configured sample state and the texture format associated with a given texture. The media sampler 506A-506F can perform similar read operations based on the type and format associated with media data. In one embodiment, each graphics sub-core 501A-501F can alternately include a unified 3D and media sampler. Threads executing on the execution units within each of the sub-cores 501A-501F can make use of shared local memory 508A-508F within each sub-core, to enable threads executing within a thread group to execute using a common pool of on-chip memory.

Execution Units

Figure 6A:
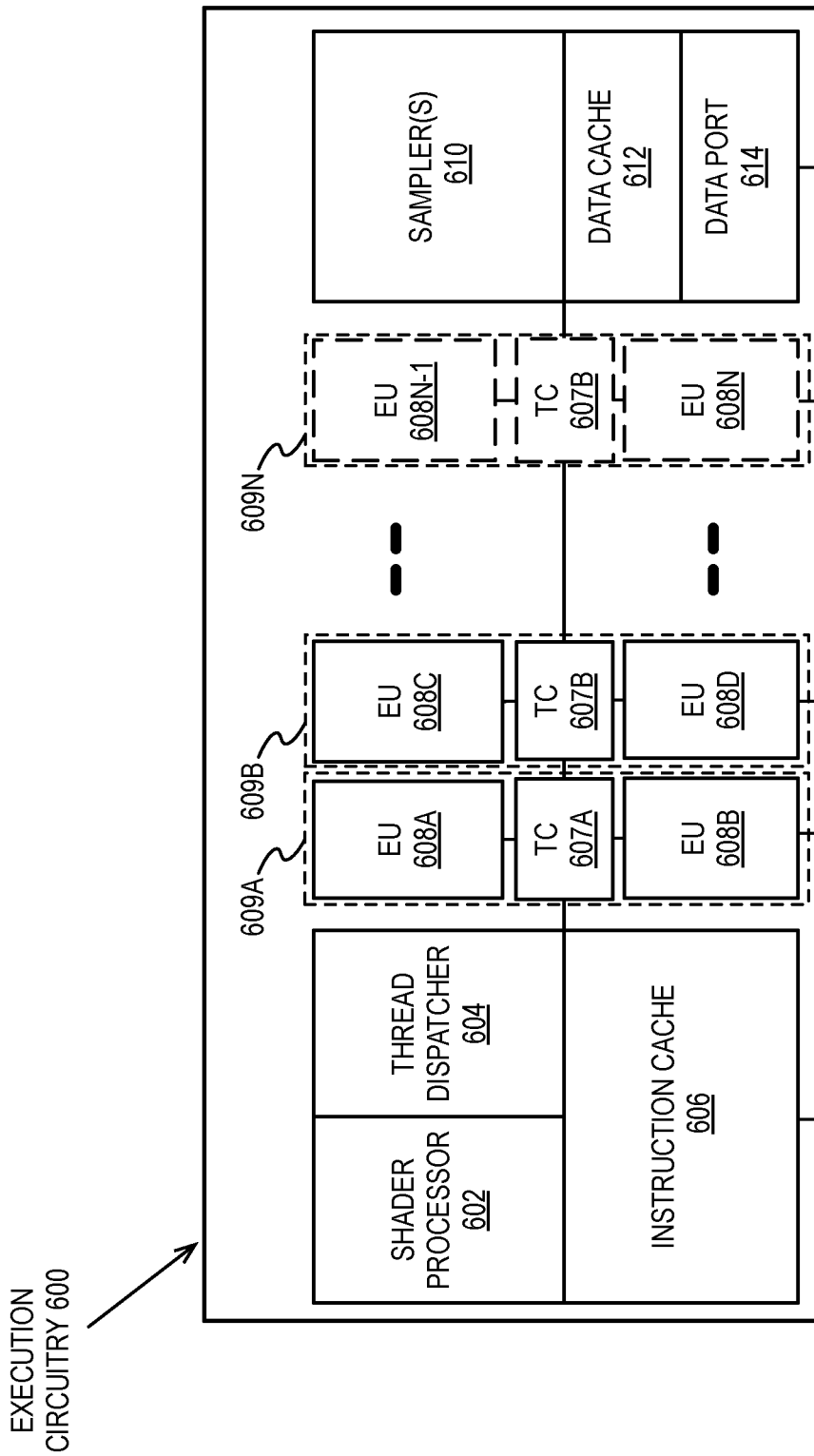
FIGS. 6A-6B illustrate thread execution circuitry including an array of processing elements employed in a graphics processor core according to embodiments described herein.
Figure 6B:
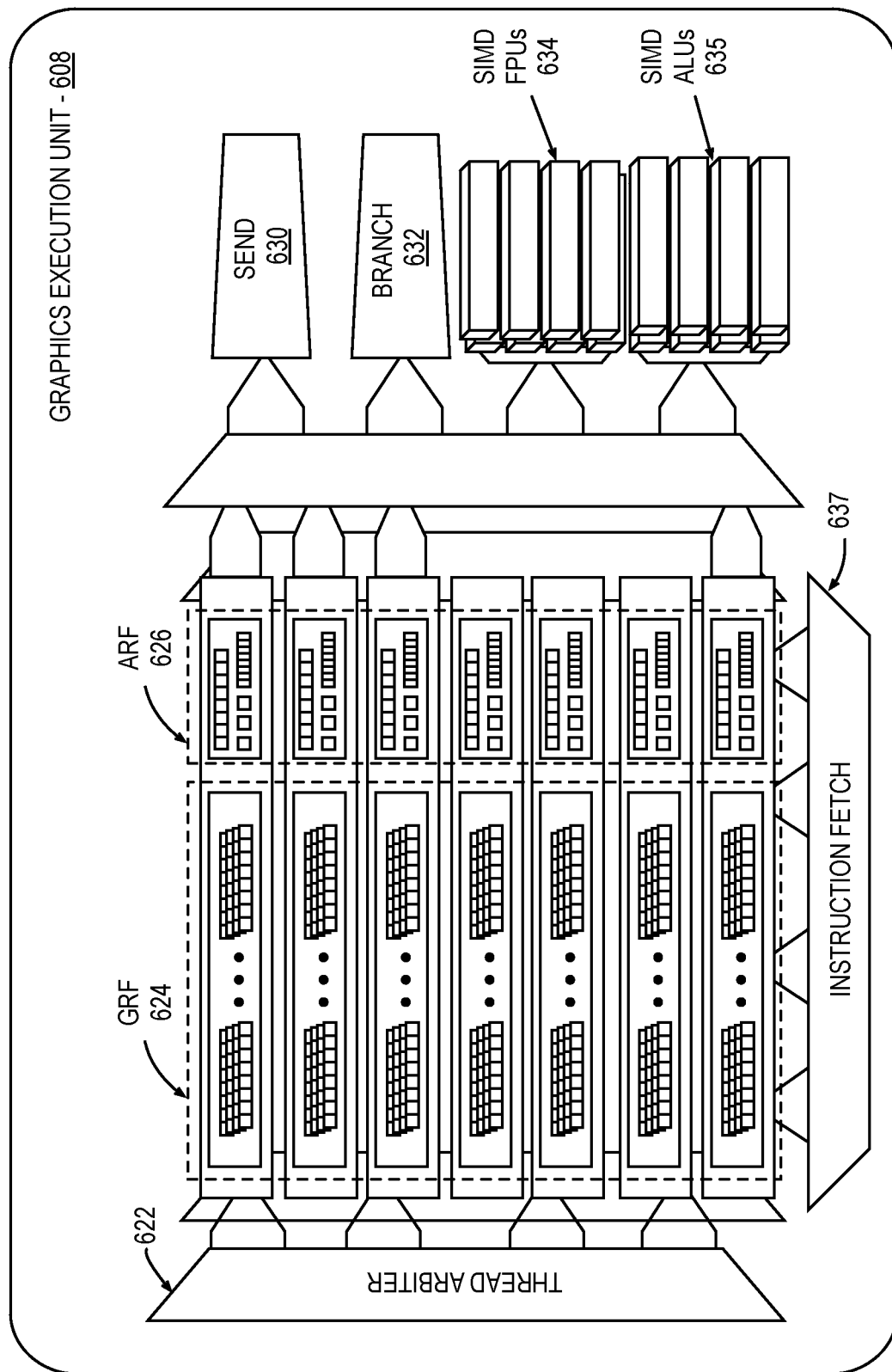

FIGS. 6A-6B illustrate thread execution circuitry 600 including an array of processing elements employed in a graphics processor core according to embodiments described herein. Elements of FIGS. 6A-6B having the same reference numbers (or names) as the elements of any other figure herein can operate or function in any manner similar to that described elsewhere herein, but are not limited to such. FIG. 6A illustrates an overview of thread execution circuitry 600 (or thread execution circuitry 600), which can include a variant of the hardware logic illustrated with each sub-core 501A-501F of FIG. 5. FIG. 6B illustrates exemplary internal details of an execution unit.

As illustrated in FIG. 6A, in some embodiments thread execution circuitry 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution circuitry 600 includes one or more connections to memory, such as system memory or cache memory, through one or more of instruction cache 606, data port 614, sampler 610, and execution units 608A-608N. In some embodiments, each execution unit (e.g., 608A) is a stand-alone programmable general-purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, a geometry pipeline can dispatch vertex, tessellation, or geometry shaders to the thread execution logic for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused graphics execution unit 609A-609N having thread control logic (607A-607N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 609A-609N includes at least two execution units. For example, fused execution unit 609A includes a first EU 608A, second EU 608B, and thread control logic 607A that is common to the first EU 608A and the second EU 608B. The thread control logic 607A controls threads executed on the fused graphics execution unit 609A, allowing each EU within the fused execution units 609A-609N to execute using a common instruction pointer register.

One or more internal instruction caches (e.g., 606) are included in the thread execution circuitry 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution circuitry 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, shader processor 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution circuitry 600 to output processed data to memory for further processing on a graphics processor output pipeline. In some embodiments, the data port 614 includes or couples to one or more cache memories (e.g., data cache 612) to cache data for memory access via the data port.

As illustrated in FIG. 6B, a graphics execution unit 608 can include an instruction fetch unit 637, a general register file array (GRF) 624, an architectural register file array (ARF) 626, a thread arbiter 622, a send unit 630, a branch unit 632, a set of SIMD floating point units (FPUs) 634, and in one embodiment a set of dedicated integer SIMD ALUs 635. The GRF 624 and ARF 626 includes the set of general register files and architecture register files associated with each simultaneous hardware thread that may be active in the graphics execution unit 608. In one embodiment, per thread architectural state is maintained in the ARF 626, while data used during thread execution is stored in the GRF 624. The execution state of each thread, including the instruction pointers for each thread, can be held in thread-specific registers in the ARF 626.

In one embodiment the graphics execution unit 608 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per execution unit, where execution unit resources are divided across logic used to execute multiple simultaneous threads.

In one embodiment, the graphics execution unit 608 can co-issue multiple instructions, which may each be different instructions. The thread arbiter 622 of the graphics execution unit 608 can dispatch the instructions to one of the send unit 630, branch unit 632, or SIMD FPU(s) 634 for execution. Each execution thread can access 128 general-purpose registers within the GRF 624, where each register can store 32 bytes, accessible as a SIMD 8-element vector of 32-bit data elements. In one embodiment, each execution unit thread has access to 4 Kbytes within the GRF 624, although embodiments are not so limited, and greater or fewer register resources may be provided in other embodiments. In one embodiment up to seven threads can execute simultaneously, although the number of threads per execution unit can also vary according to embodiments. In an embodiment in which seven threads may access 4 Kbytes, the GRF 624 can store a total of 28 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 630. In one embodiment, branch instructions are dispatched to a dedicated branch unit 632 to facilitate SIMD divergence and eventual convergence.

In one embodiment the graphics execution unit 608 includes one or more SIMD floating point units (FPU(s)) 634 to perform floating-point operations. In one embodiment, the FPU(s) 634 also support integer computation. In one embodiment the FPU(s) 634 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 64-bit floating-point. In some embodiments, a set of 8-bit integer SIMD ALUs 635 are also present and may be specifically optimized to perform operations associated with machine learning computations.

In one embodiment, arrays of multiple instances of the graphics execution unit 608 can be instantiated in a graphics sub-core grouping (e.g., a sub-slice). For scalability, product architects can choose the exact number of execution units per sub-core grouping. In one embodiment the graphics execution unit 608 can execute instructions across a plurality of execution channels. In a further embodiment, each thread executed on the graphics execution unit 608 is executed on a different channel.

FIG. 7 is a block diagram illustrating graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, the graphics processor instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
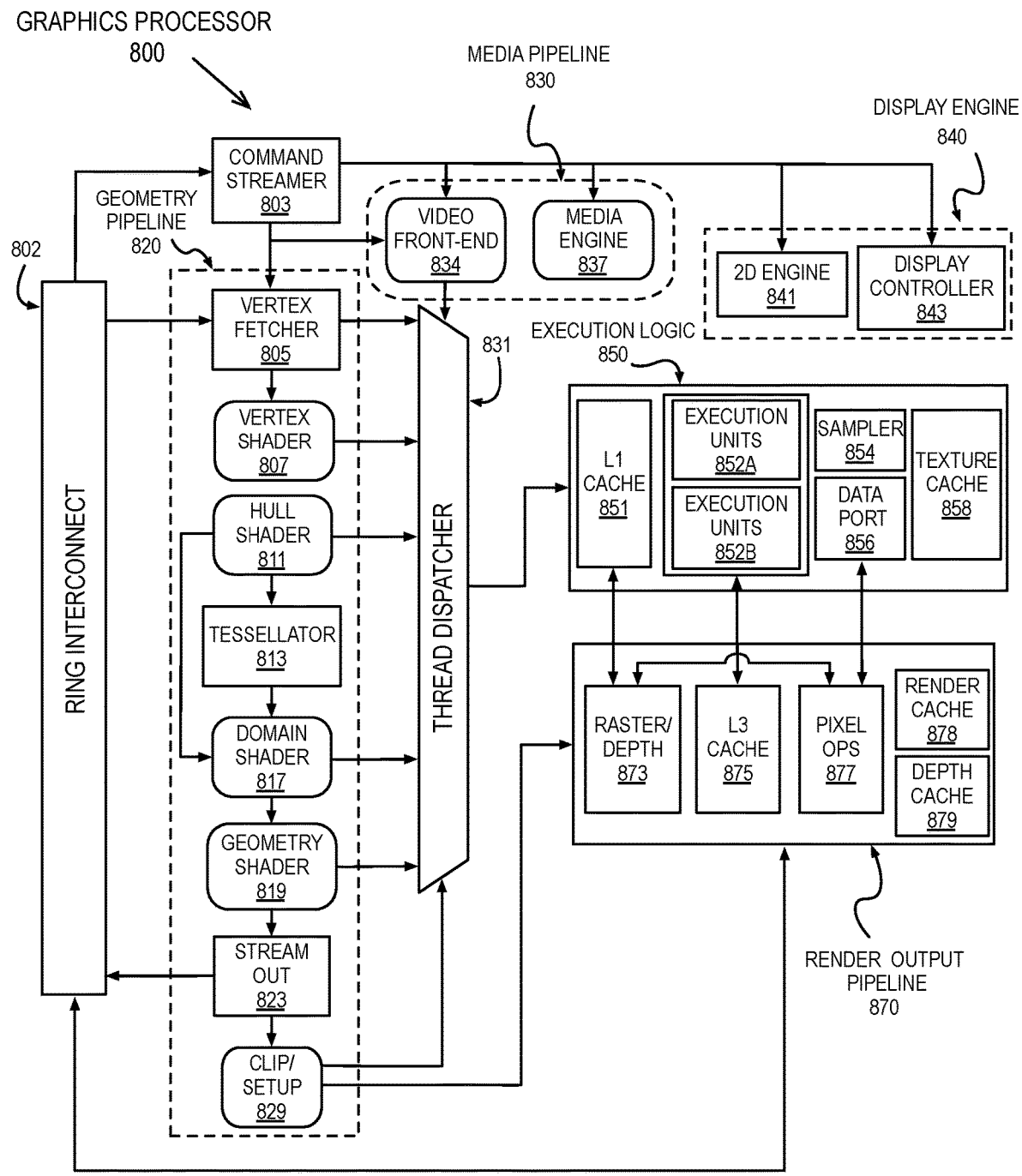
FIG. 8 is a block diagram of another embodiment of a graphics processor.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841 or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
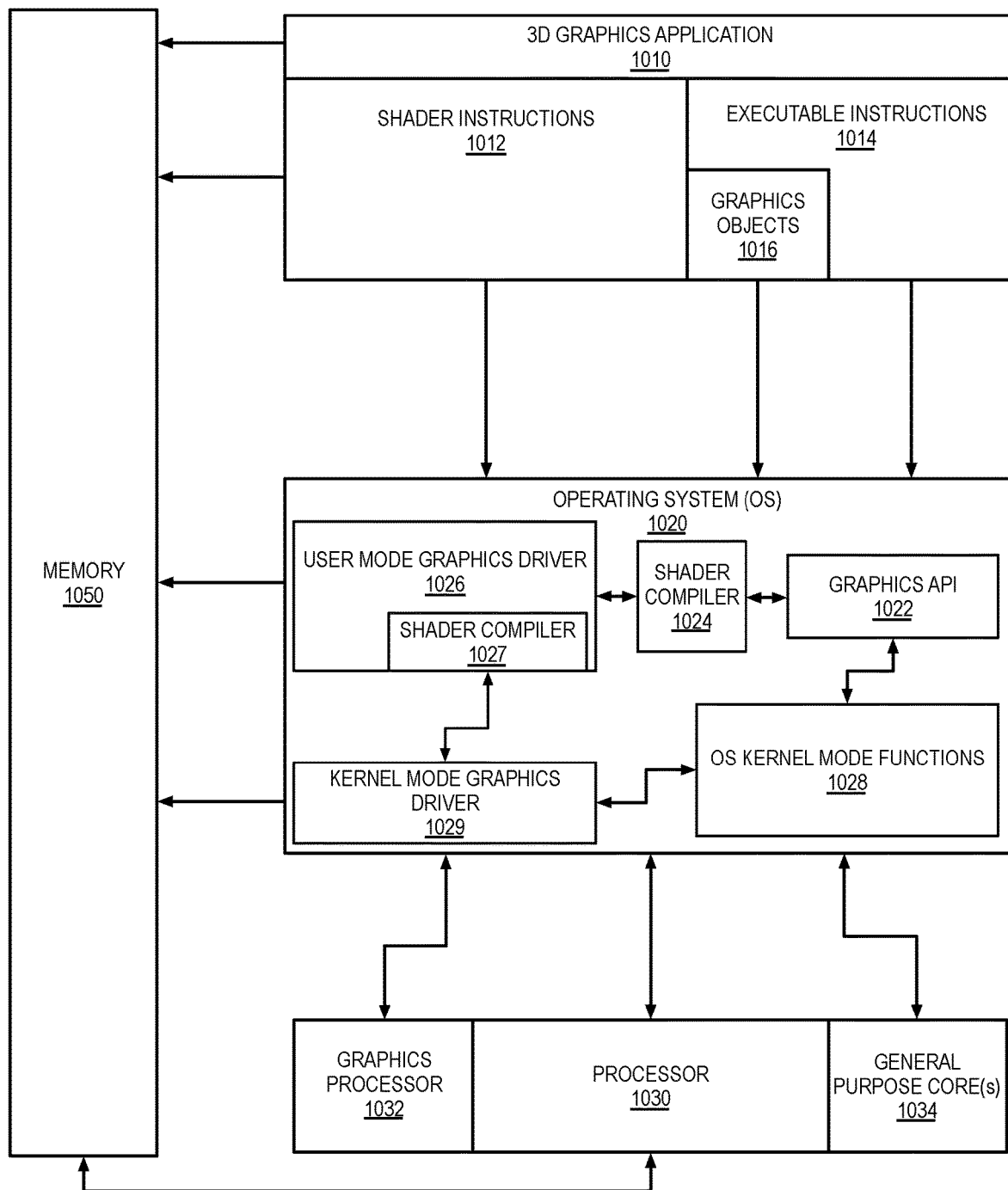
FIG. 10 illustrates exemplary graphics software architecture for a data processing system according to some embodiments.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
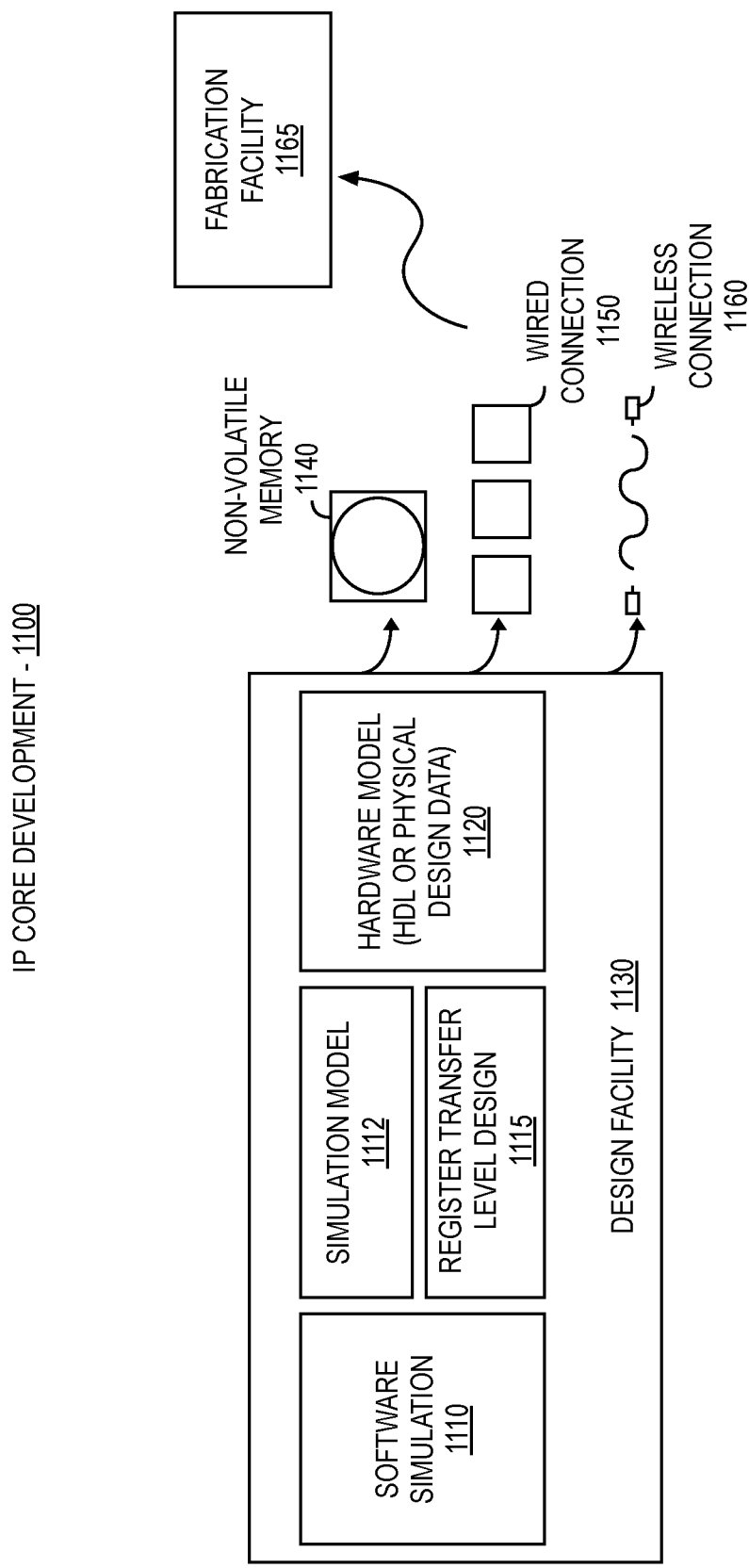
FIG. 11A is a block diagram illustrating an IP core development system that may be used to manufacture an integrated circuit to perform operations according to an embodiment.

FIG. 11A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3$^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
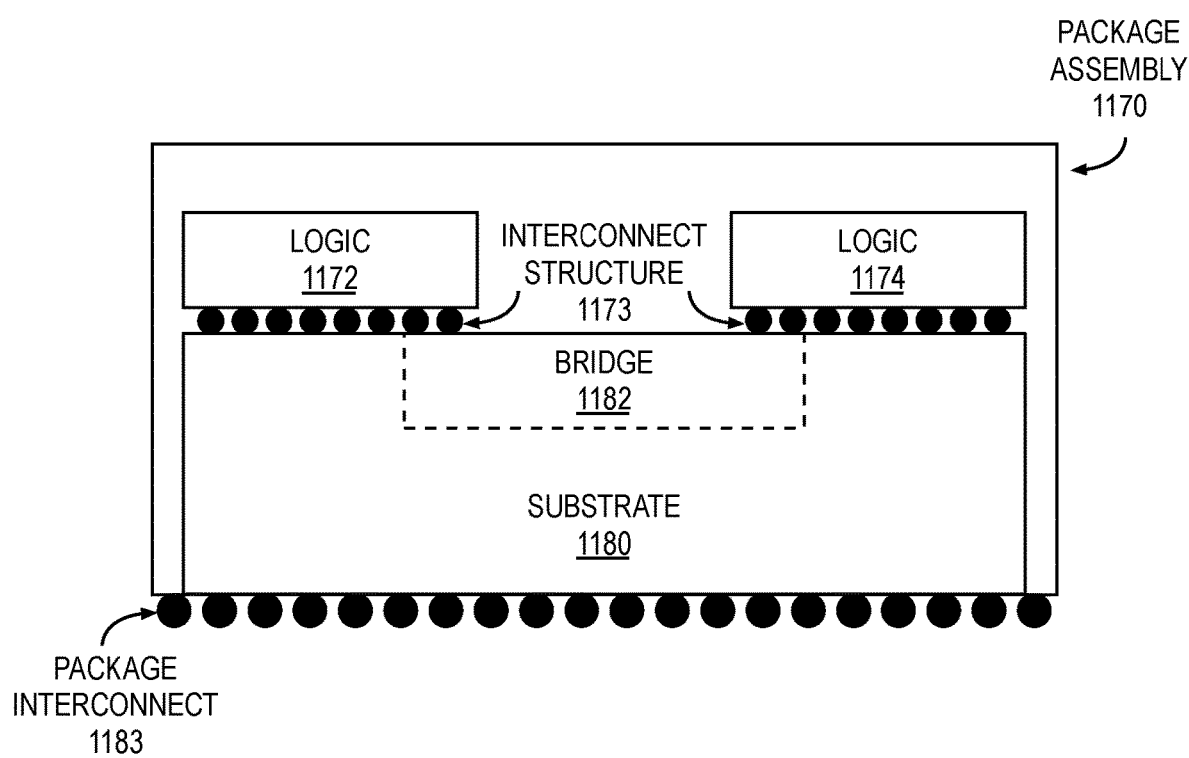
FIG. 11B illustrates a cross-section side view of an integrated circuit package assembly, according to some embodiments described herein.

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The package substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Exemplary System on a Chip Integrated Circuit

FIGS. 12, 13A, 13B, 14A, and 14B illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

Figure 12:
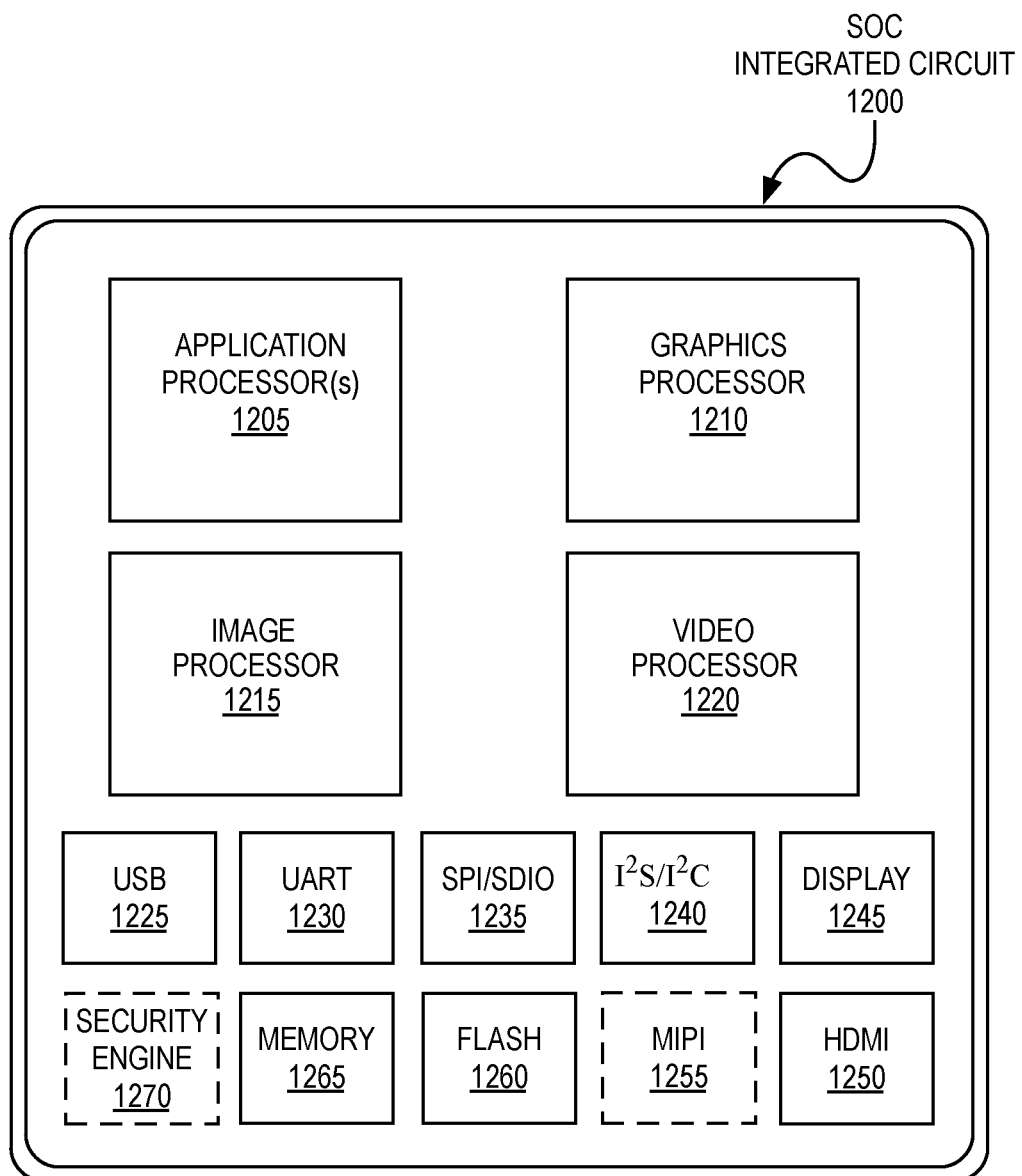
FIGS. 12, 13A, 13B, 14A, and 14B illustrate exemplary integrated circuits and associated graphics processors that may be fabricated using one or more IP cores, according to various embodiments described herein.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Figure 13A:
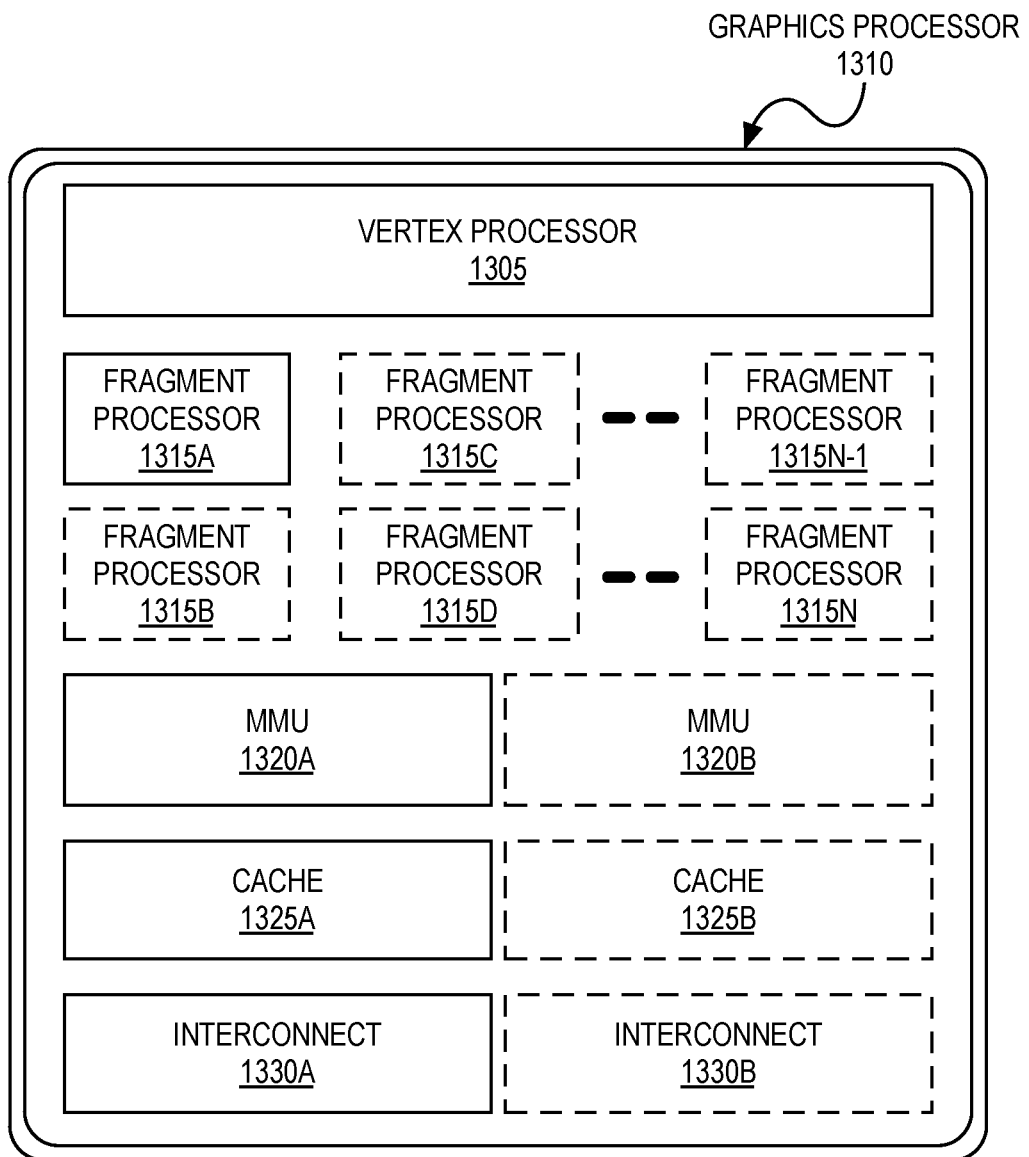
Figure 13B:
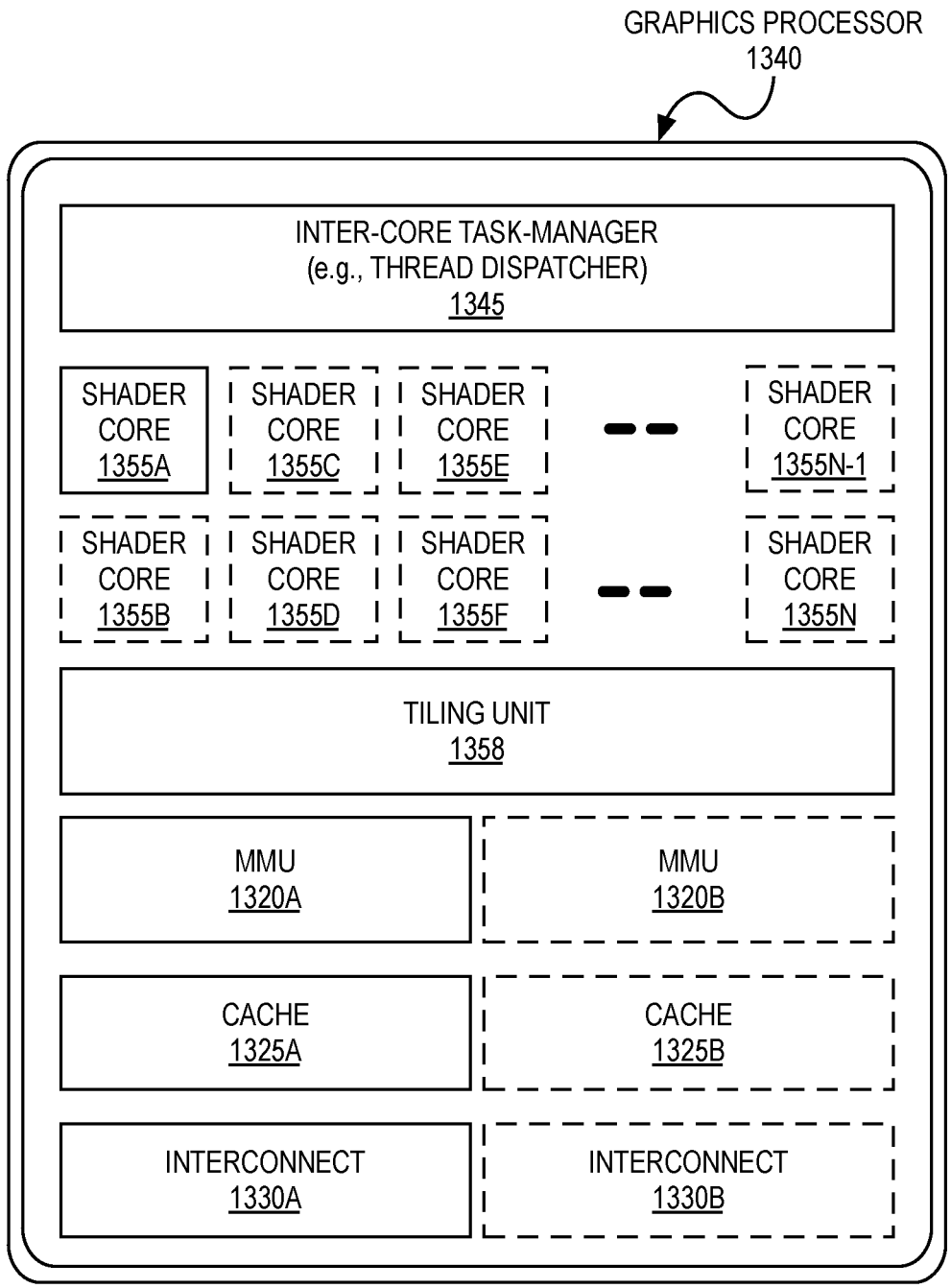

FIGS. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13A is an example of a low power graphics processor core. Graphics processor 1340 of FIG. 13B is an example of a higher performance graphics processor core. Each of the graphics processors 1310, 1340 can be variants of the graphics processor 1210 of FIG. 12.

As shown in FIG. 13A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 13B, graphics processor 1340 includes the one or more MMU(s) 1320A-1320B, caches 1325A-1325B, and circuit interconnects 1330A-1330B of the graphics processor 1310 of FIG. 13A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Figure 14A:
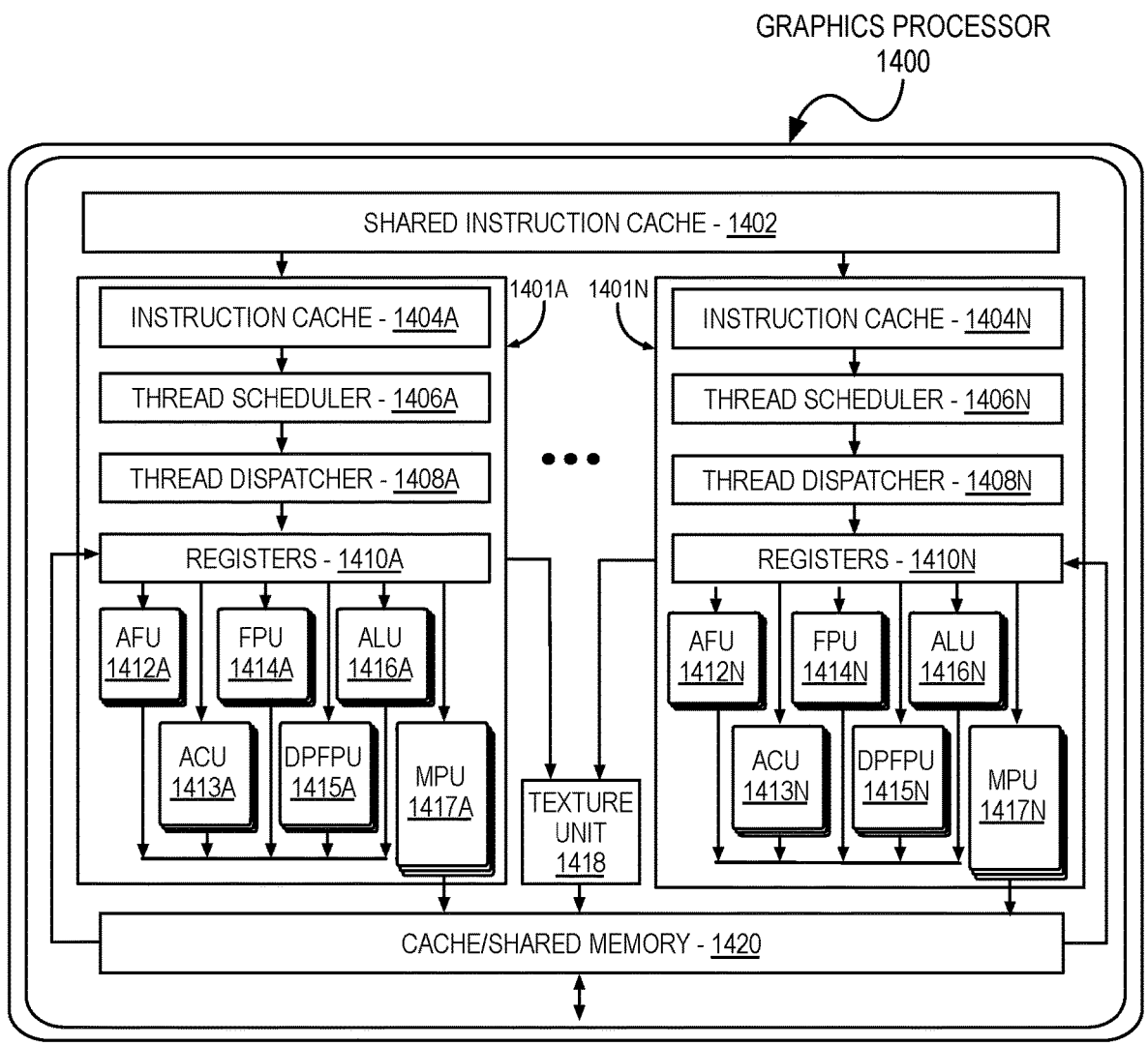
Figure 14B:
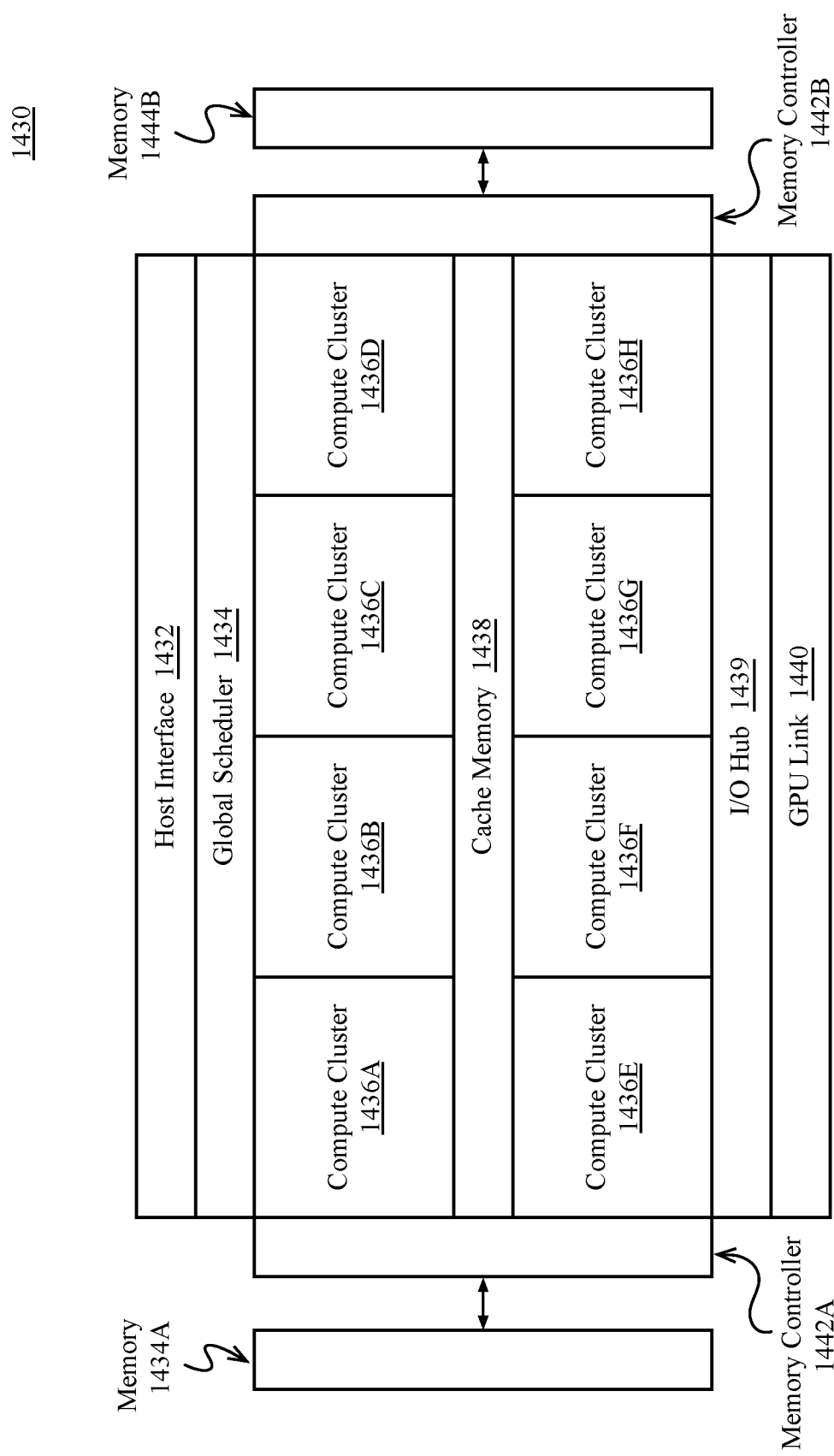

FIGS. 14A-14B illustrate additional exemplary graphics processor logic according to embodiments described herein. FIG. 14A illustrates a graphics core 1400 that may be included within the graphics processor 1210 of FIG. 12, and may be a unified shader core 1355A-1355N as in FIG. 13B. FIG. 14B illustrates a highly parallel general-purpose graphics processing unit 1430 suitable for deployment on a multi-chip module.

As shown in FIG. 14A, the graphics core 1400 includes a shared instruction cache 1402, a texture unit 1418, and a cache/shared memory 1420 that are common to the execution resources within the graphics core 1400. The graphics core 1400 can include multiple slices 1401A-1401N or partition for each core, and a graphics processor can include multiple instances of the graphics core 1400. The slices 1401A-1401N can include support logic including a local instruction cache 1404A-1404N, a thread scheduler 1406A-1406N, a thread dispatcher 1408A-1408N, and a set of registers 1410A. To perform logic operations, the slices 1401A-1401N can include a set of additional function units (AFUs 1412A-1412N), floating-point units (FPU 1414A-1414N), integer arithmetic logic units (ALUs 1416-1416N), address computational units (ACU 1413A-1413N), double-precision floating-point units (DPFPU 1415A-1415N), and matrix processing units (MPU 1417A-1417N).

Some of the computational units operate at a specific precision. For example, the FPUs 1414A-1414N can perform single-precision (32-bit) and half-precision (16-bit) floating point operations, while the DPFPUs 1415A-1415N perform double precision (64-bit) floating point operations. The ALUs 1416A-1416N can perform variable precision integer operations at 8-bit, 16-bit, and 32-bit precision, and can be configured for mixed precision operations. The MPUs 1417A-1417N can also be configured for mixed precision matrix operations, including half-precision floating point and 8-bit integer operations. The MPUs 1417-1417N can perform a variety of matrix operations to accelerate machine learning application frameworks, including enabling support for accelerated general matrix to matrix multiplication (GEMM). The AFUs 1412A-1412N can perform additional logic operations not supported by the floating-point or integer units, including trigonometric operations (e.g., Sine, Cosine, etc.).

As shown in FIG. 14B, a general-purpose processing unit (GPGPU) 1430 can be configured to enable highly parallel compute operations to be performed by an array of graphics processing units. Additionally, the GPGPU 1430 can be linked directly to other instances of the GPGPU to create a multi-GPU cluster to improve training speed for particularly deep neural networks. The GPGPU 1430 includes a host interface 1432 to enable a connection with a host processor. In one embodiment the host interface 1432 is a PCI Express interface. However, the host interface can also be a vendor specific communications interface or communications fabric. The GPGPU 1430 receives commands from the host processor and uses a global scheduler 1434 to distribute execution threads associated with those commands to a set of compute clusters 1436A-1436H. The compute clusters 1436A-1436H share a cache memory 1438. The cache memory 1438 can serve as a higher-level cache for cache memories within the compute clusters 1436A-1436H.

The GPGPU 1430 includes memory 1434A-1434B coupled with the compute clusters 1436A-1436H via a set of memory controllers 1442A-1442B. In various embodiments, the memory 1434A-1434B can include various types of memory devices including dynamic random access memory (DRAM) or graphics random access memory, such as synchronous graphics random access memory (SGRAM), including graphics double data rate (GDDR) memory.

In one embodiment the compute clusters 1436A-1436H each include a set of graphics cores, such as the graphics core 1400 of FIG. 14A, which can include multiple types of integer and floating point logic units that can perform computational operations at a range of precisions including suited for machine learning computations. For example and in one embodiment at least a subset of the floating point units in each of the compute clusters 1436A-1436H can be configured to perform 16-bit or 32-bit floating point operations, while a different subset of the floating point units can be configured to perform 64-bit floating point operations.

Multiple instances of the GPGPU 1430 can be configured to operate as a compute cluster. The communication mechanism used by the compute cluster for synchronization and data exchange varies across embodiments. In one embodiment the multiple instances of the GPGPU 1430 communicate over the host interface 1432. In one embodiment the GPGPU 1430 includes an I/O hub 1439 that couples the GPGPU 1430 with a GPU link 1440 that enables a direct connection to other instances of the GPGPU. In one embodiment the GPU link 1440 is coupled to a dedicated GPU-to-GPU bridge that enables communication and synchronization between multiple instances of the GPGPU 1430. In one embodiment the GPU link 1440 couples with a high speed interconnect to transmit and receive data to other GPGPUs or parallel processors. In one embodiment the multiple instances of the GPGPU 1430 are located in separate data processing systems and communicate via a network device that is accessible via the host interface 1432. In one embodiment the GPU link 1440 can be configured to enable a connection to a host processor in addition to or as an alternative to the host interface 1432.

While the illustrated configuration of the GPGPU 1430 can be configured to train neural networks, one embodiment provides alternate configuration of the GPGPU 1430 that can be configured for deployment within a high performance or low power inferencing platform. In an inferencing configuration the GPGPU 1430 includes fewer of the compute clusters 1436A-1436H relative to the training configuration. Additionally, the memory technology associated with the memory 1434A-1434B may differ between inferencing and training configurations, with higher bandwidth memory technologies devoted to training configurations. In one embodiment the inferencing configuration of the GPGPU 1430 can support inferencing specific instructions. For example, an inferencing configuration can provide support for one or more 8-bit integer dot product instructions, which are commonly used during inferencing operations for deployed neural networks.

Machine Learning Overview

A machine learning algorithm is an algorithm that can learn based on a set of data. Embodiments of machine learning algorithms can be designed to model high-level abstractions within a data set. For example, image recognition algorithms can be used to determine which of several categories to which a given input belong; regression algorithms can output a numerical value given an input; and pattern recognition algorithms can be used to generate translated text or perform text to speech and/or speech recognition.

An exemplary type of machine learning algorithm is a neural network. There are many types of neural networks; a simple type of neural network is a feedforward network. A feedforward network may be implemented as an acyclic graph in which the nodes are arranged in layers. Typically, a feedforward network topology includes an input layer and an output layer that are separated by at least one hidden layer. The hidden layer transforms input received by the input layer into a representation that is useful for generating output in the output layer. The network nodes are fully connected via edges to the nodes in adjacent layers, but there are no edges between nodes within each layer. Data received at the nodes of an input layer of a feedforward network are propagated (i.e., "fed forward") to the nodes of the output layer via an activation function that calculates the states of the nodes of each successive layer in the network based on coefficients ("weights") respectively associated with each of the edges connecting the layers. Depending on the specific model being represented by the algorithm being executed, the output from the neural network algorithm can take various forms.

Before a machine learning algorithm can be used to model a particular problem, the algorithm is trained using a training data set. Training a neural network involves selecting a network topology, using a set of training data representing a problem being modeled by the network, and adjusting the weights until the network model performs with a minimal error for all instances of the training data set. For example, during a supervised learning training process for a neural network, the output produced by the network in response to the input representing an instance in a training data set is compared to the "correct" labeled output for that instance, an error signal representing the difference between the output and the labeled output is calculated, and the weights associated with the connections are adjusted to minimize that error as the error signal is backward propagated through the layers of the network. The network is considered "trained" when the errors for each of the outputs generated from the instances of the training data set are minimized.

The accuracy of a machine learning algorithm can be affected significantly by the quality of the data set used to train the algorithm. The training process can be computationally intensive and may require a significant amount of time on a conventional general-purpose processor. Accordingly, parallel processing hardware is used to train many types of machine learning algorithms. This is particularly useful for optimizing the training of neural networks, as the computations performed in adjusting the coefficients in neural networks lend themselves naturally to parallel implementations. Specifically, many machine learning algorithms and software applications have been adapted to make use of the parallel processing hardware within general-purpose graphics processing devices.

Figure 15:
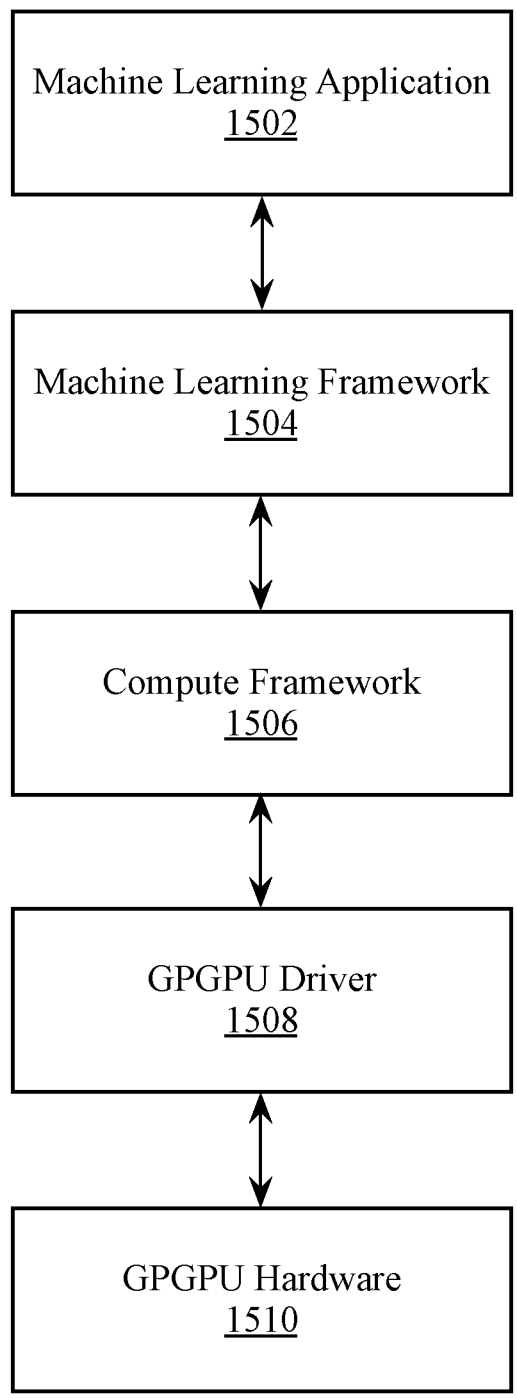
FIG. 15 illustrates a machine learning software stack, according to an embodiment.

FIG. 15 is a generalized diagram of a machine learning software stack 1500. A machine learning application 1502 can be configured to train a neural network using a training dataset or to use a trained deep neural network to implement machine intelligence. The machine learning application 1502 can include training and inference functionality for a neural network and/or specialized software that can be used to train a neural network before deployment. The machine learning application 1502 can implement any type of machine intelligence including but not limited to image recognition, mapping and localization, autonomous navigation, speech synthesis, medical imaging, or language translation.

Hardware acceleration for the machine learning application 1502 can be enabled via a machine learning framework 1504. The machine learning framework 1504 can provide a library of machine learning primitives. Machine learning primitives are basic operations that are commonly performed by machine learning algorithms. Without the machine learning framework 1504, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 1504. Exemplary primitives include tensor convolutions, activation functions, and pooling, which are computational operations that are performed while training a convolutional neural network (CNN). The machine learning framework 1504 can also provide primitives to implement basic linear algebra subprograms performed by many machine-learning algorithms, such as matrix and vector operations.

The machine learning framework 1504 can process input data received from the machine learning application 1502 and generate the appropriate input to a compute framework 1506. The compute framework 1506 can abstract the underlying instructions provided to the GPGPU driver 1508 to enable the machine learning framework 1504 to take advantage of hardware acceleration via the GPGPU hardware 1510 without requiring the machine learning framework 1504 to have intimate knowledge of the architecture of the GPGPU hardware 1510. Additionally, the compute framework 1506 can enable hardware acceleration for the machine learning framework 1504 across a variety of types and generations of the GPGPU hardware 1510.

Machine Learning Neural Network Implementations

The computing architecture provided by embodiments described herein can be configured to perform the types of parallel processing that is particularly suited for training and deploying neural networks for machine learning. A neural network can be generalized as a network of functions having a graph relationship. As is known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described below present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 16A:
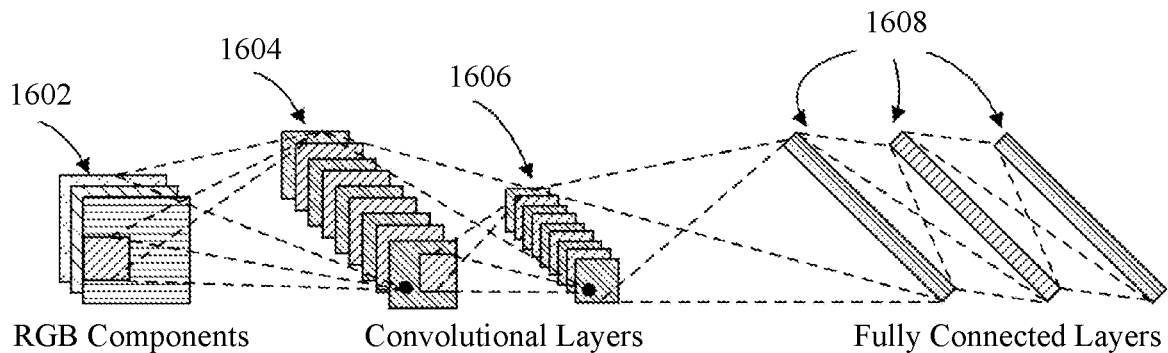
FIG. 16A-16B illustrate layers of exemplary deep neural networks.
Figure 16B:
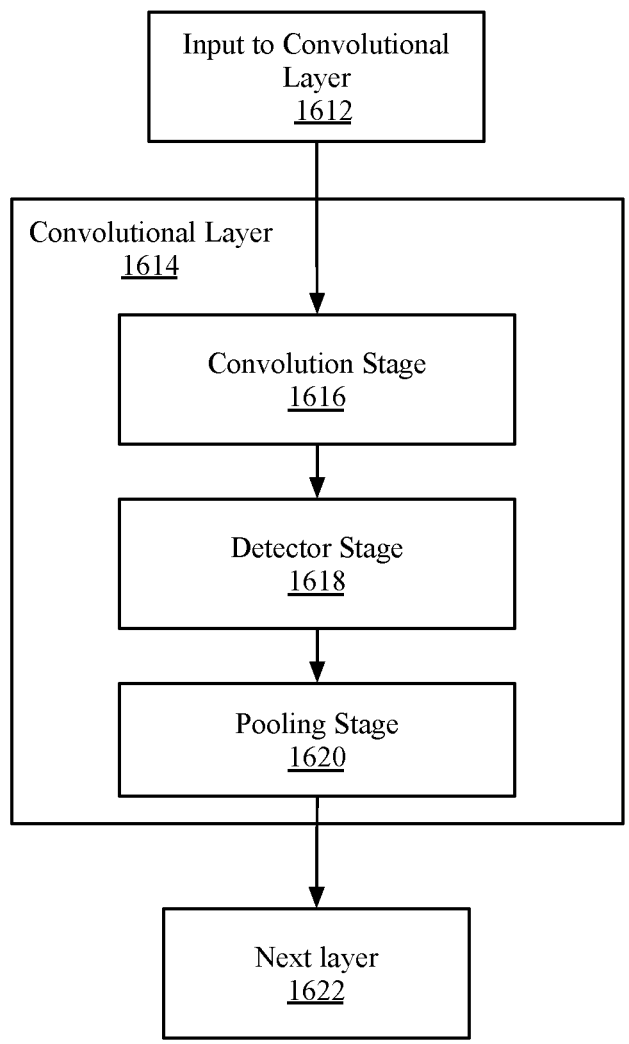

FIG. 16A-16B illustrate an exemplary convolutional neural network. FIG. 16A illustrates various layers within a CNN. As shown in FIG. 16A, an exemplary CNN used to model image processing can receive input 1602 describing the red, green, and blue (RGB) components of an input image. The input 1602 can be processed by multiple convolutional layers (e.g., first convolutional layer 1604, second convolutional layer 1606). The output from the multiple convolutional layers may optionally be processed by a set of fully connected layers 1608. Neurons in a fully connected layer have full connections to all activations in the previous layer, as previously described for a feedforward network. The output from the fully connected layers 1608 can be used to generate an output result from the network. The activations within the fully connected layers 1608 can be computed using matrix multiplication instead of convolution. Not all CNN implementations are configured to make use of fully connected layers 1608. For example, in some implementations the second convolutional layer 1606 can generate output for the CNN.

The convolutional layers are sparsely connected, which differs from traditional neural network configuration found in the fully connected layers 1608. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large images.

FIG. 16B illustrates exemplary computation stages within a convolutional layer of a CNN. Input to a convolutional layer 1612 of a CNN can be processed in three stages of a convolutional layer 1614. The three stages can include a convolution stage 1616, a detector stage 1618, and a pooling stage 1620. The convolutional layer 1614 can then output data to a successive convolutional layer. The final convolutional layer of the network can generate output feature map data or provide input to a fully connected layer, for example, to generate a classification value for the input to the CNN.

In the convolution stage 1616 performs several convolutions in parallel to produce a set of linear activations. The convolution stage 1616 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 1616 defines a set of linear activations that are processed by successive stages of the convolutional layer 1614.

The linear activations can be processed by a detector stage 1618. In the detector stage 1618, each linear activation is processed by a non-linear activation function. The non-linear activation function increases the nonlinear properties of the overall network without affecting the receptive fields of the convolution layer. Several types of non-linear activation functions may be used. One particular type is the rectified linear unit (ReLU), which uses an activation function defined as θ(x)=max(0, x), such that the activation is thresholded at zero.

The pooling stage 1620 uses a pooling function that replaces the output of the second convolutional layer 1606 with a summary statistic of the nearby outputs. The pooling function can be used to introduce translation invariance into the neural network, such that small translations to the input do not change the pooled outputs. Invariance to local translation can be useful in scenarios where the presence of a feature in the input data is more important than the precise location of the feature. Various types of pooling functions can be used during the pooling stage 1620, including max pooling, average pooling, and 12-norm pooling. Additionally, some CNN implementations do not include a pooling stage. Instead, such implementations substitute and additional convolution stage having an increased stride relative to previous convolution stages.

The output from the convolutional layer 1614 can then be processed by the next layer 1622. The next layer 1622 can be an additional convolutional layer or one of the fully connected layers 1608. For example, the first convolutional layer 1604 of FIG. 16A can output to the second convolutional layer 1606, while the second convolutional layer can output to a first layer of the fully connected layers 1608.

Figure 17:
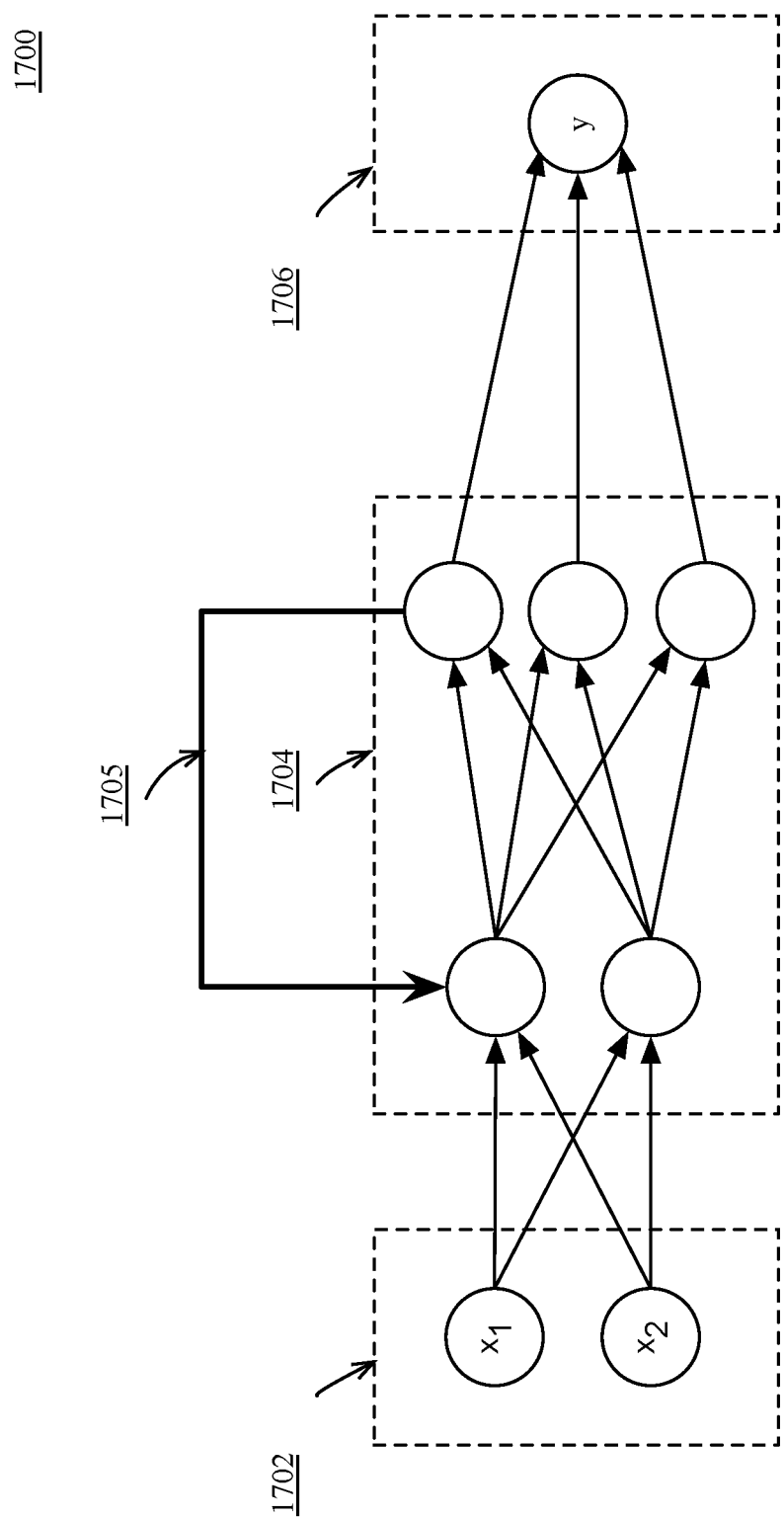
FIG. 17 illustrates an exemplary recurrent neural network.

FIG. 17 illustrates an exemplary recurrent neural network. In a recurrent neural network (RNN), the previous state of the network influences the output of the current state of the network. RNNs can be built in a variety of ways using a variety of functions. The use of RNNs generally revolves around using mathematical models to predict the future based on a prior sequence of inputs. For example, an RNN may be used to perform statistical language modeling to predict an upcoming word given a previous sequence of words. The illustrated RNN 1700 can be described as having an input layer 1702 that receives an input vector, hidden layers 1704 to implement a recurrent function, a feedback mechanism 1705 to enable a 'memory' of previous states, and an output layer 1706 to output a result. The RNN 1700 operates based on time-steps. The state of the RNN at a given time step is influenced based on the previous time step via the feedback mechanism 1705. For a given time step, the state of the hidden layers 1704 is defined by the previous state and the input at the current time step. An initial input ($x_1$) at a first time step can be processed by the hidden layer 1704. A second input ($x_2$) can be processed by the hidden layer 1704 using state information that is determined during the processing of the initial input ($x_1$). A given state can be computed as $s_t = f(Ux_t + Ws_{t-1})$, where U and W are parameter matrices. The function $f$ is generally a nonlinearity, such as the hyperbolic tangent function (Tanh) or a variant of the rectifier function $f(x)=\max(0, x)$. However, the specific mathematical function used in the hidden layers 1704 can vary depending on the specific implementation details of the RNN 1700.

In addition to the basic CNN and RNN networks described, variations on those networks may be enabled. One example RNN variant is the long short-term memory (LSTM) RNN. LSTM RNNs are capable of learning long-term dependencies that may be necessary for processing longer sequences of language. A variant on the CNN is a convolutional deep belief network, which has a structure similar to a CNN and is trained in a manner similar to a deep belief network. A deep belief network (DBN) is a generative neural network that is composed of multiple layers of stochastic (random) variables. DBNs can be trained layer-by-layer using greedy unsupervised learning. The learned weights of the DBN can then be used to provide pre-train neural networks by determining an optimal initial set of weights for the neural network.

Figure 18:
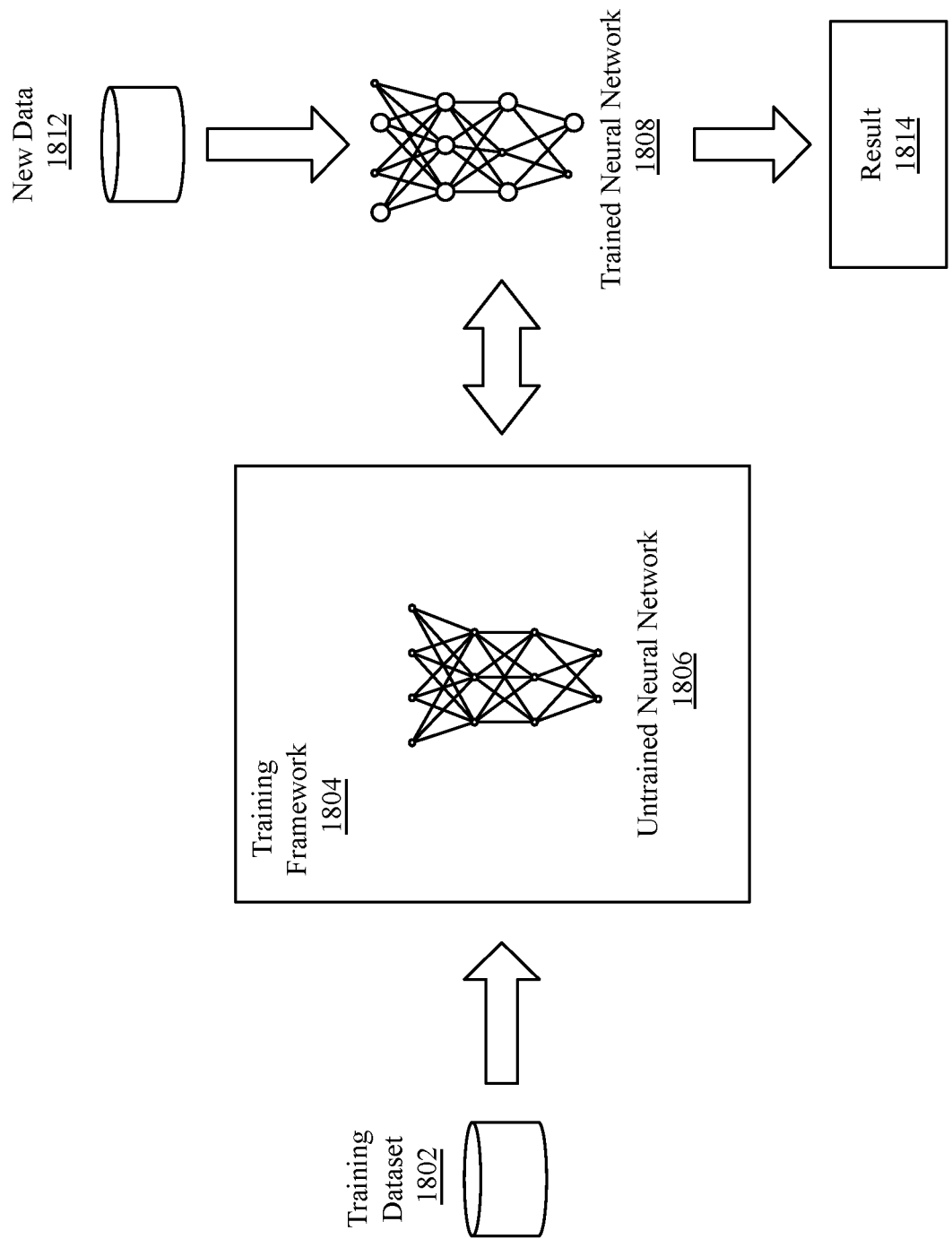
FIG. 18 illustrates training and deployment of a deep neural network.

FIG. 18 illustrates training and deployment of a deep neural network. Once a given network has been structured for a task the neural network is trained using a training dataset 1802. Various training frameworks have been developed to enable hardware acceleration of the training process. For example, the machine learning framework 1504 of FIG. 15 may be configured as a training framework 1804. The training framework 1804 can hook into an untrained neural network 1806 and enable the untrained neural net to be trained using the parallel processing resources described herein to generate a trained neural network 1808. To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 1802 includes input paired with the desired output for the input, or where the training dataset includes input having known output and the output of the neural network is manually graded. The network processes the inputs and compares the resulting outputs against a set of expected or desired outputs. Errors are then propagated back through the system. The training framework 1804 can adjust to adjust the weights that control the untrained neural network 1806. The training framework 1804 can provide tools to monitor how well the untrained neural network 1806 is converging towards a model suitable to generating correct answers based on known input data. The training process occurs repeatedly as the weights of the network are adjusted to refine the output generated by the neural network. The training process can continue until the neural network reaches a statistically desired accuracy associated with a trained neural network 1808. The trained neural network 1808 can then be deployed to implement any number of machine learning operations.

Unsupervised learning is a learning method in which the network attempts to train itself using unlabeled data. Thus, for unsupervised learning the training dataset 1802 will include input data without any associated output data. The untrained neural network 1806 can learn groupings within the unlabeled input and can determine how individual inputs are related to the overall dataset. Unsupervised training can be used to generate a self-organizing map, which is a type of trained neural network 1807 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 1802 includes a mix of labeled and unlabeled data of the same distribution. Incremental learning is a variant of supervised learning in which input data is continuously used to further train the model. Incremental learning enables the trained neural network 1808 to adapt to the new data 1812 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.

Figure 19:
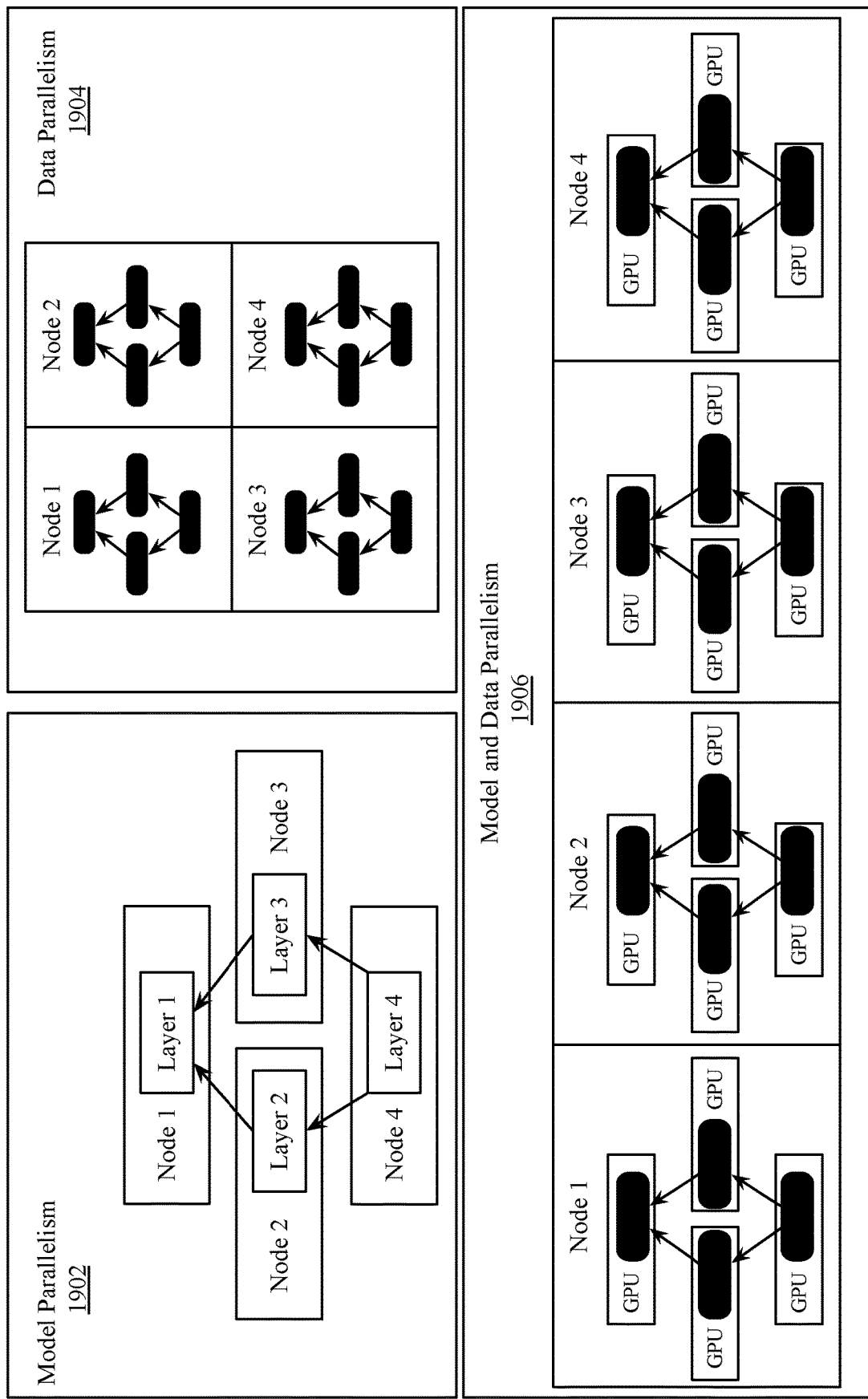
FIG. 19 is a block diagram illustrating distributed learning.

FIG. 19 is a block diagram illustrating distributed learning. Distributed learning is a training model that uses multiple distributed computing nodes to perform supervised or unsupervised training of a neural network. The distributed computational nodes can each include one or more host processors and one or more of the general-purpose processing nodes. As illustrated, distributed learning can be performed model parallelism 1902, data parallelism 1904, or a combination of model and data parallelism 1904.

In model parallelism 1902, different computational nodes in a distributed system can perform training computations for different parts of a single network. For example, each layer of a neural network can be trained by a different processing node of the distributed system. The benefits of model parallelism include the ability to scale to particularly large models. Splitting the computations associated with different layers of the neural network enables the training of very large neural networks in which the weights of all layers would not fit into the memory of a single computational node. In some instances, model parallelism can be particularly useful in performing unsupervised training of large neural networks.

In data parallelism 1904, the different nodes of the distributed network have a complete instance of the model and each node receives a different portion of the data. The results from the different nodes are then combined. While different approaches to data parallelism are possible, data parallel training approaches all require a technique of combining results and synchronizing the model parameters between each node. Exemplary approaches to combining data include parameter averaging and update based data parallelism. Parameter averaging trains each node on a subset of the training data and sets the global parameters (e.g., weights, biases) to the average of the parameters from each node. Parameter averaging uses a central parameter server that maintains the parameter data. Update based data parallelism is similar to parameter averaging except that instead of transferring parameters from the nodes to the parameter server, the updates to the model are transferred. Additionally, update based data parallelism can be performed in a decentralized manner, where the updates are compressed and transferred between nodes.

Combined model and data parallelism 1906 can be implemented, for example, in a distributed system in which each computational node includes multiple GPUs. Each node can have a complete instance of the model with separate GPUs within each node are used to train different portions of the model.

Distributed training has increased overhead relative to training on a single machine. However, the parallel processors and GPGPUs described herein can each implement various techniques to reduce the overhead of distributed training, including techniques to enable high bandwidth GPU-to-GPU data transfer and accelerated remote data synchronization.

Exemplary Machine Learning Applications

Machine learning can be applied to solve a variety of technological problems, including but not limited to computer vision, autonomous driving and navigation, speech recognition, and language processing. Computer vision has traditionally been one of the most active research areas for machine learning applications. Applications of computer vision range from reproducing human visual abilities, such as recognizing faces, to creating new categories of visual abilities. For example, computer vision applications can be configured to recognize sound waves from the vibrations induced in objects visible in a video. Parallel processor accelerated machine learning enables computer vision applications to be trained using significantly larger training dataset than previously feasible and enables inferencing systems to be deployed using low power parallel processors.

Parallel processor accelerated machine learning has autonomous driving applications including lane and road sign recognition, obstacle avoidance, navigation, and driving control. Accelerated machine learning techniques can be used to train driving models based on datasets that define the appropriate responses to specific training input. The parallel processors described herein can enable rapid training of the increasingly complex neural networks used for autonomous driving solutions and enables the deployment of low power inferencing processors in a mobile platform suitable for integration into autonomous vehicles.

Parallel processor accelerated deep neural networks have enabled machine learning approaches to automatic speech recognition (ASR). ASR includes the creation of a function that computes the most probable linguistic sequence given an input acoustic sequence. Accelerated machine learning using deep neural networks have enabled the replacement of the hidden Markov models (HMIs) and Gaussian mixture models (GMMs) previously used for ASR.

Parallel processor accelerated machine learning can also be used to accelerate natural language processing. Automatic learning procedures can make use of statistical inference algorithms to produce models that are robust to erroneous or unfamiliar input. Exemplary natural language processor applications include automatic machine translation between human languages.

The parallel processing platforms used for machine learning can be divided into training platforms and deployment platforms. Training platforms are generally highly parallel and include optimizations to accelerate multi-GPU single node training and multi-node, multi-GPU training, while deployed machine learning (e.g., inferencing) platforms generally include lower power parallel processors suitable for use in products such as cameras, autonomous robots, and autonomous vehicles.

Neural networks (NNs) are graphs. Traditional NNs follow certain types of graph structures (i.e., graphs organized as perfectly layered nodes, with edges connecting across these layers). However, graph structures of newer NNs are becoming more arbitrary and irregular. For example, in inference, starting from a traditional neural network graphs, a tool, may compile/re-factor the graph to transform it into a much more irregular arbitrary graph, which is optimized such that is contains much fewer operations than the original graph.

However, unlike the original graph, this optimized irregular graph may no longer be straightforwardly mappable into a regular sequence of matrix operations. Another example is for neural networks that are used on datasets that are themselves graphs (e.g., social network graph, knowledge graph, etc.).

The present design provides an enhanced sparse matrix accelerator to handle arbitrary connections across any layer, not just connections to neighbor layers. In one example, smaller graphs (e.g., up to 100 Megabytes of data storage) are handled on-chip with computing resources. In another example, larger graphs (e.g., more than 100 Megabytes of data storage) are handled off-chip.

Figure 20A:
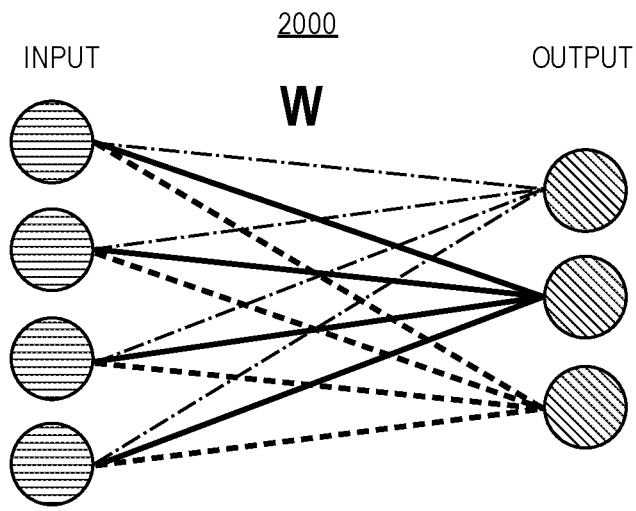
FIG. 20A illustrates an exemplary regular neural network.

FIG. 20A illustrates an exemplary regular neural network. Each input or blocks of inputs connect to each output of the neural network 2000. Connections are formed between neighboring layers of the NN. Weights (W) of the NN are adjusted to refine the output generated by the neural network.

Figure 20B:
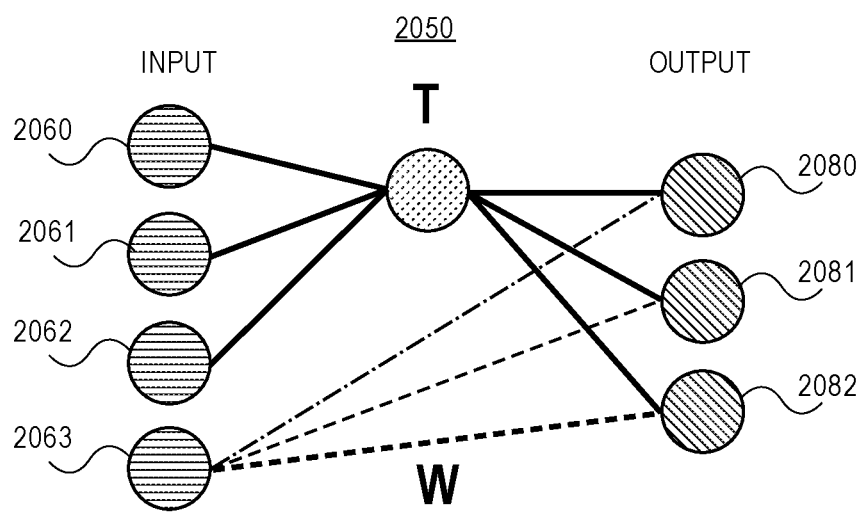
FIG. 20B illustrates an exemplary arbitrary (or irregular) neural network, according to an embodiment.

FIG. 20B illustrates an exemplary arbitrary (or irregular) neural network, according to an embodiment. An arbitrary set of inputs or blocks of inputs (e.g., input 2063) connects to outputs 2080-2082 of the neural network 2000. Other inputs (e.g., inputs 2060-2062) connect to a temporary node (T) that connects to the outputs 2080-2082. Weights (W) of the network are adjusted to refine the output generated by the neural network.

The arbitrary NN allows customization especially for inference. Refactoring causes repeated patterns in binary and ternary nets to be removed. The present design is able to efficiently process arbitrary neural networks including irregular or regular graphs.

Figure 21A:
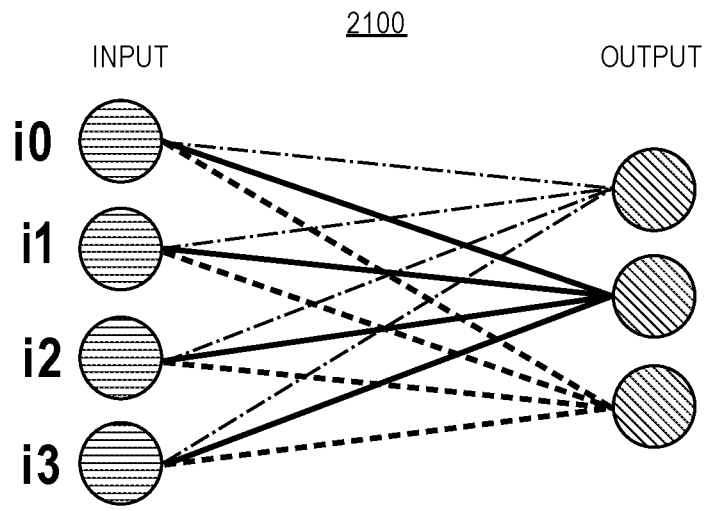
FIG. 21A illustrates an exemplary regular neural network.

FIG. 21A illustrates an exemplary regular neural network. Each input or blocks of inputs (e.g., i0, i1, i2, i3) connect to each output of the neural network 2100. Connections are formed between neighboring layers of the NN. Weights (W) of the NN are adjusted to refine the output generated by the neural network. In this example, 12 edges connect across these 12 connections and result in 12 instructions for a processing mechanism.

Figure 21B:
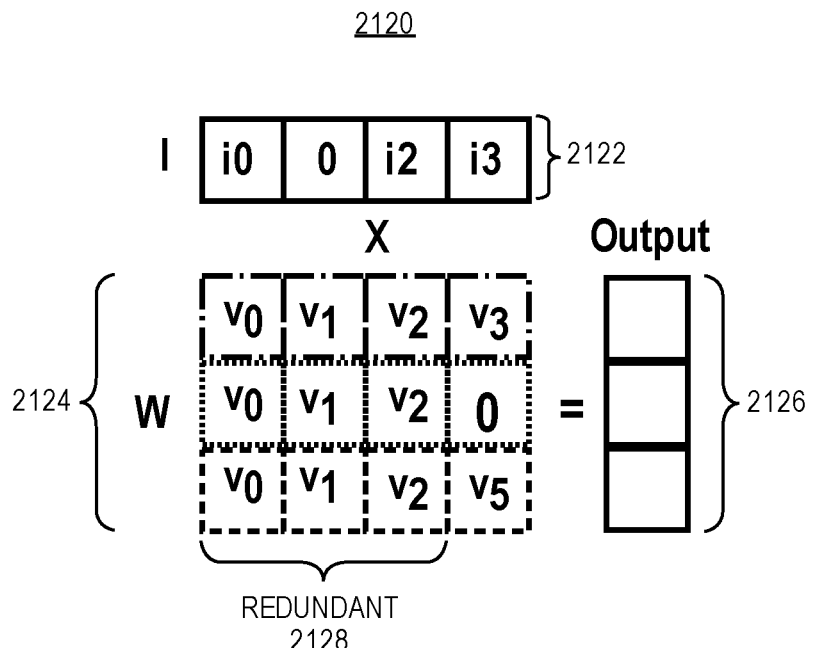
FIG. 21B illustrates an exemplary matrix multiplication operation of a neural network, in accordance with an embodiment.

FIG. 21B illustrates an exemplary matrix multiplication operation 2120 of the NN 2100, in accordance with an embodiment. An input matrix 2122 having input or blocks of inputs (e.g., i0, i1=0, i2, i3) is multiplied with a matrix 2124 having weighted values (e.g., v0, v1, v2, v3) to generate an output matrix 2126. The columns 2128 of the matrix 2124 have redundant values v0, v1, v2. Activation (inputs) and weights can be sparse in terms of having zero values or unimportant values.

Figure 21C:
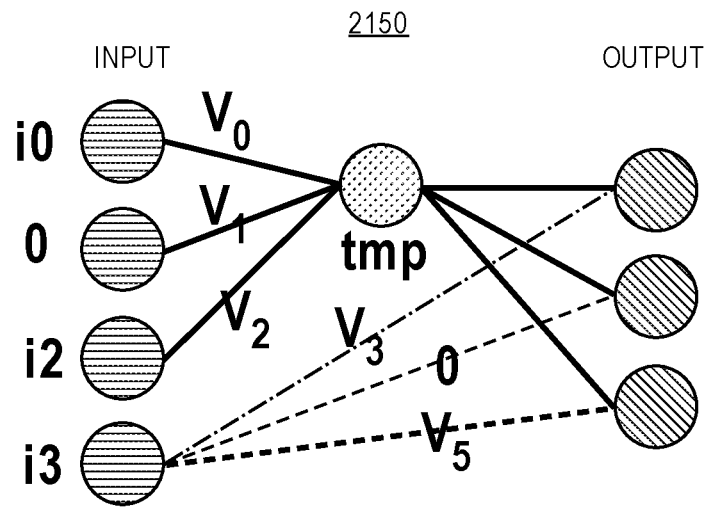
FIG. 21C illustrates an exemplary arbitrary (or irregular) neural network, according to an embodiment.

FIG. 21C illustrates an exemplary arbitrary (or irregular) neural network, according to an embodiment. An arbitrary set of inputs or blocks of inputs (e.g., input i3) connects to outputs of the neural network (NN 2150). Other inputs (e.g., inputs i0, i1=0, i2, i3) connect to a temporary node (T) that connects to the outputs. Weights (W) of the network are adjusted to refine the output generated by the neural network. In this example, the temporary node shares redundant weights to reduce the 12 instructions of NN 2100 to being only 8 instructions for NN 2150 such that 8 edges connect across 8 connections and result in 8 instructions for a processing mechanism.

Figure 21D:
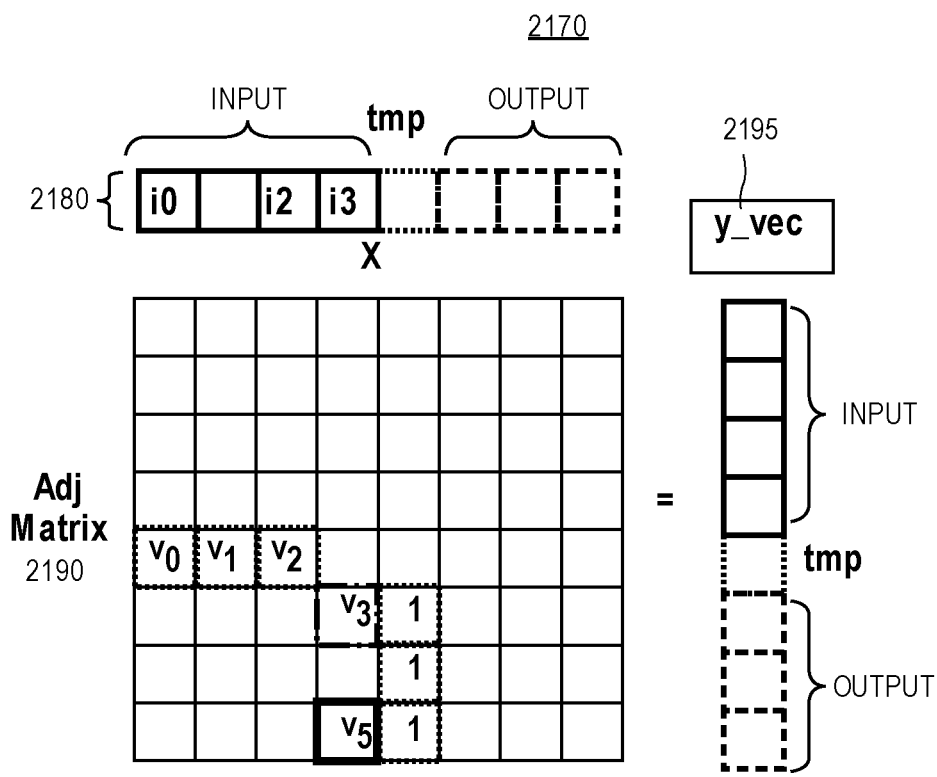
FIG. 21D illustrates an exemplary matrix multiplication operation of the neural network, in accordance with an embodiment.

FIG. 21D illustrates an exemplary matrix multiplication operation 2170 of the NN 2150, in accordance with an embodiment. A vector 2180 having input or blocks of inputs (e.g., i0, i1=0, i2, i3), temporary node, and outputs is multiplied with an adjacency matrix 2190 having weighted values (e.g., v0, v1, v2, v3, v5) to generate a vector 2195 having input, temporary node, and outputs. The adjacency matrix 2190 is generated with a classic reformulation. The matrix 2190 is sparse and irregular (e.g., approximately 12% non-zero values) for this example.

Figure 22A:
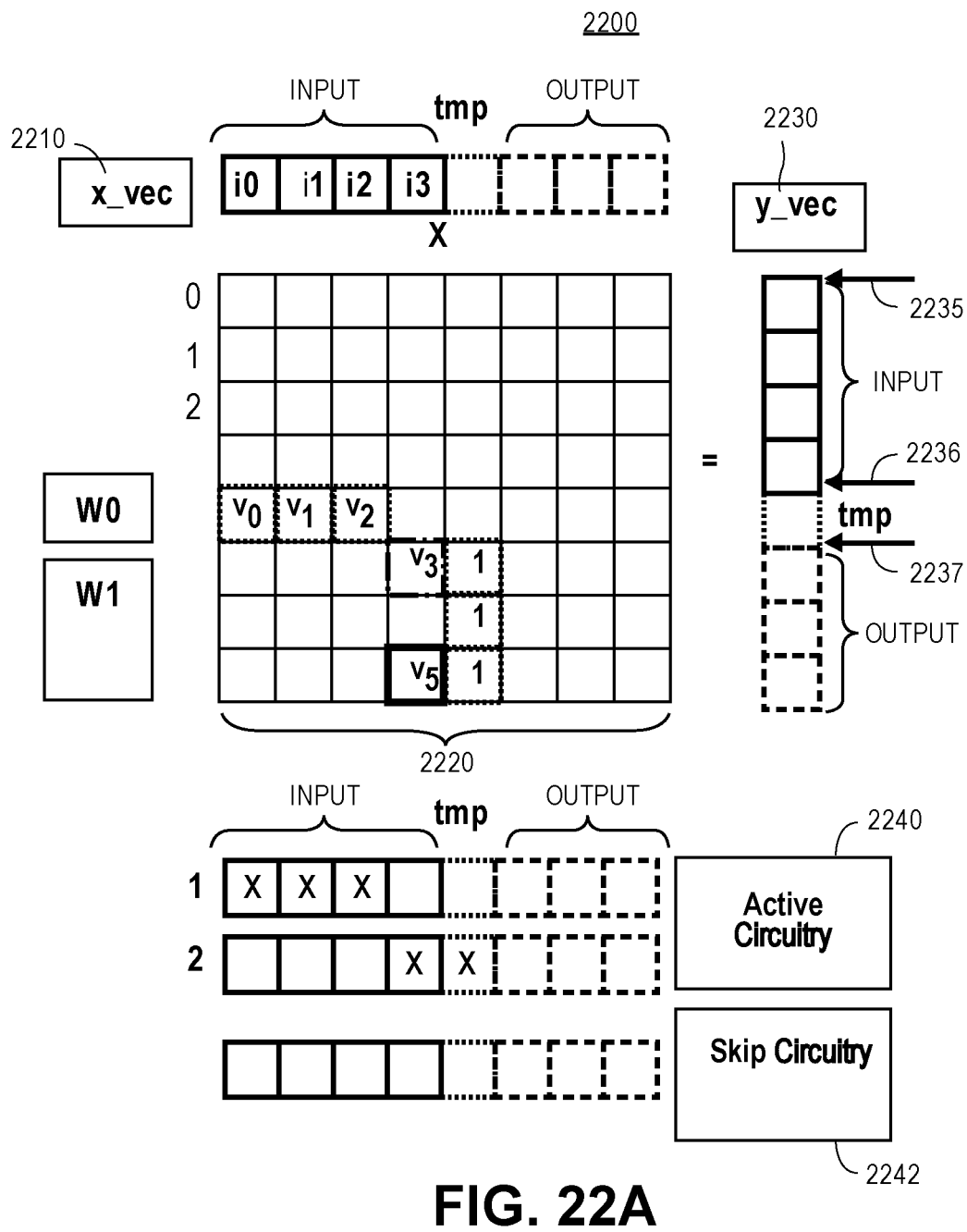
FIG. 22A illustrates an exemplary matrix multiplication operation of the NN, in accordance with an embodiment.

FIG. 22A illustrates an exemplary matrix multiplication operation 2200 of the NN 2150, in accordance with an embodiment. An x vector 2210 includes input or blocks of inputs (e.g., i0, i2, i3), temporary node, and outputs. A y vector 2230 includes input or blocks of inputs (e.g., i0, i2, i3), temporary node, and outputs. An adjacency matrix 2220 is a square matrix used to represent a finite graph. Elements of the matrix indicate whether pairs of vertices are adjacent to each other or not. Weighted values (e.g., W0, W1) are applied to inputs. Each x, y base pointer (e.g., 2235-2237) points to a memory address and indicates a beginning of a region of they vector 2230. The adjacency matrix 2220 is generated with a classic reformulation. The matrix 2220 is sparse and irregular (e.g., approximately 12% non-zero values) for this example. Active logic 2240 (or active circuitry 2240) includes active x elements (e.g., non-zero operands, important operands) for subsets of a graph. A skip logic 2242 (or skip circuitry 2242) dynamically tracks zero values and unimportant values (e.g., zero value operands, unimportant operands) to skip or ignore.

Figure 22B:
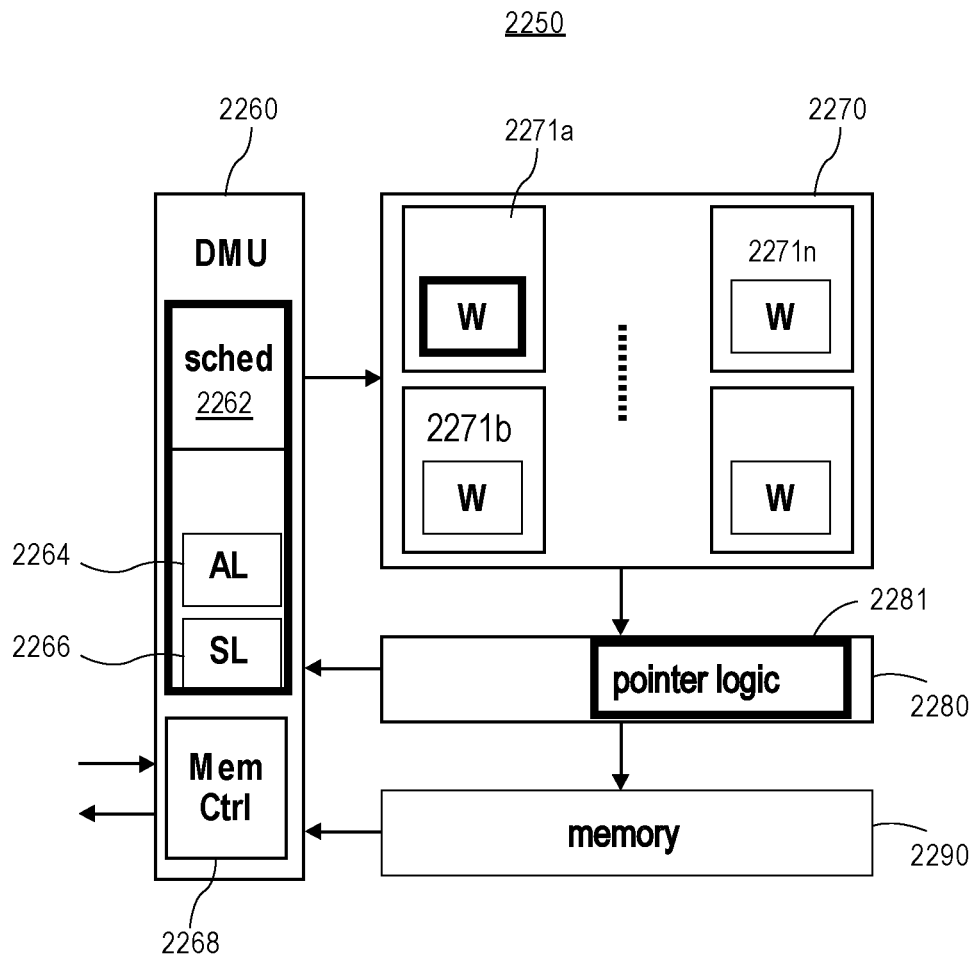
FIG. 22B illustrates an exemplary enhanced sparse matrix accelerator, in accordance with an embodiment.

FIG. 22B illustrates an exemplary enhanced sparse matrix accelerator 2250, in accordance with an embodiment. The accelerator 2250 includes a data management unit 2260 (DMU), processing element (PE) circuitry 2270 for processing elements 2271 (e.g., 2271a, 2271b, . . . , 2271n) for processing operations, a memory 2280 having pointer logic 2281 for storing x, y base pointers, and memory 2290 for storing data (e.g., x, y vectors). The DMU 2260 includes a scheduler 2262 for scheduling operations (e.g., matrix operations, vector operations), an active logic 2264 (or active circuitry 2264), and a skip logic 2266 (or skip circuitry 2266).

Figure 23:
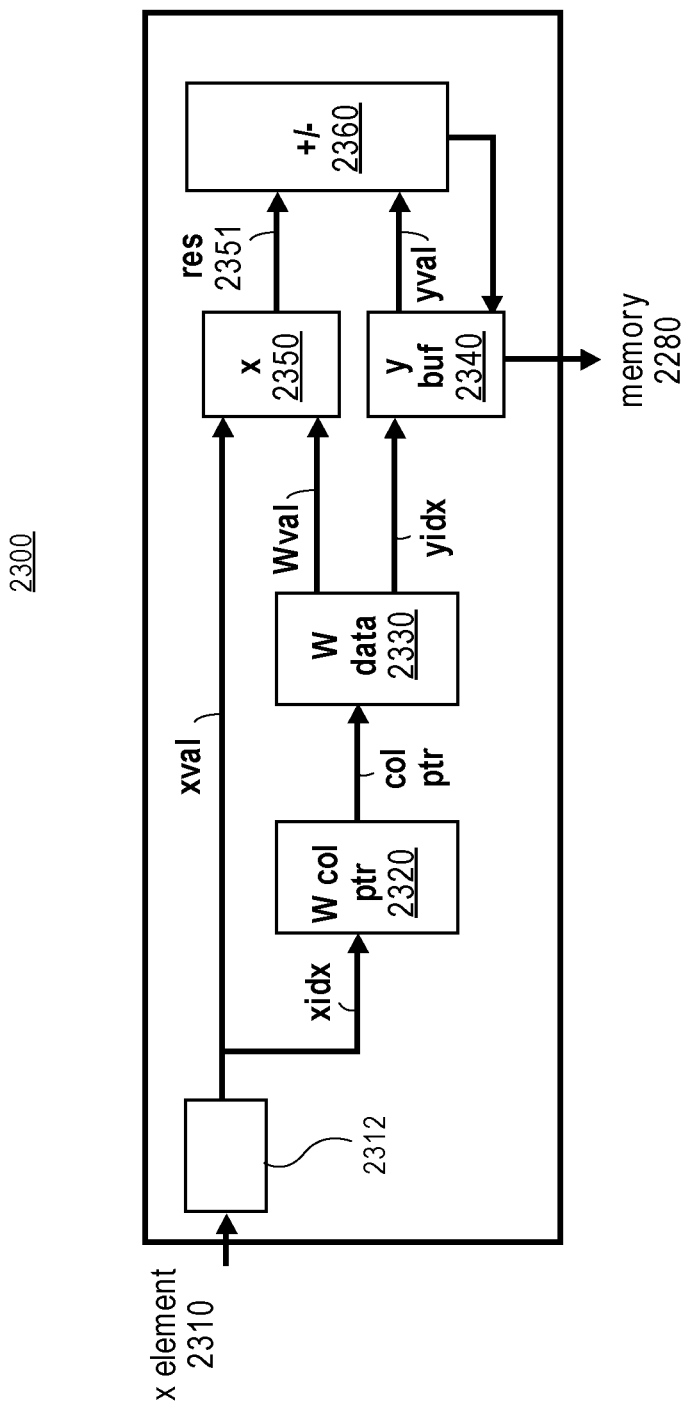
FIG. 23 illustrates a detailed view of an exemplary PE circuitry, in accordance with an embodiment.

FIG. 23 illustrates a detailed view of an exemplary PE circuitry 2300, in accordance with an embodiment. The PE circuitry 2300 (e.g., circuitry 2271 of FIG. 22B) includes logic 2312 (e.g., input buffer, unpack unit), W column pointer logic 2320, W data logic 2330, logic 2350, y buffer 2340, and logic 2360 (e.g., accumulator). In one example, the circuitry 2300 receives an x element 2310 as an input for logic 2312 that generates an x value that is sent to logic 2350 (e.g., multiplier 2350, multiplication unit 2350) while an identifier of a memory address or position of an x vector (e.g., x index (xidx) to identify i0, i1, i2, etc.) is sent to W column pointer 2320. A column pointer to a memory address of a weighted coefficient of matrix 2220 is generated and sent to W data 2330. The W data 2330 generates and sends a weighted coefficient value (Wval) that is identified by the column pointer to logic 2350. The W data 2330 also sends an identifier of a memory address or a position of the y vector (e.g., y index (yidx) to indicate a row of y vector) to the y buffer 2340. In one example, the logic 2350 multiplies the x value by a corresponding W coefficient value (weighted value) and generates result 2351 that is sent to logic 2360. They buffer sends a y value to logic 2360 (e.g., accumulator circuit 2360). The logic 2360 may be an accumulator to update y values of the y vector based on the results received from logic 2350. The y buffer receives the output from the logic 2360 and sends the output to memory 2280 of FIG. 22B.

Figure 24A:
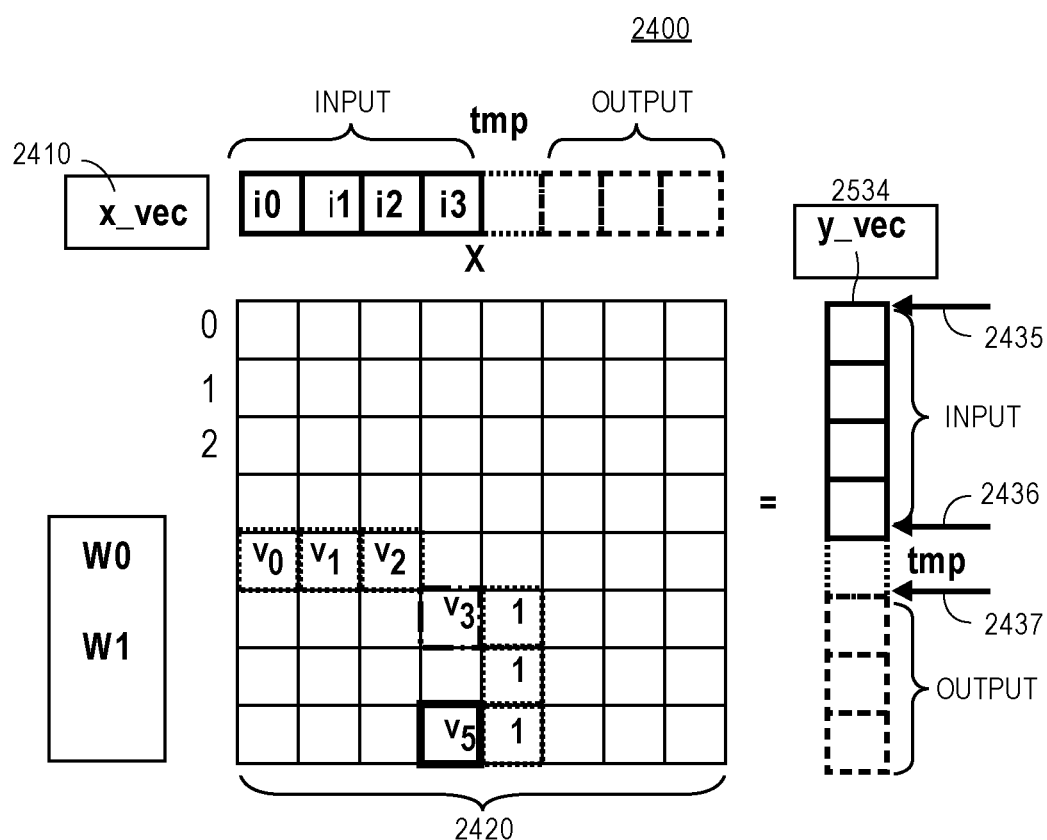
FIGS. 24A-24C illustrate an example of operations performed with an enhanced sparse matrix accelerator, according to an embodiment.
Figure 24B:
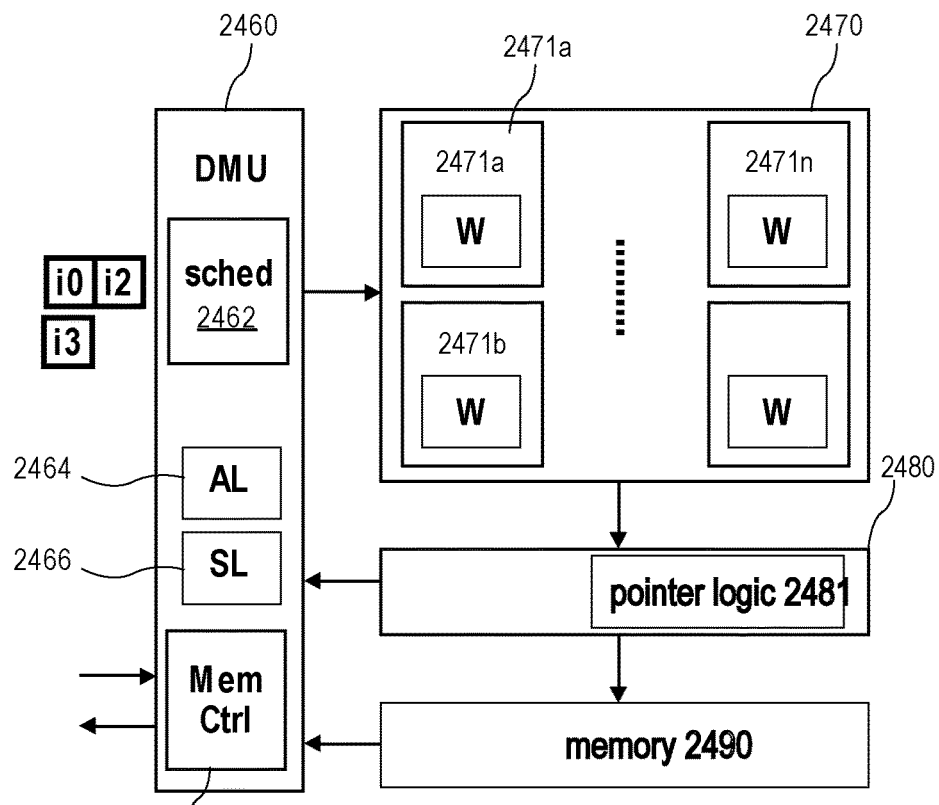
Figure 24C:
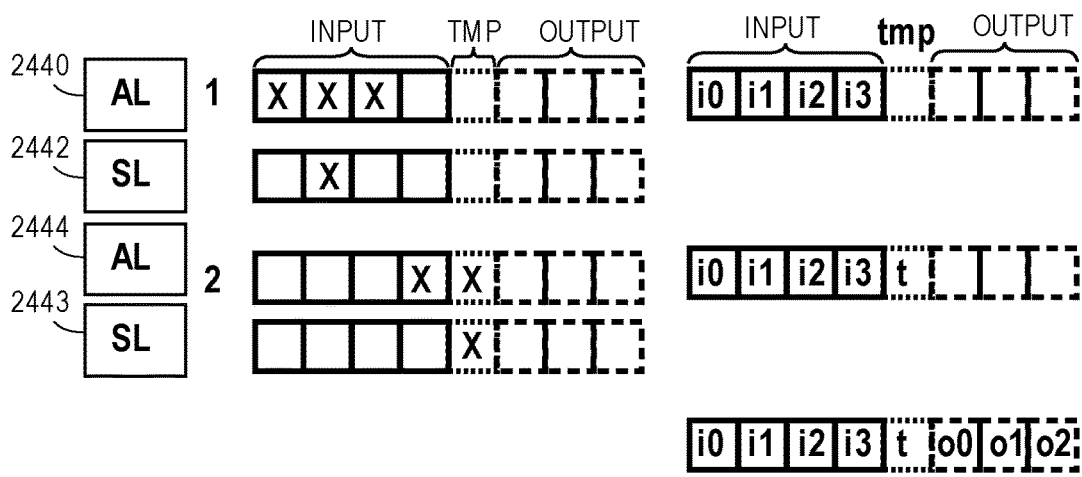

FIGS. 24A-24C illustrate an example of operations performed with an enhanced sparse matrix accelerator, according to an embodiment. FIG. 24A illustrates an exemplary matrix multiplication operation of a NN (e.g., NN 2150), in accordance with an embodiment. An x vector 2410 includes input or blocks of inputs (e.g., i0, i1, i2, i3), temporary node, and outputs. A y vector 2430 includes input or blocks of inputs (e.g., i0, i1, i2, i3), temporary node, and outputs. An adjacency matrix 2420 is a square matrix used to represent a finite graph. Elements of the matrix indicate whether pairs of vertices are adjacent to each other or not. Weighted values (e.g., W0, W1) are applied to inputs. The adjacency matrix 2420 is generated with a classic reformulation. The matrix 2420 is sparse and irregular (e.g., approximately 12% non-zero values) for this example. FIG. 24B illustrates active logic 2440 and 2441 that include active x elements (e.g., non-zero operands, important operands) for subsets of a graph. Skip logic 2442 and 2443 dynamically track zero values and unimportant values (e.g., zero value operands, unimportant operands) to skip or ignore.

FIG. 24C illustrates an exemplary enhanced sparse matrix accelerator 2450, in accordance with an embodiment. The accelerator 2450 includes a data management unit 2460 (DMU), PE circuitry 2470 for processing elements 2471 (e.g., 2471a, 2471b, ... 2471n) having weighted values (W) for matrices, a memory 2480 having pointer logic 2481, and memory 2490 for storing data (e.g., xy vectors). The DMU 2460 includes a scheduler 2462 for scheduling matrix operations, an active logic 2464, a skip logic 2466, and a memory controller 2468 for accessing different components (e.g., 2464, 2466, 2470, 2480, 2490) of the accelerator 2450 and other components that are coupled to the memory controller.

In one example, input i1 has a zero value that is tracked by skip logic 2466, 2442, and thus skipped by scheduler 2462 for scheduling of arithmetic operations.

In another example, temporary node has a zero value that is tracked by skip logic 2466, 2443, and thus skipped by scheduler 2462 for scheduling of arithmetic operations.

Figure 25A:
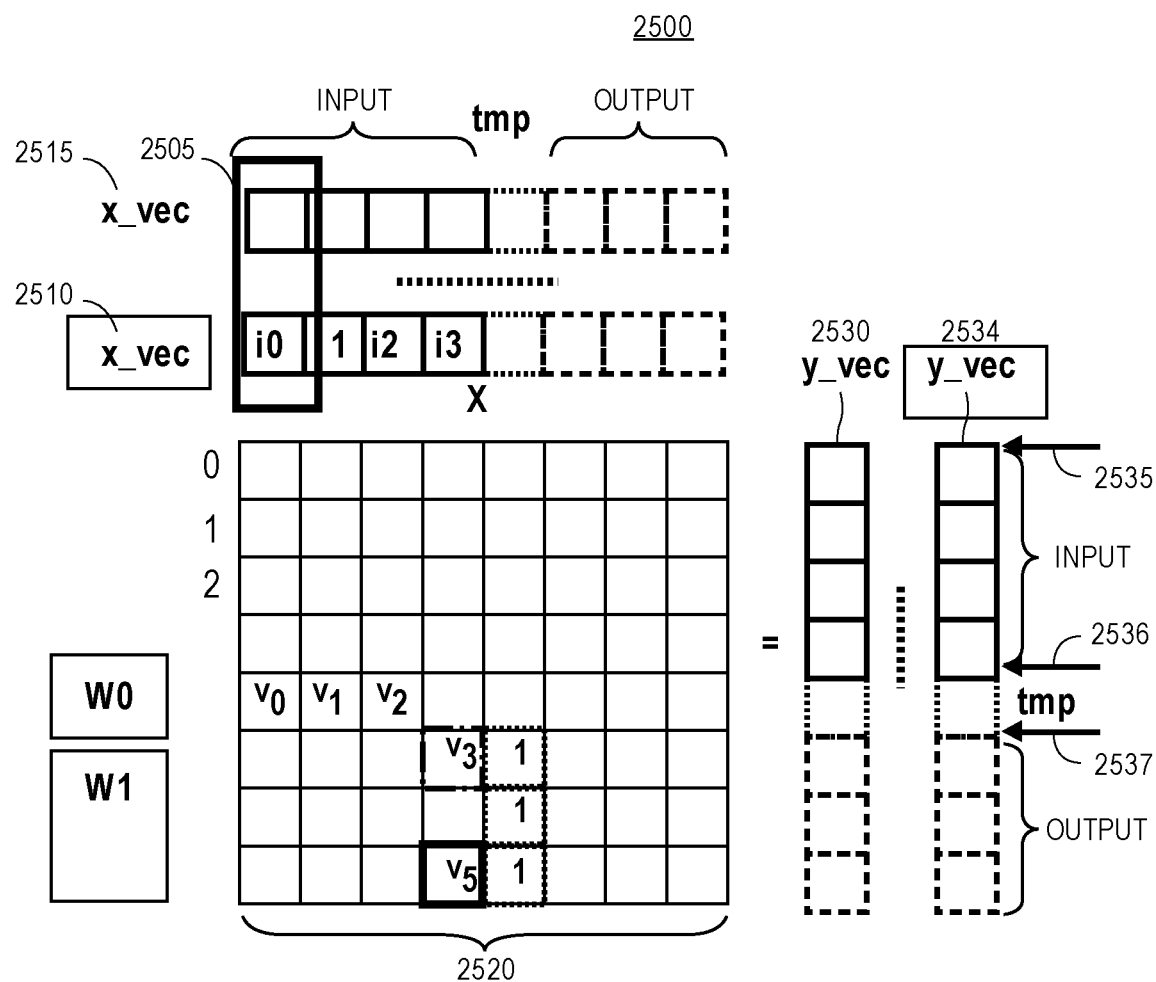
FIGS. 25A-25B illustrate an example of optimizing operations performed with an enhanced sparse matrix accelerator by concurrently processing multiple input vectors, in accordance with an embodiment.
Figure 25B:
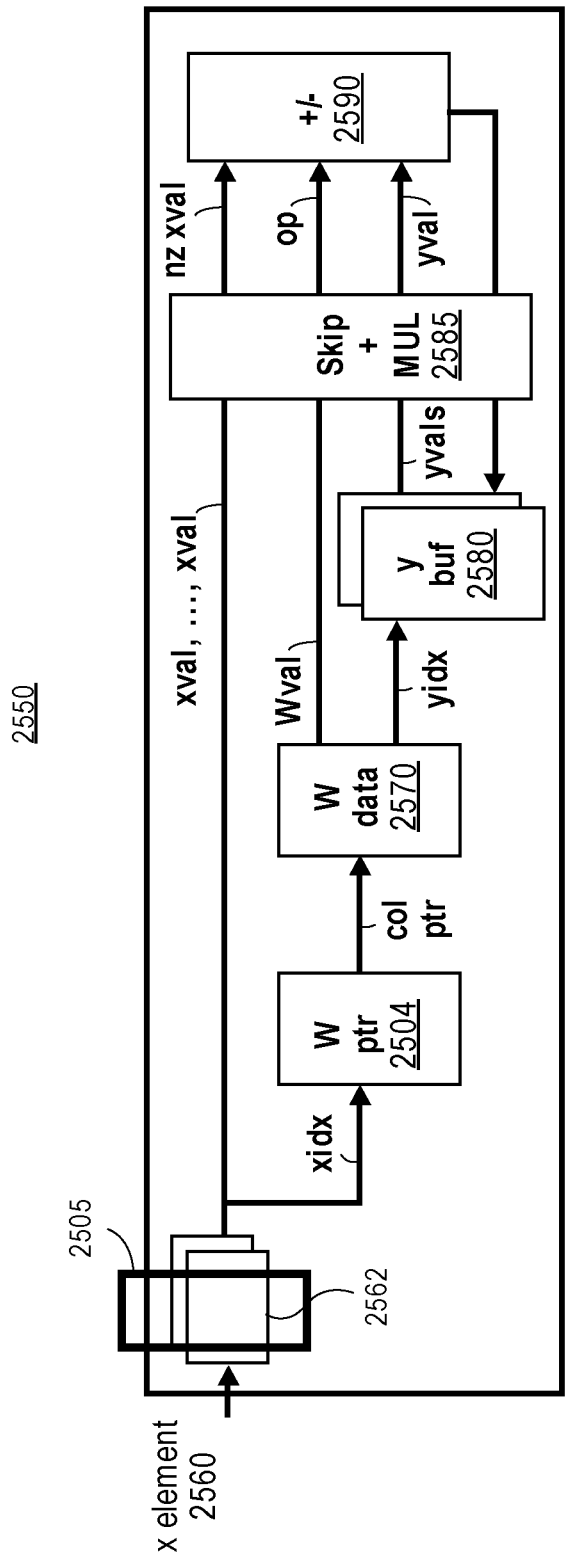

FIGS. 25A-25B illustrate an example of optimizing operations performed with an enhanced sparse matrix accelerator by concurrently processing multiple input vectors, in accordance with an embodiment. FIG. 25A illustrates an exemplary matrix multiplication operation of a NN, in accordance with an embodiment. Each x vector (e.g., 2510 ... 2515) includes input or blocks of inputs (e.g., i0, i1, i2, i3), temporary node, and outputs. Inputs of different x vectors can be processed or packed together as illustrated with i0 values 2505 in FIGS. 25A-25B. Each y vector (e.g., 2530 ... 2534) includes input or blocks of inputs (e.g., i0, i1, i2, i3), temporary node, and outputs. Elements of the adjacency matrix 2520 indicate whether pairs of vertices are adjacent to each other or not. Weighted values (e.g., W0, W1) are applied to inputs. The matrix 2520 is sparse and irregular (e.g., approximately 12% non-zero values) for this example.

FIG. 25B illustrates a detailed view of an exemplary circuitry 2550 for concurrently processing multiple input vectors, in accordance with an embodiment. The PE circuitry 2550 (e.g., PE 2271 of FIG. 22B) includes logic 2562 (e.g., input buffer, unpack unit) for receiving x elements of different x vectors (e.g., 2510 ... 2515), W column pointer logic 2564, W data logic 2570, logic 2585, y buffer 2580, and logic 2590. In one example, the circuitry 2550 receives an x element 2560 as an input for logic 2562 that generates x values sent to logic 2585 (e.g., multiplier 2585, multiplication unit 2585) while an identifier of a memory address or position of a x vector (e.g., x index) is sent to W column pointer 2564. A column pointer to a memory address of a weighted coefficient of matrix 2520 is generated and sent to W data 2570. The W data 2570 generates and sends a weighted coefficient value (Wval) that is identified by the column pointer to logic 2585. The W data 2570 also sends an identifier of a memory address or a position of they vector (e.g., y index to indicate a row of y vector) to the y buffer 2580. In one example, the logic 2585 has skipping capabilities (e.g., skipping unimportant or zero value operands) and multiplication functionality for received inputs. The logic 2585 generates outputs values (e.g., nz x values, y values) and instructions sent to the logic 2590. The y buffer sends y values to logic 2585. In one example, the logic 2585 multiplies the x value by a corresponding W coefficient value (weighted value). The y buffer 2580 sends y values to logic 2590. The logic 2590 may be an accumulator to update y values of the y vector based on output received from logic 2585. The y buffer receives the output from the logic 2590 and sends the output to memory 2280 of FIG. 22B.

Figure 26:
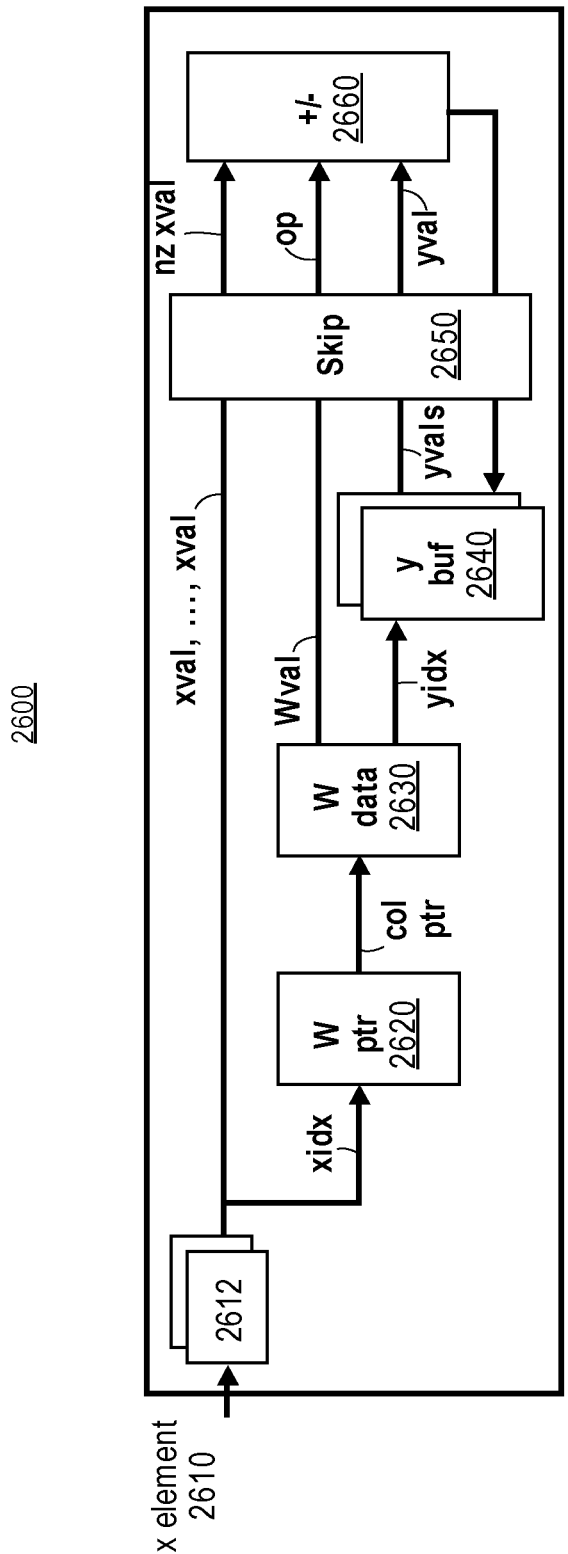
FIG. 26 illustrates a detailed view of an exemplary circuitry for concurrently processing multiple input vectors, in accordance with an embodiment.

FIG. 26 illustrates a detailed view of an exemplary circuitry 2600 for concurrently processing multiple input vectors, in accordance with an embodiment. The circuitry 2600 is similar to the circuitry 2550 (e.g., circuitry 2271 of FIG. 22B) except that the multiplication functionality has been removed from logic 2650. Circuitry 2600 includes logic 2612 (e.g., input buffer, unpack unit) for receiving x elements of different x vectors (e.g., 2510 ... 2515), W column pointer logic 2620, W data logic 2630, logic 2650, y buffer 2640, and logic 2660 for arithmetic operations. In one example, the circuitry 2600 receives x elements 2610 as input for logic 2612 that generates x values sent to logic 2650 while an identifier of a memory address or position of x vector (e.g., x index) is sent to W column pointer 2620. A column pointer to a memory address of a weighted coefficient of matrix 2520 is generated and sent to W data 2630. The W data 2630 generates and sends a weighted coefficient value (Wval) that is identified by the column pointer to logic 2650. The W data 2630 generates and sends a weighted value (Wval, ternary weights of 1, 0, −1, and binary weights of 1, −1, etc.) to logic 2650. The W data 2630 also sends an identifier of a memory address or a position of the y vector (e.g., y index to indicate a row of y vector) to the y buffer 2640. The logic 2650 has skipping capabilities (e.g., skipping zero value operands, skipping unimportant operands) for received inputs. The logic 2650 generates outputs values (e.g., nz x values, y values) and instructions (e.g., op) sent to the logic 2660. The y buffer sends y values to logic 2650. The logic 2660 may be an accumulator to update y values of the y vector based on output received from logic 2650. The y buffer receives the output from the logic 2650 and sends the output to memory 2280 of FIG. 22B.

Figure 27:
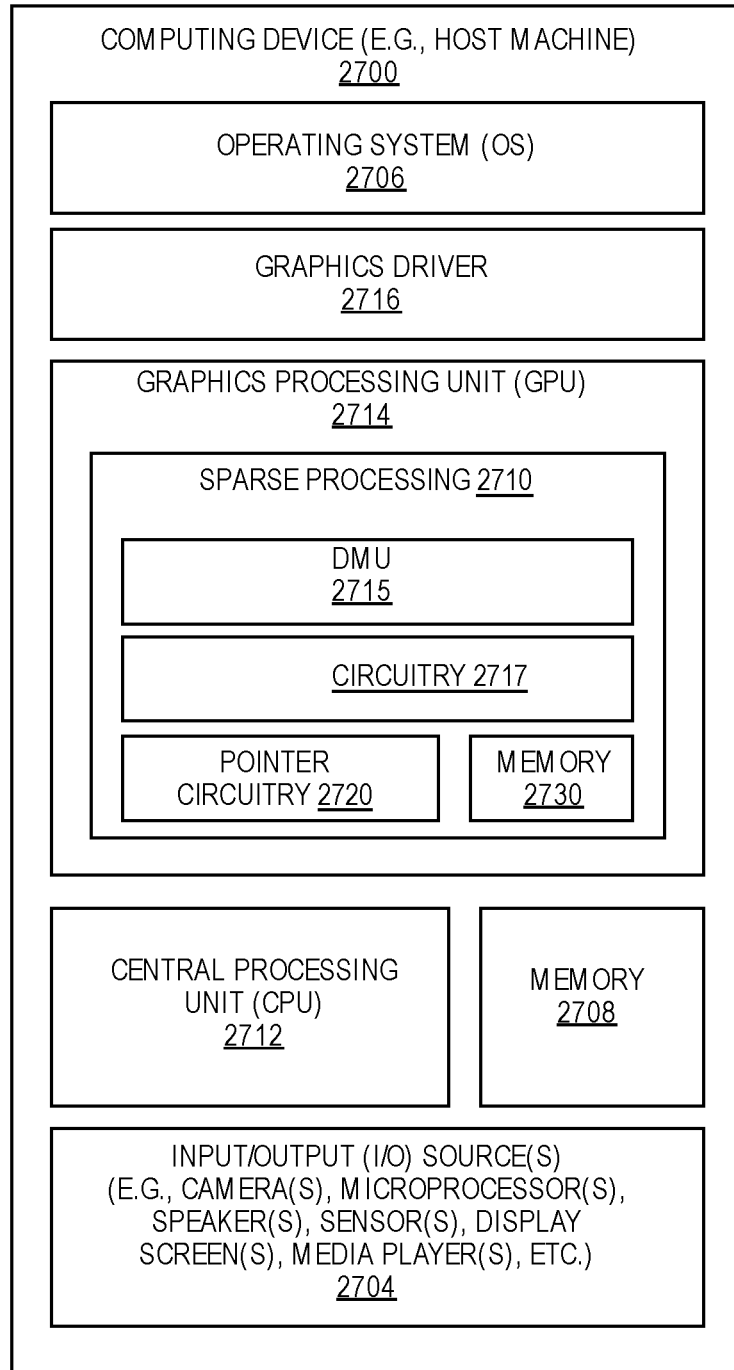
FIG. 27 a sparse processing mechanism that may be hosted by a GPU, according to an embodiment.

As illustrated in FIG. 27, in one embodiment, sparse processing mechanism 2710 (e.g., enhanced sparse matrix accelerator 2250, 2450, etc.) may be hosted by GPU 2714. However in other embodiments, sparse matrix processing mechanism 2710 may be hosted in graphics driver 2716. In yet other embodiments, sparse matrix processing mechanism 2710 may be hosted by or part of firmware of central processing unit ("CPU" or "application processor") 2712. For brevity, clarity, and ease of understanding, throughout the rest of this document, sparse matrix processing mechanism 2710 may be discussed as part of graphics driver 2716; however, embodiments are not limited as such.

In yet another embodiment, sparse matrix processing mechanism 2710 may be hosted as software or firmware logic by operating system 2706. In yet a further embodiment, sparse matrix processing mechanism 2710 may be partially and simultaneously hosted by multiple components of computing device 600, such as one or more of graphics driver 2716, GPU 2714, GPU firmware, CPU 2712, CPU firmware, operating system 2706, and/or the like. It is contemplated that sparse matrix processing mechanism 2710 or one or more of their components may be implemented as hardware, software, and/or firmware.

Sparse matrix multiplication operations are important in various applications, including neural networks. A sparse matrix is a matrix in which most of the elements are zero (or some other mathematically irrelevant value). Sparse matrices are often a result of received image data that indicates that an image (or image region) includes information that is not useful. Thus, a traditional GPU takes two input matrix blocks as inputs and produces an output matrix block. However when operating on sparse matrices, these input blocks mostly include zero values that do not contribute to accumulated results at the output matrix (e.g., multiply against zero produces zero). According to one embodiment, sparse matrix processing mechanism 2710 includes a data management unit 2715 (DMU), circuitry 2717 for matrix operations with weighted values (W), pointer logic 2720 (or pointer circuitry 2720) for storing xy base pointers, and memory 2730 for storing data (e.g., xy vectors). The DMU 2715 (e.g., 2260, 2460) includes a scheduler for scheduling matrix operations, an active logic, and a skip logic.

In one embodiment, the scheduler coordinates with a memory controller to track data stored at a memory device. In other embodiments, the scheduler tracks the information at the cache hierarchy level. In yet other embodiments, the scheduler tracks the information at the page-table level via OS 2706. In a further embodiment, the scheduler may be implemented to parse through large volumes of dense data to determine segments that may be processed as sparse operations. As discussed above, matrix multiplications for sparse operations can be bypassed, thus reducing the processing load at GPU 2714.

GPU 2714 may be implemented to perform other deep learning operations. For example, GPU 2714 may perform layer processing of neural networks. A frequently executing pattern in almost all deep neural networks is that a convolution (C) layer follows a bias (B) layer followed by a rectified linear unit (ReLu (R)) layer followed by a pooling (P) layer. Today most systems either execute these layers one after another (e.g., on GPUs C, B, R, and P are mapped as individual kernels), or mapped as fusing CBR followed by P as two separate kernels.

In both scenarios, more than one kernel invocation is needed; thus incurring additional data transfer overhead. According to one embodiment, GPU 2714 is configured such that EUs are partitioned and allocated to perform certain operations, and have intermediate results forwarded between them to achieve high throughput.

According to one embodiment, the partitioning and allocation of EUs may be established in advance based on domain knowledge. In such an embodiment, compute mechanism EUs may be statically partitioned, such that the EU allocation remains the same during the lifetime of a specific application. In other embodiments, EUs may be optimally partitioned for each invocation of GPU 2714 execution. In yet other embodiments, configuration may be dynamic such that it is changed per thread group during dispatch. In yet further embodiments, the partitioning may be implemented to perform processing of other types of neural network layers, in addition to the C, B, R and P layers, by determining a common pattern and setting up a pipeline to execute them faster on the GPU rather than performing them individually.

Trends in Neural Networks (NNs) include low, custom, and mix precisions (e.g., custom bitwidth, fix point, block floating point (FP), FP). Reduced computations for sparsity (has zeros, or generally, unimportant values) is supported in addition to improve efficiency from reducing compute, storage, and data moves while maintaining still good accuracy.

One prior art approach provides low precision down to INT8, but not below 8 bits. Another prior art approach supports mix precision (e.g., FP16/FP32 mix). Another prior art approach supports sparsity. Another prior art approach provides variable precision but no block FP/sparsity/outer product.

The present design provides arithmetic compute architecture to accommodate above trends of NNs including efficient support for dynamic adjustments in precisions (i.e., variable precision), efficient support for mix precisions (i.e., operands have different precision), efficient support for very low precisions (less than 8 bits), efficient support for fix point as well as dynamic floating point (or block floating point), and efficient support for sparsity. The present design can be implemented with different architecture variants including inner and outer product matrix formulations.

Figure 28:
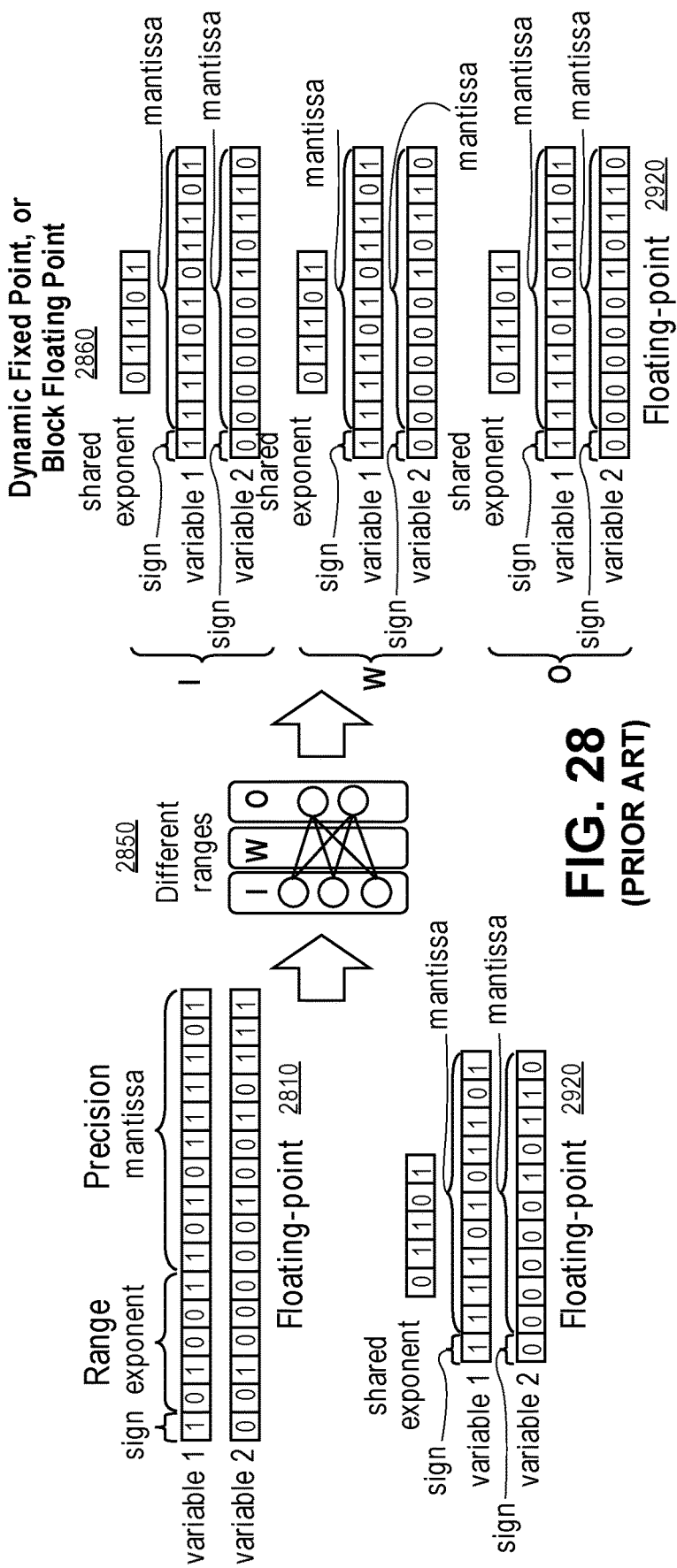
FIG. 28 illustrates different number representations for computations.

FIG. 28 illustrates different number representations for computations. For floating point representation 2810, the variables 1 and 2 each have a sign, different ranges (exponents), and different precision (mantissa). For fixed point representation 2820, the variables 1 and 2 each have a sign, a shared range (shared exponent), and different precision (mantissa). A NN 2850 has different ranges. For dynamic fixed point or block floating point representation 2860, the input (I) with variables 1 and 2 each have a sign, a shared range (shared exponent), and different precision (mantissa). The weighted coefficients (W) with variables 1 and 2 each have a sign, a shared range (shared exponent), and different precision (mantissa). The output (O) with variables 1 and 2 each have a sign, a shared range (shared exponent), and different precision (mantissa).

Figure 29A:
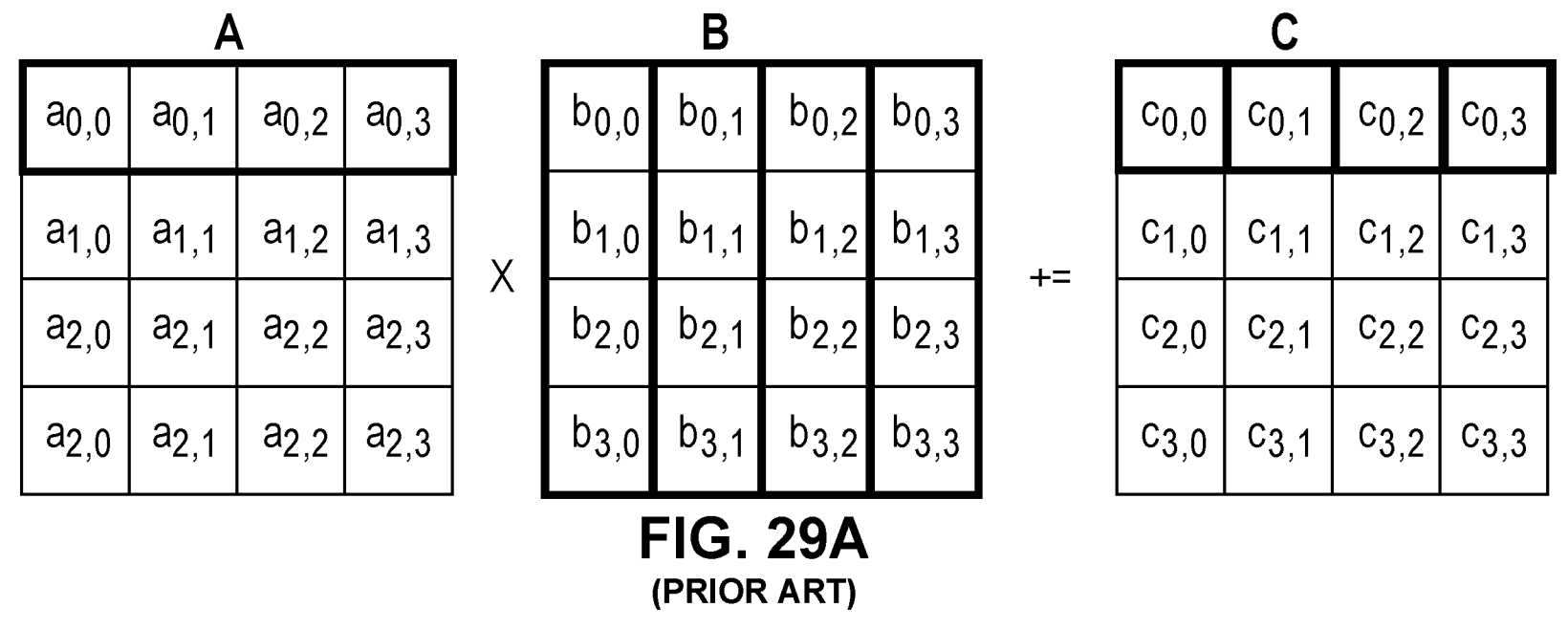
Figure 29B:
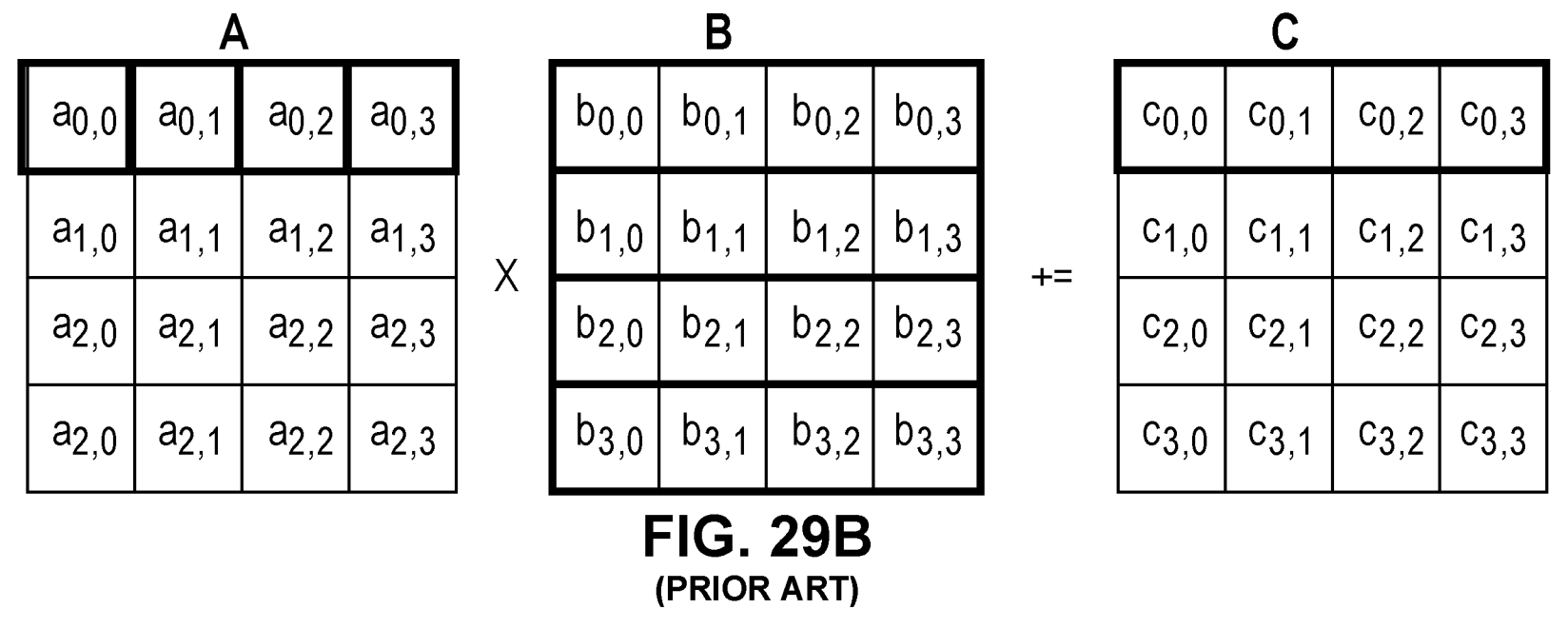

FIGS. 29A-B illustrate inner product matrix multiplication and outer product matrix multiplication. For inner product matrix multiplication, the output C is determined based on the following equations:

$$c_{0,0} = (a_{0,0} \times b_{0,0}) + (a_{0,1} \times b_{1,0}) + (a_{0,2} \times b_{2,0}) + (a_{0,3} \times b_{3,0})$$

$$c_{0,1} = (a_{0,0} \times b_{0,1}) + (a_{0,1} \times b_{1,1}) + (a_{0,2} \times b_{2,1}) + (a_{0,3} \times b_{3,1})$$

$$c_{0,2} = (a_{0,0} \times b_{0,2}) + (a_{0,1} \times b_{1,2}) + (a_{0,2} \times b_{2,2}) + (a_{0,3} \times b_{3,2})$$

$$c_{0,3} = (a_{0,0} \times b_{0,3}) + (a_{0,1} \times b_{1,3}) + (a_{0,2} \times b_{2,3}) + (a_{0,3} \times b_{3,3})$$

For outer product matrix multiplication, the output C is determined based on the following equations:

$$c_{0,0} += (a_{0,0} \times b_{0,0}); c_{0,1} += (a_{0,0} \times b_{0,1}); c_{0,2} += (a_{0,0} \times b_{0,2}); c_{0,3} += (a_{0,0} \times b_{0,3});$$

$$c_{0,0} += (a_{0,1} \times b_{1,0}); c_{0,1} += (a_{0,1} \times b_{1,1}); c_{0,2} += (a_{0,1} \times b_{1,2}); c_{0,3} += (a_{0,1} \times b_{1,3});$$

$$c_{0,0} += (a_{0,2} \times b_{2,0}); c_{0,1} += (a_{0,2} \times b_{2,1}); c_{0,2} += (a_{0,2} \times b_{2,2}); c_{0,3} += (a_{0,2} \times b_{2,3});$$

$$c_{0,0} += (a_{0,3} \times b_{3,0}); c_{0,1} += (a_{0,3} \times b_{3,1}); c_{0,2} += (a_{0,3} \times b_{3,2}); c_{0,3} += (a_{0,3} \times b_{3,3});$$

Figure 30A:
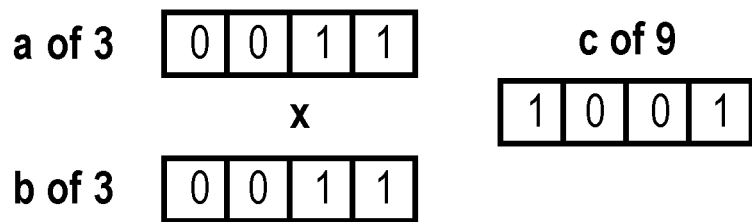
FIG. 30A illustrates a spatial computation for multiple inputs.

FIG. 30A illustrates a spatial computation for multiple inputs. In one example, a 4 bit multiply of a first input (a of 3) with a second input (b of 3) is performed with one operation using one multiplier to generate a 4 bit output (c of 9). This multiplier consumes more hardware resources than an adder.

Figure 30B:
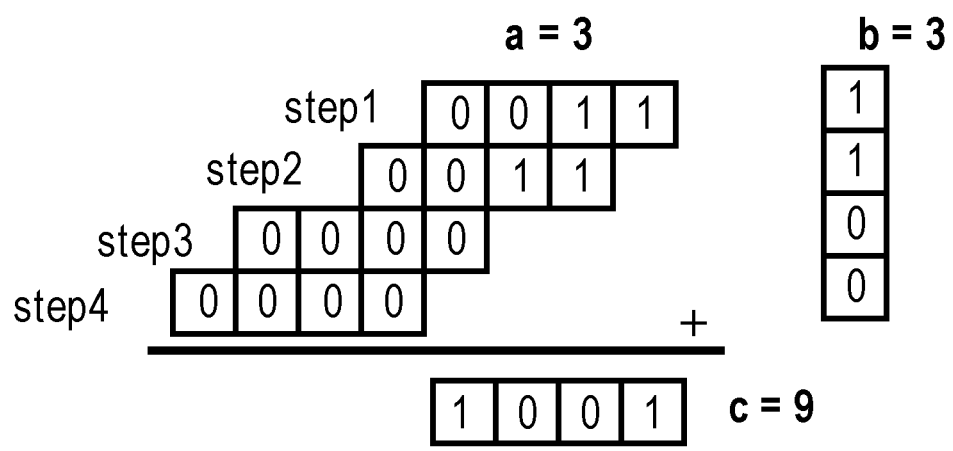
FIG. 30B illustrates a temporal computation for multiple inputs.

FIG. 30B illustrates a temporal computation for multiple inputs. In one example, a 4 bit multiply of a first input (a=3) with a second input (b=3) is performed with 4 operations using one adder serially to generate a 4 bit output (c=9). This adder consumes less hardware resources than a multiplier.

Figure 30C:
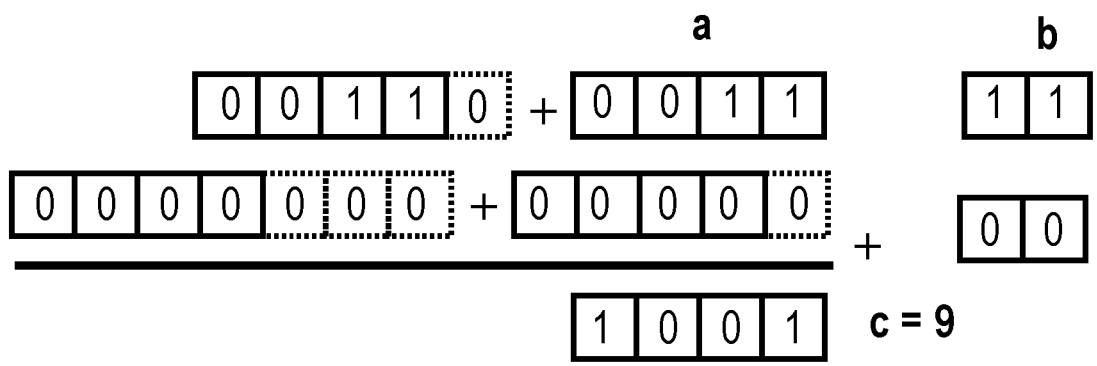
FIG. 30C illustrates a combination of spatial and temporal computations for multiple inputs.

FIG. 30C illustrates a combination of spatial and temporal computations for multiple inputs. In one example, a 4 bit multiply of a first input (a) with a second input (b) is performed with two operations using two adders serially to generate a 4 bit output (c=9).

Figure 31:
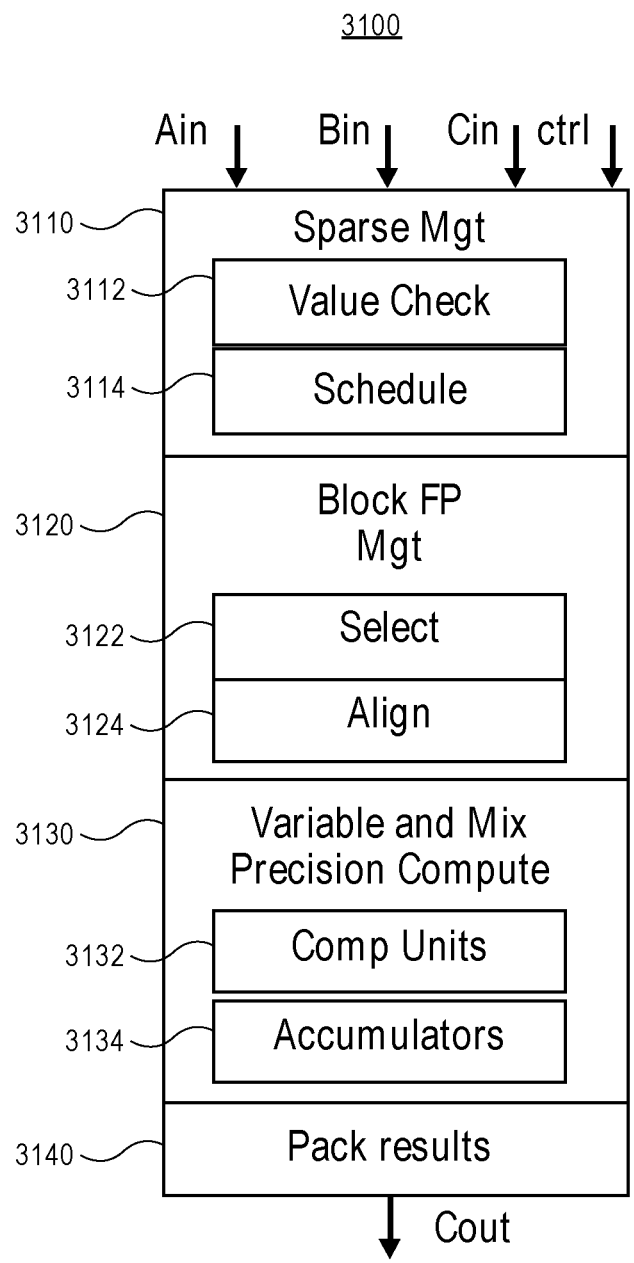
FIG. 31 illustrates an exemplary arithmetic compute architecture with support for variable and mix precision operations and sparsity, in accordance with an embodiment.

FIG. 31 illustrates an exemplary arithmetic compute architecture 3100 with support for variable and mix precision operations and sparsity, in accordance with an embodiment. The arithmetic compute architecture 3100 includes a sparsity management unit 3110 (e.g., sparsity management circuitry 3110) for managing sparsity operations, a block FP management unit 3120 (e.g., block FP management circuitry 3120) for block FP operations, a variable and mix precision compute unit 3130 (e.g., variable and mix precision compute circuitry 3130), and pack management unit 3140 for processing multiple vectors concurrently. The sparsity management unit 3110 includes a value check mechanism 3112 to detect unimportant values (e.g., zero values) and skip these unimportant values of input vectors. A scheduler 3114 determines scheduling of computations based on scheduling important values and skipping unimportant values of input vectors that are detected by the value check mechanism 3112.

The block FP management unit 3120 prepares inputs for a next phase of computation when inputs are block FP or dynamic FP. The block FP management unit 3120 includes select logic 3122 for selecting a shared exponent for input vectors if the input vectors have block FP and different exponents. The align logic 3124 then causes alignment of a mantissa for the input vector that has a change in exponent. If the input vectors are not block FP nor dynamic FP, then the input vectors pass through the block FP management unit 3120 for a subsequent computation phase to perform normal fix point computation.

The variable and mix precision compute unit 3130 performs computations for input vectors with the computation units 3132 and updates accumulators 3134. The computations can use at least one of spatial and temporal computations including any spatial and temporal combinations. If a temporal computation is utilized, unimportant (e.g., zero values) of input vectors can be skipped to improve efficiency and reduce computation time. For mix precision, fractured compute units with different bit widths can be utilized to improve compute efficiency. Accumulators 3134 prepare and write output results.

A pack management unit 3140 processes multiple vectors concurrently. The pack management unit 3140 reads output from accumulators 3134 and packs values of these outputs prior to outputting vectors (e.g., Cout) in a desired format (e.g., shared exponent, normal fixed point). If the output of the pack management unit 3140 has block FP output values, then the pack management unit 3140 can concatenate shared exponent onto the output values.

Figure 32:
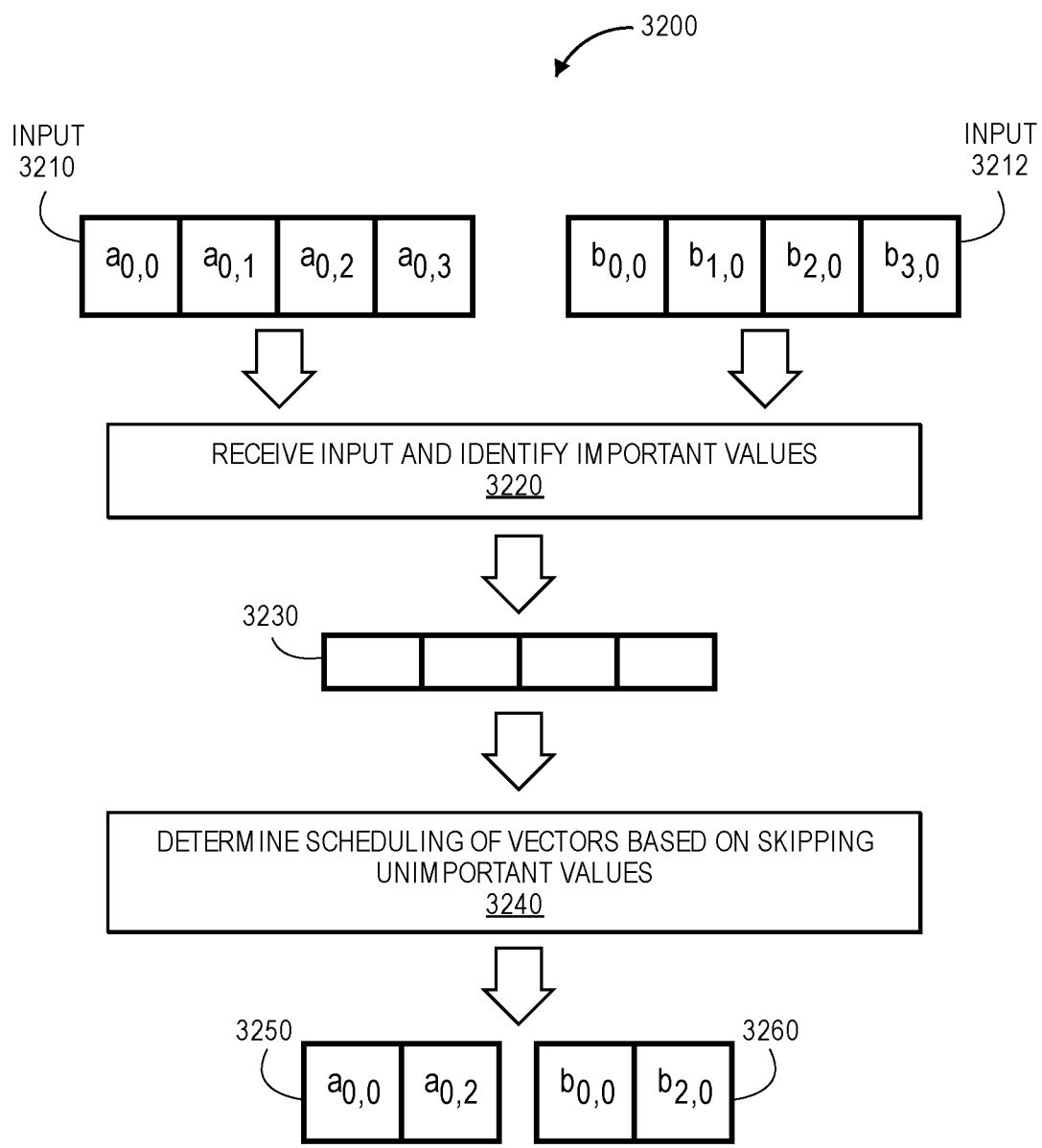
FIG. 32 illustrates an exemplary sequence of operations of a sparsity management unit of an arithmetic compute architecture with support for variable and mix precision operations and sparsity, in accordance with an embodiment.

FIG. 32 illustrates an exemplary sequence of operations (e.g., inner product operations) of a sparsity management unit of an arithmetic compute architecture with support for variable and mix precision operations and sparsity, in accordance with an embodiment. A sparsity management unit (e.g., sparsity management unit 3110) performs operations of method 3200 in accordance with one embodiment.

At operation 3220, a value check mechanism of the sparsity management unit receives inputs (e.g., input vectors 3210 and 3212) and identifies important values (e.g., non-zero values) at operation 3220. Then, the value check mechanism generates an output (e.g., vector 3230) having important values and unimportant values. For example, for inner product multiplication, if vector 3210 has a zero value for $a_{0,1}$ and vector 3212 has a zero value for $b_{3,0}$ then the value check mechanism generates the 4 bit vector 3230 having non-zero values for the first and third bits and zero values for the $2^{nd}$ and $4^{th}$ bits of vector 3230 due to the detection of zero values for $a_{0,1}$ of vector 3210 and $b_{3,0}$ of vector 3212. At operation 3240, the scheduler of the sparsity management unit receives the vector 3230 and skips the unimportant values (e.g., zero values for the $2^{nd}$ and $4^{th}$ bits of vector 3230). The scheduler determines scheduling of computations based on scheduling important values and skipping unimportant values of input vectors that are detected by the value check mechanism. In this example, the scheduler generates vectors 3250 and 3260 for scheduling of computations with compute units. Vector 3250 includes important values for $a_{0,1}$ and $a_{0,2}$. Vector 3250 does not include $a_{0,1}$ because $a_{0,1}$ has a zero value in this example. Vector 3250 does not include $a_{0,3}$ because $a_{0,3}$ is multiplied by a zero value of $b_{3,0}$ in this example.

Vector 3260 includes important values for $b_{0,0}$ and $b_{2,0}$. Vector 3260 does not include $b_{3,0}$ because $b_{3,0}$ has a zero value in this example. Vector 3260 does not include $b_{1,0}$ because $b_{1,0}$ is multiplied by a zero value of $a_{0,1}$ in this example.

This example includes 4 bit input vectors and 2 bit output vectors but any number of bits (e.g., 2, 3, 4, 8, 16, 32, 64, etc.) can be handled with this method 3200.

Figure 33:
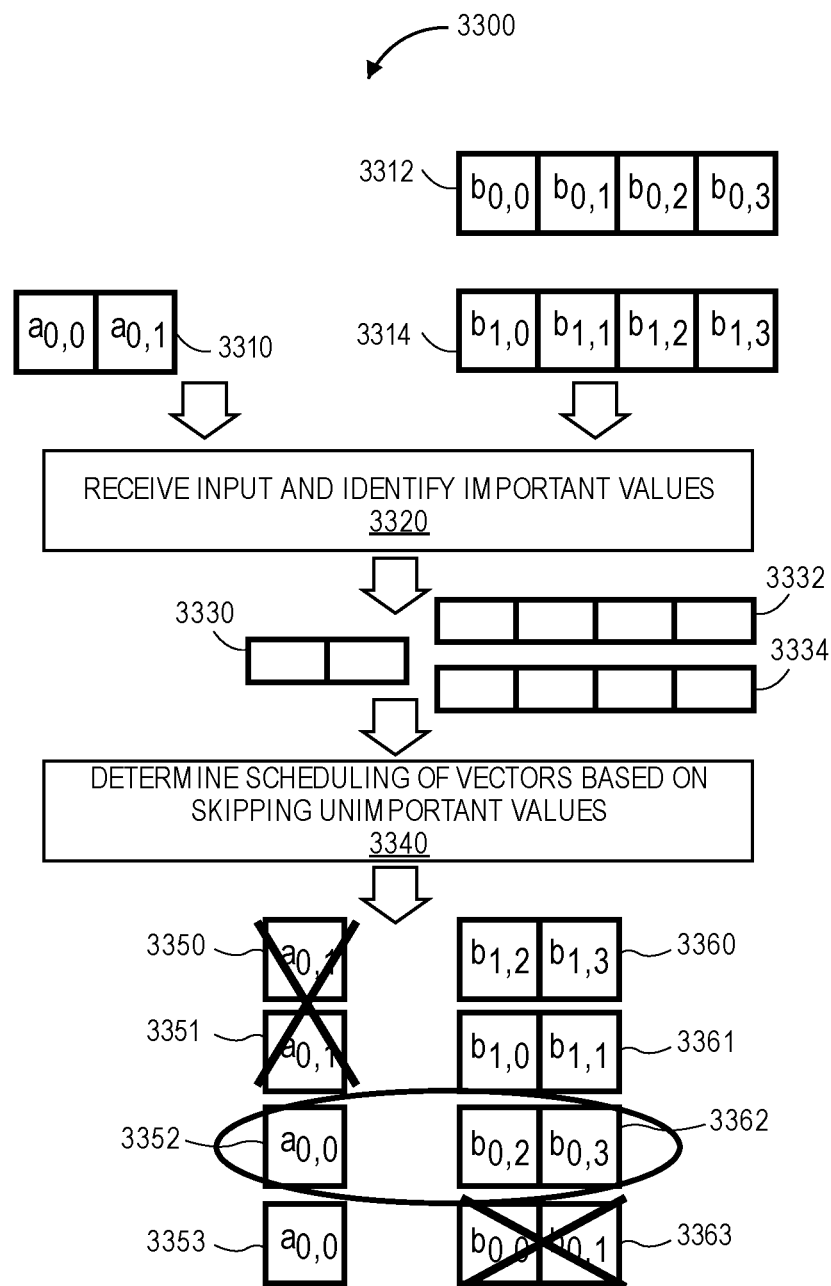
FIG. 33 illustrates an exemplary sequence of operations (e.g., outer product operations) of a sparsity management unit of an arithmetic compute architecture with support for variable and mix precision operations and sparsity, in accordance with an embodiment.

FIG. 33 illustrates an exemplary sequence of operations (e.g., outer product operations) of a sparsity management unit of an arithmetic compute architecture with support for variable and mix precision operations and sparsity, in accordance with an embodiment. A sparsity management unit (e.g., sparsity management unit 3110) performs operations of method 3300 in accordance with one embodiment.

At operation 3320, a value check mechanism of the sparsity management unit receives inputs (e.g., input vectors 3310, 3312, 3314) and identifies important values (e.g., non-zero values) at operation 3220. Then, the value check mechanism generates output (e.g., vectors 3330, 3332, and 3334) having important values and unimportant values. For example, for outer product multiplication, if vector 3310 has a zero value for $a_{0,1}$, vector 3312 has zero values for $b_{0,0}$ and $b_{0,1}$, and vector 3314 has a zero value for $b_{1,3}$ then the value check mechanism generates vectors (e.g., 2 bit vector 3330, 4 bit vectors 3332 and 3334) both important non-zero values and unimportant zero values. For example, the vector 3330 has important value for the first bit and zero value for the 2nd bit. The vector 3332 may have important values for the $3^{rd}$ and $4^{th}$ bits while having zero values for the $1^{st}$ and $2^{nd}$ bits. The vector 3334 may have important values for the $1^{st}$, $2^{nd}$, and $3^{rd}$ bits while having zero values for the $4^{th}$ bit.

At operation 3340, the scheduler of the sparsity management unit receives the vectors 3330, 3332, and 3334 and skips the unimportant values (e.g., zero values for the $2^{nd}$ and $4^{th}$ bits of vector 3230). The scheduler determines scheduling of computations based on scheduling important values and skipping unimportant values of input vectors that are detected by the value check mechanism. In this example, the scheduler generates vectors 3352 and 3362 for scheduling of computations with compute units. Vectors 3350, 3351, 3353, 3360, 3361, and 3363 are not scheduled for computations with compute units due to containing unimportant values (e.g., zero values) or being multiplied against unimportant values (e.g., zero values).

This example includes 2 and 4 bit input vectors and 1 and 2 bit output vectors to be sent to 2 bit wide compute units but any number of bits (e.g., 2, 3, 4, 8, 16, 32, 64, etc.) can be handled with this method 3300.

Figure 34:
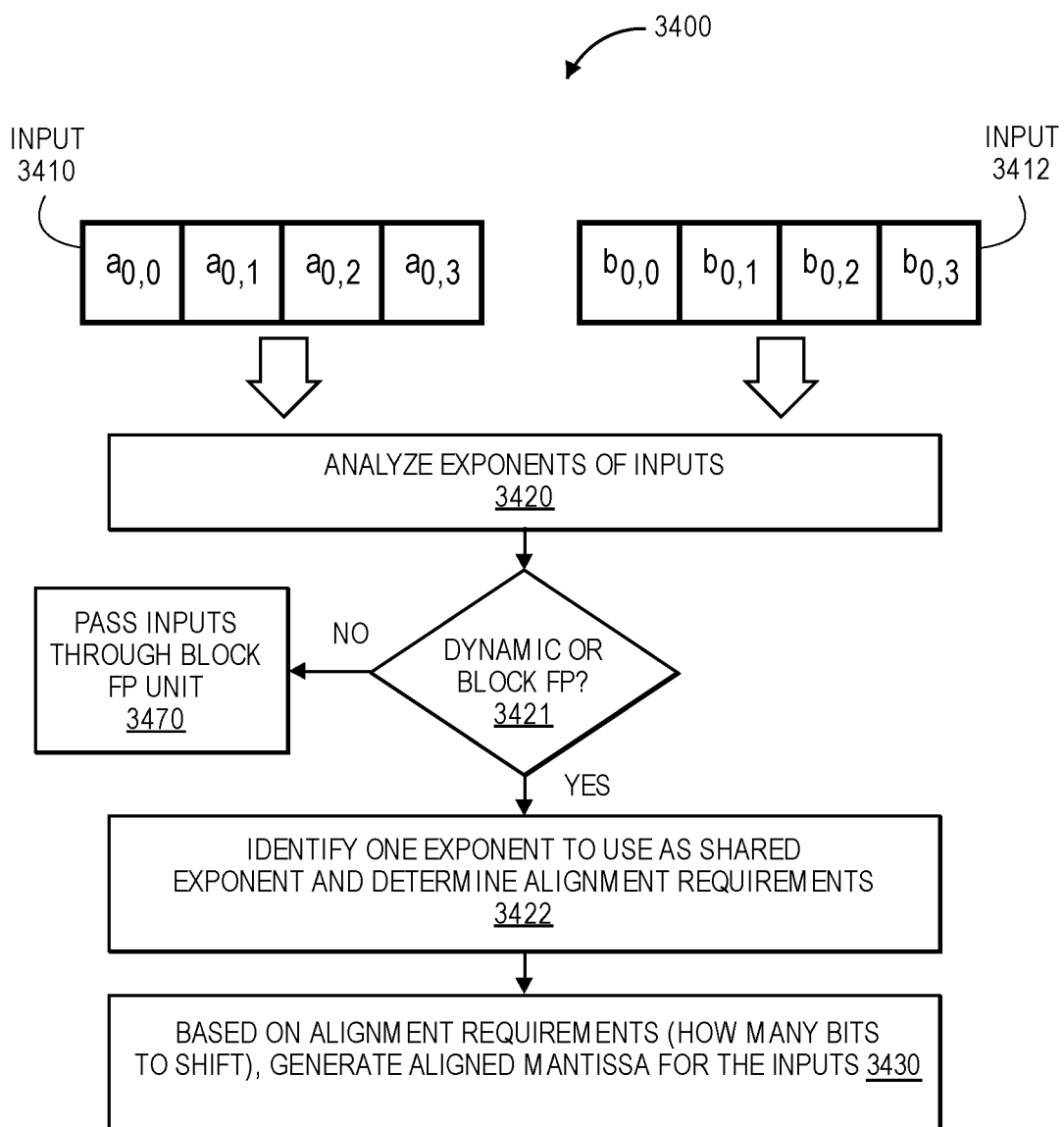
FIG. 34 illustrates an exemplary sequence of operations of a block FP management unit of an arithmetic compute architecture with support for variable and mix precision operations and sparsity, in accordance with an embodiment.

FIG. 34 illustrates an exemplary sequence of operations (e.g., block FP operations) of a block FP management unit of an arithmetic compute architecture with support for variable and mix precision operations and sparsity, in accordance with an embodiment. A block FP management unit (e.g., block FP management unit 3120) performs operations 3400 in accordance with one embodiment.

A select mechanism of the block FP management unit receives inputs (e.g., input vectors 3410, 3412) having a sign, exponent, and mantissa for each element of the vector and identifies important values (e.g., non-zero values). The select mechanism analyzes exponents of each element of the inputs at operation 3420. The select mechanism determines whether the inputs are dynamic FP or block FP at operation 3421. If so, then the select mechanism identifies an exponent of the inputs to use as a shared exponent for each input and determines alignment requirements at operation 3422.

In one example, a largest exponent of the inputs is selected to be the shared exponent. Based on alignment requirements (e.g., how many bits to shift), an align mechanism generates output with aligned mantissa for each element. Computations for the output with aligned mantissa can be processed with fixed function calculations by the variable and mix precision compute unit.

If the inputs are not dynamic FP or block FP at operation 3421, then the inputs pass through the block FP unit at operation 3470. In this case, the input proceeds to the next phase for computations.

Figure 35:
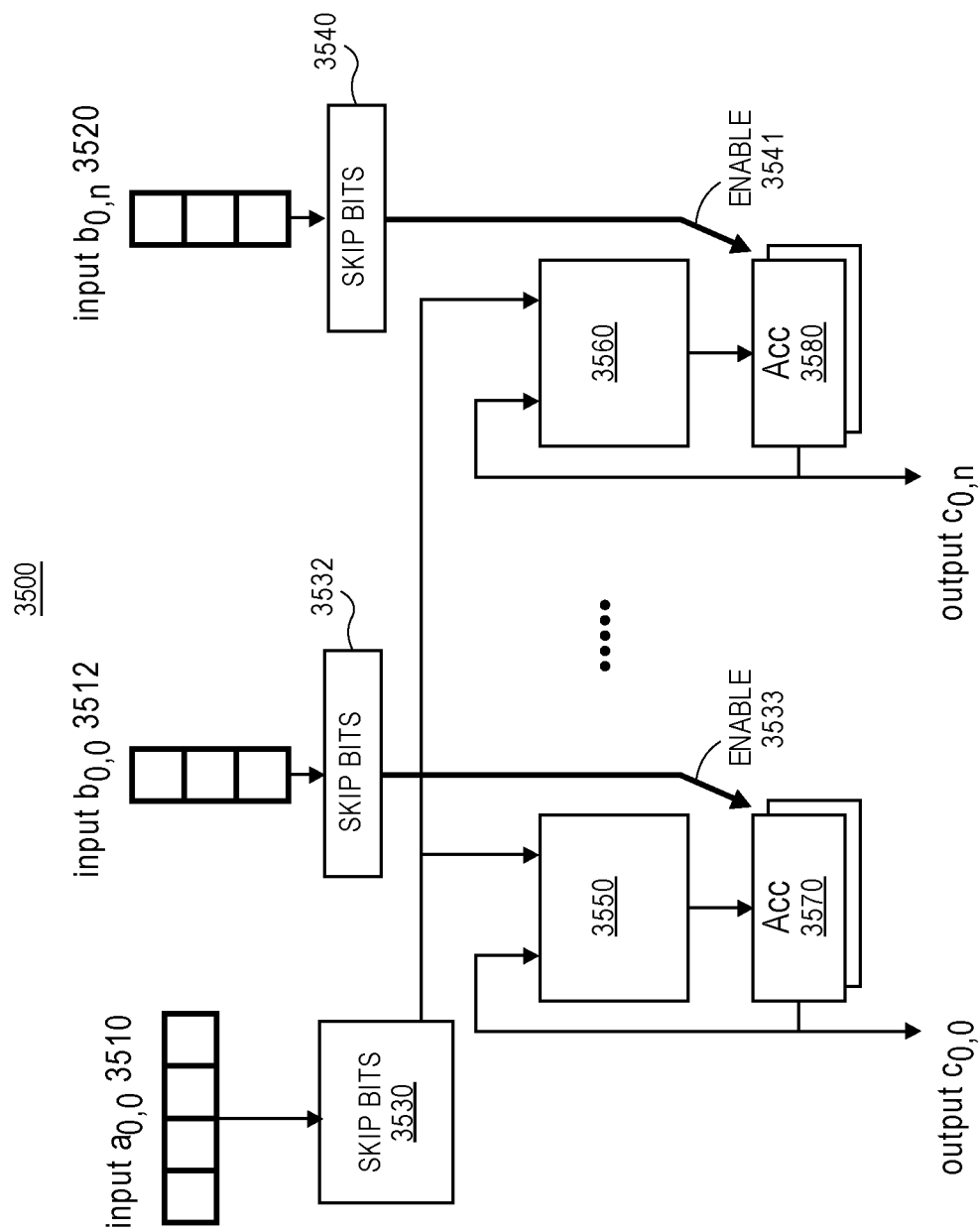
FIG. 35 illustrates a block diagram of a variable and mix precision compute unit, in accordance with an embodiment.

FIG. 35 illustrates a block diagram of a variable and mix precision compute unit, in accordance with an embodiment. The variable and mix precision compute unit 3500 performs computations for input vectors (e.g., inputs 3510, 3512, 3520) with the computation units 3550, 3560 (e.g., shift, N add(s)) and updates accumulators 3570 and 3580. The computations can use at least one of spatial and temporal computations including any spatial and temporal combinations. The variable precision functionality provides dynamically adjusted computing for custom precision by combining spatial and temporal computation for any bit width. If a temporal computation is utilized, unimportant (e.g., zero values) of input vectors can be skipped to improve efficiency and reduce computation time. For mix precision, the inputs can have different precisions. Overall throughput of the compute block depends on precisions of the inputs, a number of adders for the compute units, and width of the adders. Fractured compute units with different bit widths can be utilized to improve compute efficiency. Accumulators 3570 and 3580 prepare and write output results (e.g., $C_{0,0}$ and $C_{0,n}$).

In one example for outer product multiplication, the input 3510 is a 4 bit vector $a_{0,0}$ that has values of 0011. The input 3512 is a 3 bit vector $b_{0,0}$ that has values of 011. The input 3520 is a 3 bit vector $b_{0,n}$ that has values of 110. A temporal approach can be applied to both inputs a and b. A number of temporal operations to process input b is based on a number of adders N of the compute units. A number of temporal operations to process input a is based on a bit width of adders N of the compute units. The skip bit logic 3530, 3532, and 3540 filters or skips inputs with bits having unimportant values (e.g., zero values) and outputs other bits having important values. The output of the skip bit logic 3530 is loaded into the compute units 3550 and 3560 having shift and N adder logic. The output of skip bit logic 3532 and 3540 acts as enable signals 3533 and 3541 for accumulators 3570 and 3580, respectively. The enable signals determine whether the accumulators are updated with new values from the compute units 3550 and 3560.

In one example, if N=1 bit adder for the compute units, then 3 accumulate operations will be needed to compute 3 bits of input b. In another example, if N=2 bit adder for the compute units, then 2 accumulate operations will be needed to compute 4 bits of input a. Thus, for this example, 3 operations for input b times 2 operations for input a results in 6 operations to process pairs of inputs a and b.

Figure 36:
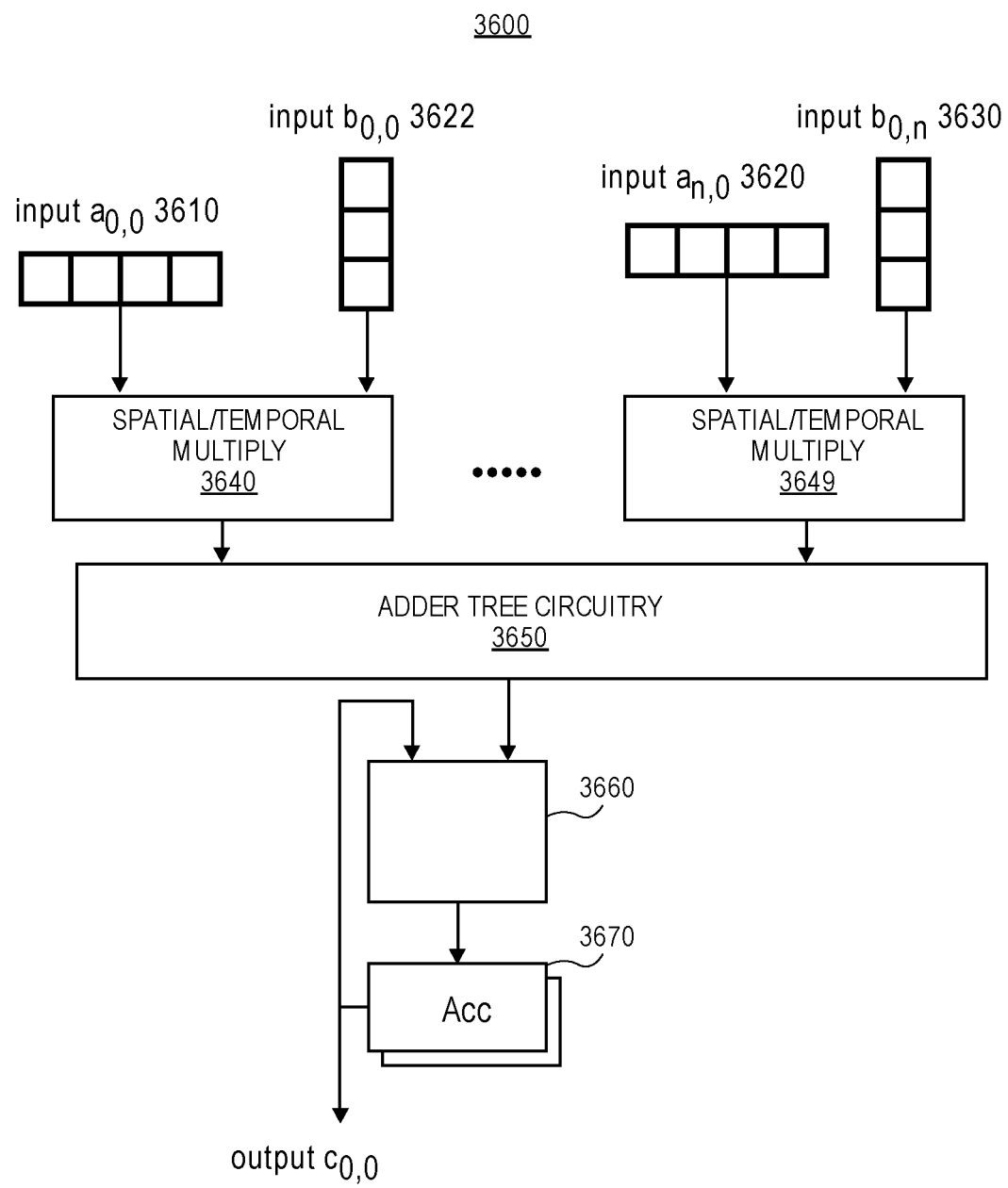
FIG. 36 illustrates a block diagram of a variable and mix precision compute unit, in accordance with an embodiment.

FIG. 36 illustrates a block diagram of a variable and mix precision compute unit, in accordance with an embodiment. The variable and mix precision compute unit 3600 performs computations for input vectors (e.g., inputs 3610, 3620, 3622, 3630) with spatial and temporal multiply units 3640-3649, adder tree circuitry 3650, and the computation units 3660 (e.g., shift, N add(s)) and updates accumulators 3670. The computations can use at least one of spatial and temporal computations including any spatial and temporal combinations. The variable precision functionality provides dynamically adjusted computing for custom precision by combining spatial and temporal computation for any bit width for inner product formulation for this example. The spatial/temporal multiply units (e.g., circuitry) can be tuned from purely temporal (e.g., AND logic gates) to N-bit temporal (e.g., N adders) to purely spatial (e.g., hardware multiplier). A purely temporal approach uses less hardware resources, but utilizes multiple operations to perform a multiply. In contrast, a purely spatial approach uses more hardware resources, but less operations.

For mix precision, the inputs can have different precisions. Fractured compute units with different bit widths can be utilized to improve compute efficiency. Accumulators 3670 prepare and write output results (e.g., $C_{0,0}$).

In one example for inner product multiplication, the input 3610 is a 4 bit vector $a_{0,0}$ that has values of 0011 and the input 3620 is a 4 bit vector $a_{n,0}$ that has values of 0101. The input 3612 is a 3 bit vector $b_{0,0}$ that has values of 011. The input 3630 is a 3 bit vector $b_{0,n}$ that has values of 110. A spatial and temporal approach can be applied to both inputs a and b with spatial/temporal multiply units 3640 and 3649 as discussed above. The output of the spatial/temporal multiply units 3640 and 3649 is loaded into the adder tree circuitry 3650 for arithmetic operations and then outputs of the adder tree are loaded into compute unit 3660 having shift and N adder logic. The output of compute unit 3660 is loaded into accumulators 3670 that generate output (e.g., $C_{0,0}$).

Graph analytics rely on graph algorithms to extract knowledge about the relationship among data represented as graphs. The proliferation of graph data (from sources such as social media) has led to strong demand for graph analytics and wide use of graph analytics. As such, performing graph analytics as efficient as possible will be of critical importance.

To address this need, the present design includes a framework to automatically map a user-defined graph algorithm to a hardware accelerator architecture "template" that is customized to the given input graph algorithm. The accelerator is amenable for implementation in hardware (e.g., FPGA, ASIC), which can execute with extreme efficiency.

In one embodiment, the present design includes a hardware accelerator architecture template that is based on a generalized sparse matrix vector multiply (GSPMV) accelerator. It supports arbitrary graph algorithm because it has been shown that graph algorithm can be formulated as matrix operations. The present design includes an automatic approach to map and tune a widely used "vertex centric" graph programming abstraction to the proposed architecture template.

Existing graph analytics frameworks are mostly software frameworks (i.e., running on CPUs of GPGPUs). A few prior graph frameworks in existing literature map graph algorithms to customized hardware. However, these prior graph frameworks target hardware accelerator architectures that are not based on generalized sparse matrix vector multiple. Existing sparse matrix multiply hardware accelerators do not support customizability to allow mapping of graph algorithms.

The present design framework operates with a user specifying their graph algorithms as "vertex programs" following vertex-centric graph programming abstraction. A vertex program does not expose hardware details, so users without hardware expertise (e.g., data scientist) can create it.

Along with the graph algorithm, the framework accepts inputs including the parameters of the target hardware accelerator to be generated (e.g., max amount of on-chip RAM). These parameters may be provided by a user, or obtained from an existing library of known parameters when targeting an existing system (e.g., a particular FPGA board). The framework also receives design optimization objectives (e.g., max performance, min area) and properties of the target graph data (e.g., type of graph) or the graph data itself. This is optional, and is used to aid in automatic tuning.

Given these received inputs, the framework performs auto-tuning to determine the set of customizations to apply to the hardware template to optimize for the input graph algorithm, map these parameters onto the architecture template to produce an accelerator instance in synthesizable register transfer level (RTL), and conduct functional and performance validation of the generated RTL against the functional and performance software models derived from the input graph algorithm specification.

In comparison to software frameworks, the framework of the present design allows for more efficient execution of graph algorithms by using optimized hardware accelerator implementations that are customized for these algorithms. Use cases for this framework include automatic mapping of graph algorithms onto at least one of FPGA platforms and ASIC implementation.

The present hardware architecture template supports efficient handling of large graph data stored in off-chip memory (e.g., GPGPU local memory 1434A-1434B of FIG. 14B). In one embodiment the sparse compute accelerator architecture 2100 can also directly operate on data stored in high-bandwidth non-volatile memory, such as 3D)(Point or Nano-RAM. In contrast, a target hardware architecture of a prior approach assumes that the graph data is stored in on-chip RAMs. So, it is not able to support graph problems that operate on large graph data.

The present hardware architecture template is based on generalized sparse matrix vector multiply. Therefore, it does not rely on the notion of instructions. Instead, the template is customizable to accept custom hardware blocks, which can be generated by variety of existing high-level synthesis (HLS) technologies. A prior approach maps graph algorithms to customized graph processors that execute graph programs consisting of application-specific instructions derived from user-supplied vertex programs. However, the use of the graph programs can introduce additional overhead and may constrain the opportunity for customization, as the graph operations to map to the graph processor have to fit within the specific instruction formats.

One of the most popular models for describing computations on graph data is the vertex programming model. The present design supports a vertex programming model. A vertex program includes types of data associated with edges/vertices in the graph (e.g., edata for edge data, vdata for vertices data), messages sent across vertices in the graph (e.g., mdata for messages), and temporary data (e.g., tdata).

Stateless user-defined compute functions using pre-defined APIs that read and update the graph data defined. Examples of user-defined compute functions include the following:
    tdata PROCESS MSG (mdata m, edata e, vdata v) {// user defined}
    tdata REDUCE (tdata t, tdata r) {// user defined}
    tdata APPLY (vdata v, tdata t) {// user defined}
    mdata SEND MSG (vdata v) {// user defined}

The following algorithm executes a vertex program:
RunVertexProgram(matrix <edata>A, vector <vdata>y)
For i=1 to Max iteration
X=new vector <mdata>
For i in y if i is active {x.insert(SEND MSG(i))}
t=GSPMV (A, x, y)
reset all members of y to non-active
for i in t where t is update
new_val=APPLY (yi, ti);
if new val!=yi {yi=new val; set yi active}
if number of active y==0 break Edge data is represented as an adjacency matrix A, vertex data as vector y, and messages as sparse vector x. A generalized sparse matrix vector multiply (GSPMV) formulation is generalized by replacing multiply( ) and add( ) operations in sparse matrix vector multiply (SPMV) by user-defined PROCESS MSG( ) and REDUCE( )

A key observation here is that the GSPMV variant needed to execute vertex program performs a column-oriented multiplication of sparse matrix A (i.e., adjacency matrix) against a sparse vector x (i.e., messages) to produce an output vector y (i.e., vertex data).

The present design supports execution of vertex programs by (1) making it a customizable hardware template and (2) supporting the functionalities needed by vertex program. Based on this template, a design framework is provided to map a user-supplied vertex program to the hardware template to produce a synthesizable RTL (e.g., Verilog) implementation instance optimized for the vertex program. The framework also performs automatic validation and tuning to ensure the produced RTL is correct and optimized. There are multiple use cases for this framework. For example, the produced synthesizable RTL can be deployed in an FPGA platform to efficiently execute the given vertex program. Alternatively, it can be refined further to produce an ASIC implementation.

Figure 37:
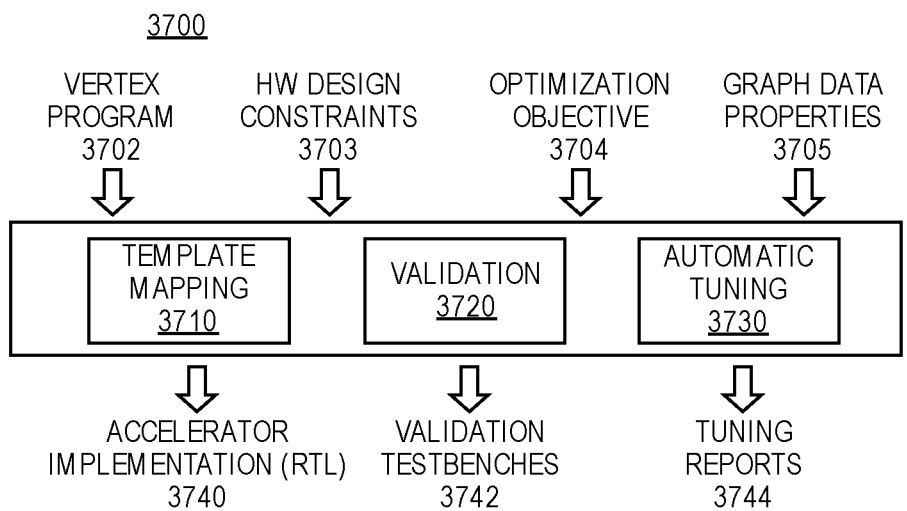
FIG. 37 illustrates a design framework, according to an embodiment.

FIG. 37 illustrates a design framework, according to an embodiment. The framework 3700 receives inputs including a user-specified vertex program 3702, optimization objectives 3704 (e.g., max performance, min area), and target hardware design constraints 3703 (e.g., maximum amount of on-chip RAMs, memory interface width). As an optional input to aid automatic tuning, the framework also accepts graph data properties (e.g., type=natural graph) or a sample graph data.

Given these inputs, the framework maps the input vertex program to a hardware accelerator architecture template 3710, and produces an RTL implementation of the accelerator instance 3740 optimized for executing the vertex program. The framework performs automatic tuning 3730 to optimize the generated RTL for the given design objectives, while meeting the HW design constraints and generates tuning reports 3744. Furthermore, the framework automatically validates with validation module 3720 the generated RTL against functional and performance models derived from the inputs. Validation test benches 3742 are produced along with the RTL.

Figure 38:
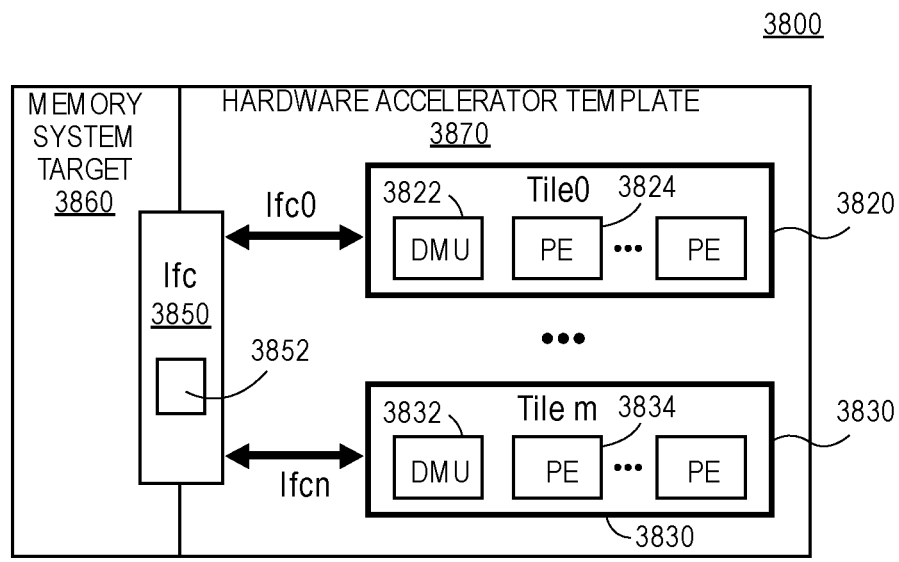
FIG. 38 illustrates a high-level architecture of a hardware accelerator template, according to an embodiment.

FIG. 38 illustrates a high-level architecture 3800 of a hardware accelerator template, according to an embodiment. The architecture 3800 includes a memory system target 3860 and a hardware accelerator template 3810. A customizable interface controller 3850 interfaces between the memory system target 3860 and tiles 3820 through 3830 of the hardware accelerator template 3810. The interface controller includes a cache memory 3852 for frequently accessed data. Each tile includes a customizable data management unit (e.g., 3822, 3832) and a plurality of customizable processing elements (e.g., 3824, 3834).

This architecture 3800 supports execution of vertex programs by providing customizable logic blocks inside each PE to support PROCESS_MSG( ), REDUCE( ), APPLY, and SEND_MSG( ) needed by vertex programs. This architecture 3800 provides customizable on-chip storage structures and pack/unpack logic to support user-defined graph data (e.g., vdata, edata, mdata, tdata). Various control state machines are modified to support executing vertex program.

Figure 39:
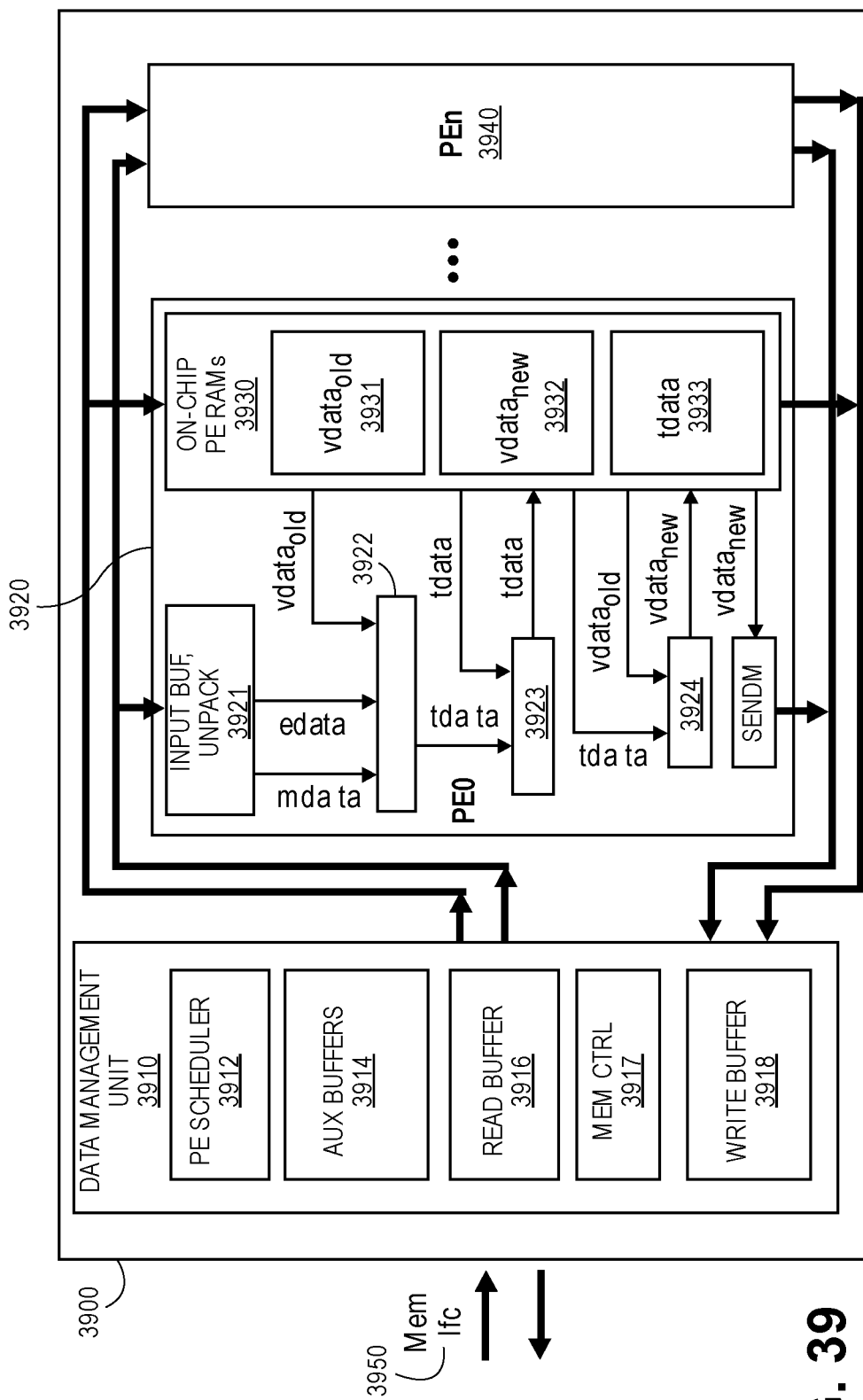
FIG. 39 illustrates a block diagram of an accelerator tile, according to an embodiment.

FIG. 39 illustrates a block diagram of an accelerator tile, according to an embodiment. A customizable interface controller 3950 interfaces between an off-chip memory (not shown) and the accelerator tile 3900. Each tile includes a customizable data management unit 3910 and a plurality of customizable processing elements (e.g., 3920, 3940). This accelerator tile 3900 supports execution of vertex programs by providing customizable logic blocks 3921-3925 (e.g., PROCESS_MSG( ) 3922, REDUCE( ) 3923, APPLY 3924, and SEND_MSG( ) 3925, single source shortest path, etc.) needed by vertex programs. This accelerator tile 3900 provides customizable on-chip storage structures (e.g., on-chip PE RAMs 3930 having $vdata_{old}$ 3931, $vdata_{new}$ 3932, and tdata 3933) and pack/unpack logic (e.g., input buffer/unpack 3921) to support user-defined graph data (e.g., vdata, edata, mdata, tdata).

In another embodiment, the accelerator tile 3900 also includes features and functionality of the accelerator of FIGS. 22B, 23, 24B, 25B, and 26 including skip logic (e.g., 2266, 2466) for tracking unimportant operands to be skipped and also pointer logic (e.g., 2281, 2481) for pointers of x and y vectors.

Figure 40:
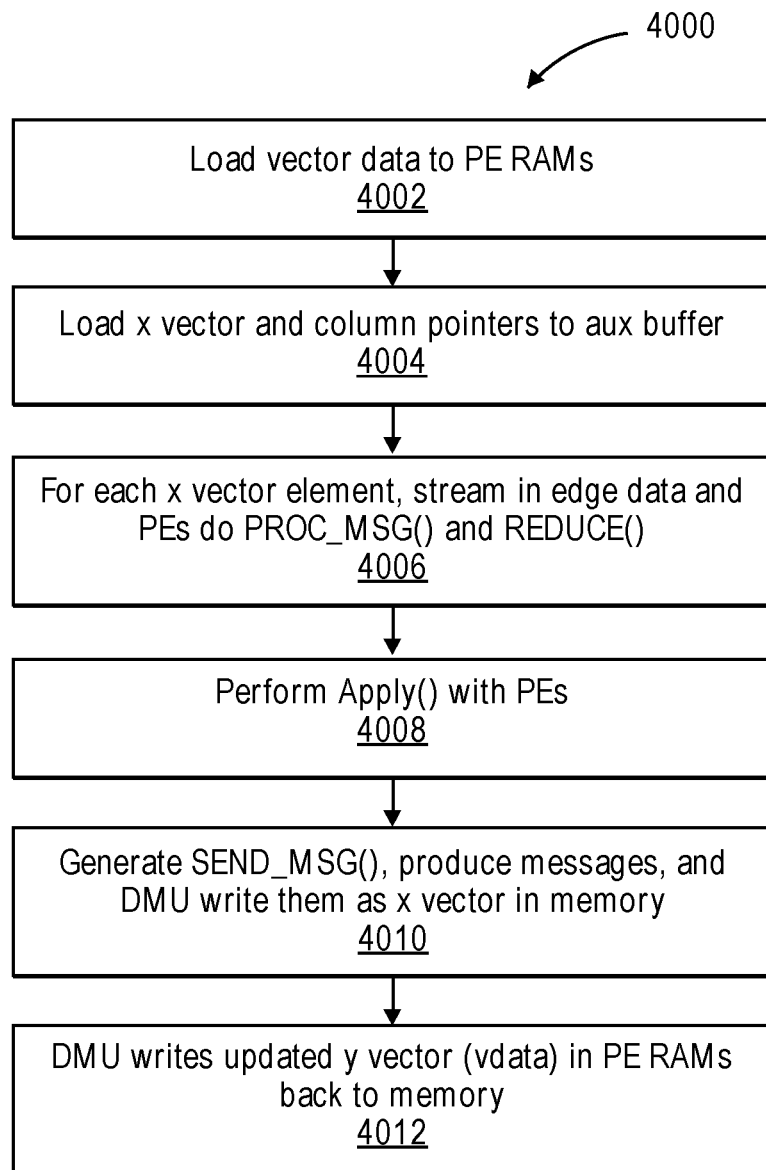
FIG. 40 illustrates a method for operation of an accelerator tile, according to an embodiment.

FIG. 40 illustrates a method for operation of an accelerator tile, according to an embodiment. An accelerator tile (e.g., accelerator tile 3900, hardware accelerator) performs operations of method 4000 in accordance with one embodiment.

At operation 4002, the accelerator loads vertex data (y vector) to on-chip PE RAMs. At operation 4004, the accelerator loads x vector and column pointers into auxiliary buffer 3914. At operation 4006, the accelerator for each x vector element streams in edge data and PEs perform customized functions (e.g., PROC_MSG( ), REDUCE( ). At operation 4008, the PEs of the accelerator perform a customized function (e.g., APPLY( ). At operation 4010, the PEs of the accelerator perform customized function (e.g., SEND_MSG( )) to produce messages. The DMU can then write the messages (e.g., x vector) into off-chip memory. At operation 4012, the DMU writes updated vertex data (y vector) from the PE RAMs to the off-chip memory.

The method 4000 conforms to a vertex program execution algorithm. To scale up performance, the architecture allows increasing the number of PEs in a tile and/or the number of tiles in the design. This way, the architecture can take advantage of multiple levels of parallelisms in the graph, in other words, across subgraphs (across blocks of adjacency matrix) or within each subgraph. Table 1 summarizes the customizable parameters of the accelerator template. It is also possible to assign asymmetric parameters across tiles for optimization (e.g., one tile with more PEs than another tile).

Based on the inputs, the framework performs automatic tuning to determine the best design parameters to use to customize the hardware architecture template in order to optimize it for the input vertex program and (optionally) graph data. Table 2 lists tuning considerations and examples of affected template parameters.

TABLE 1

| Category | Details |
| --- | --- |
| RAMs, buffers | Size, ports, number of banks, shared/private banks |
| Cache | Size, associativity, include/exclude |
| Scaling | Number of tiles, number of PEs/tile |
| Memory interface | Number of interfaces, width, burst size |
| Compute blocks (Process_MSG, REDUCE, SEND_MSG, APPLY) | Content generation strategy (e.g., pipelined, multi-cycle), interface pruning |
| PE scheduling | Scheduling scheme (e.g., row/block interleaved, dynamic) |
| Data storage format | Array of structures, structure of arrays, doubly compressed, unique value compressed |
| Pack/unpack logic | Generation strategy, compression on/off |
| Active vertex handling | Bitvector, N-level compressed |

TABLE 2

| Tuning considerations | Example of affected template parameters |
| --- | --- |
| Locality of data(x vector) from graph data properties | Cache, interface width |
| Graph data sizes | Sizes of on-chip storage, pack/unpack |
| Graph compute functions | Compute blocks, active vertex handling |
| Graph data structure(non-zeros distribution in adjacency matrix) | Scaling tiles and PEs, memory interfaces, PE scheduling, data storage format |
| Graph data access attributes (read-only, write-only, read/write) | On-chip structures (ports, banks), active vertex handling |
| Graph data types | On-chip structures (ports, banks), pack/unpack |

TABLE 2-continued

| Tuning considerations | Example of affected template parameters |
|---|---|
| Graph data patterns (e.g., commonly recurring values) | Data storage format, pack/unpack logic |

In this phase, the framework takes the template parameters determined by the tuning phase, and produces an accelerator instance by "filling" in the customizable portions of the template. The user-defined compute functions are mapped from the input specification to the appropriate PE compute blocks using existing High-Level Synthesis (HLS) tools. The storage structures (e.g., RAMs, buffers, cache) and memory interfaces are instantiated using their corresponding design parameters. The pack/unpack logic are automatically generated from the data type specifications. Parts of the control FSMs are also generated based on the provided design parameters (e.g., PE scheduling scheme).

During validation, the accelerator architecture instance (synthesizable RTL) produced by the template mapping is automatically validated. To do this, the framework derives a functional model of the vertex program to be used as a best reference. Test benches are generated to compare the execution of this best reference against simulations of the RTL implementation of the architecture instance. The framework also performs performance validation by comparing RTL simulations against analytical performance model and cycle-accurate software simulator. It reports runtime breakdown and pinpoint the bottlenecks of the design that affect performance.

Sparsity exists in neural networks (NNs) as a result of several factors including inherent sparsity as a result of ReLU rectified linear unit (e.g., primarily in CNNs—convolutional), weight sparsity as a result of pruning, and quantization to low precision (e.g., 1 bit, 2 bit), and re-training.

High sparsity in RNN matrices for recurrent neural networks that are feedforward neural networks include feedback connections between layers. A fully connected layer can be made sparse.

Publications have shown that the amount of sparse activation and weight data can grow up to 95%. A recent publication describes a hardware architecture that decreases latency (cycles) for inference as a factor of weight/activation density decreases. Sparsity is also apparent in training and can accelerated using the hardware accelerators of this present disclosure. Training includes forward propagation and back propagation. Forward propagation may be identical to inference. The training algorithm typically runs a forward propagation on the NN for each training sample, then runs a back propagation in the reverse direction in order to compute the gradients. The weights that are unimportant (e.g., zero values) continue to be multiplied by gradients for no reason. The present GPU architecture can take advantage of this by utilizing hardware techniques to exploit this behavior.

One prior approach performed sparse training with gradual pruning technique for a speech application and achieved 90% sparsity in weights. Another prior approach models over 200 million parameters and prunes up to 80% with no accuracy loss after retraining.

Sparse scenarios have been observed in the present design in pruned LSTM/RNN models including sparse dense general matrix vector multiplication (GEMV) (e.g., weights are sparse and dense activation vector with batch size, N=1), sparse dense skinny general matrix-matrix multiplication (GEMM) (e.g., sparse weights, dense activation matrix with N=2, 4, 8, and 16) and sparse dense GEMM (e.g., sparse weights, dense activation matrix with N>1).

In one example, the present design accelerated each of the sparse dense scenarios mentioned above on GPU hardware. The present design measures the performance of the kernels with varying sparsity levels (e.g., from 50% to 95%) and compared it with the dense versions.

Using straightforward storage schemes (e.g., compressed sparse row (CSR), compressed sparse column (CSC), coordinate list (COO)) for storing sparse matrices, the present design targets greater than 50% sparsity to get a speedup because there is often a 2× overhead for storing index information. In the small batch regime (e.g. batch size=1), the cost of loading the RNN weights is often greater than the cost of performing the math, so a speedup directly proportional to the reduction in memory required to store the network is expected. The observed speedups occur with CSR representation in one example. A bandwidth efficiency can be further improved by using a modified version of CSR with run length encoding or by using 2 bytes instead of 4 bytes to represent each index in indices array as matrix sizes wouldn't exceed 2^16 in LSTM models. A long short-term memory block or network can be a recurrent neural network.

In one embodiment, a Sparse Dense GEMV GPU implementation includes either a L3 based GPU kernel, or a Shared local memory (SLM) based kernel. The sparse matrix is represented in compressed sparse row format that represents a matrix M by three (one-dimensional) arrays, that respectively contain nonzero values, the extents of rows, and column indices. This format allows fast row access and matrix-vector multiplications (Mx). The CSR format stores a sparse m×n matrix M in row form using three (one-dimensional) arrays (A, IA, JA). NNZ represents the number of nonzero entries in M. The array A is of length NNZ and holds all the nonzero entries of M. The array IA is of length m+1. The third array, JA, contains the column index in M of each element of A and hence is of length NNZ as well.

Figure 41A:
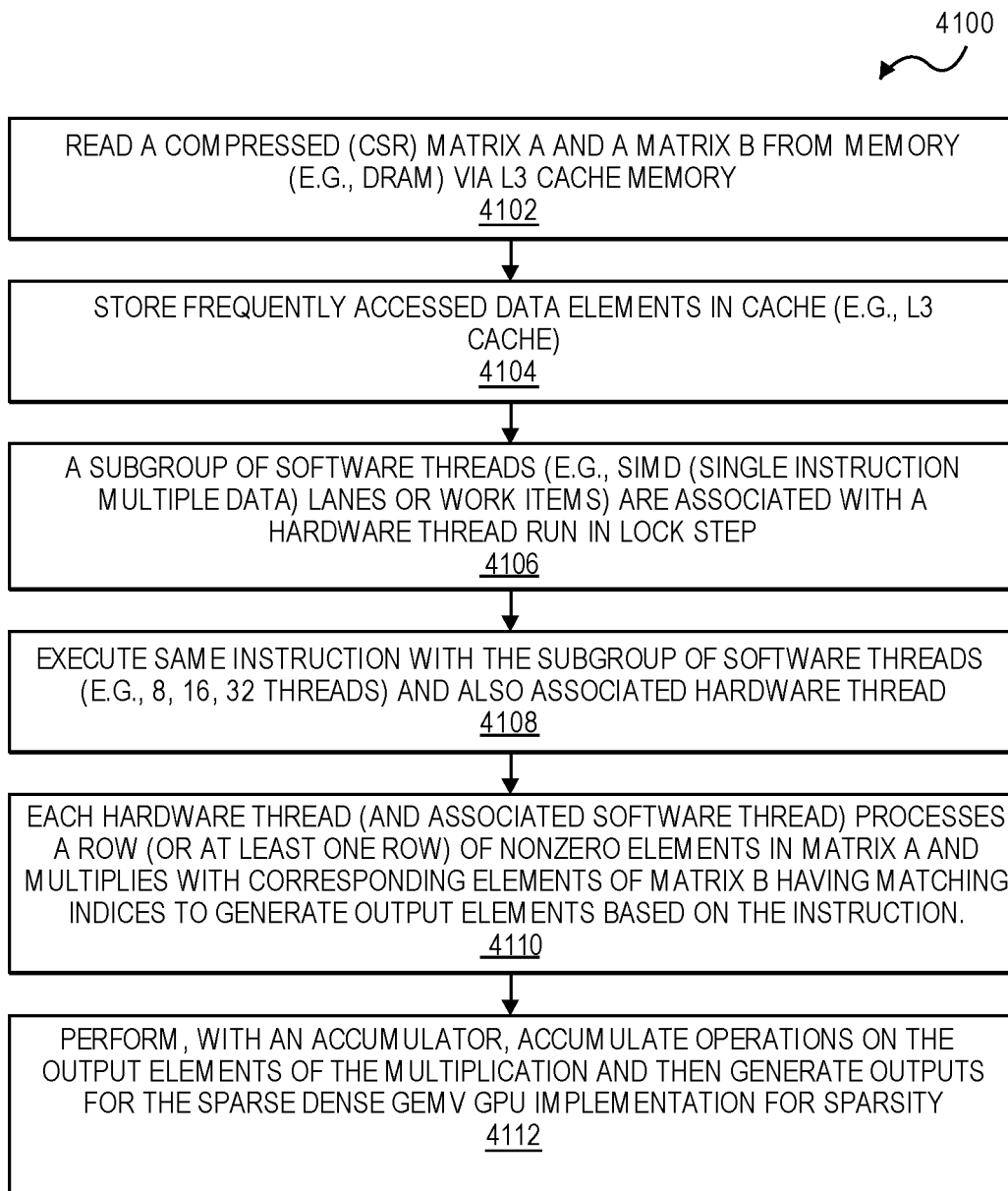
FIG. 41A illustrates a method for a Sparse Dense GEMV GPU implementation for training data having sparsity, according to an embodiment.

FIG. 41A illustrates a method for a Sparse Dense GEMV GPU implementation for training data having sparsity, according to an embodiment. A GPU (e.g., L3 based GPU kernel) or multi-core CPU performs operations 4100 in accordance with one embodiment.

At operation 4102, a compressed (CSR) sparse matrix A and a dense matrix B (tens) or dense vector B are directly read from memory (e.g., DRAM) via cache memory (e.g., L3 cache). At operation 4104, frequently accessed data elements are optionally stored in L3 cache for L3 based GPU kernel.

At operation 4106, a subgroup of software threads (e.g., SIMD (single instruction multiple data) lanes or OpenCL work items) are associated with a hardware thread run (e.g., 1 to n hardware threads) in lock step. In other words, the subgroup of software threads (e.g., 8, 16, 32 threads) and associated hardware thread all run the same instruction at operation 4108. Each hardware thread (and associated software thread) processes a row (or at least one row) of nonzero elements in matrix A and multiples with corresponding elements of matrix B having matching indices at operation 4110 to generate output elements. At operation 4112, an accumulator performs accumulate operations on the output elements of the multiplication and then generates outputs for the GPU implementation (e.g., Sparse Dense GEMV GPU implementation) for sparsity in training. The software threads (e.g., SIMD lanes 8, 16, 32) run in parallel with hardware threads for predictions. L3 based implementation can provide good performance over SLM version for numerous matrix dimensions.

For the L3 based GPU kernel, since the elements read from the dense B vector are not contiguous, this results in scattered L3 reads. If a cache miss occurs, then this would result in scattered DRAM reads. This can be mitigated by storing dense skinny matrix (or vector B) in a shared local memory (SLM). SLM is explicitly controlled (by a programmer) low latency cache like memory. Now the scattered reads happen from SLM which results in SLM bank conflicts, 1 or more reads for same bank in SLM. For some matrix dimensions, SLM bank conflicts are less problematic than scattered or uncoalesced L3 reads.

Figure 41B:
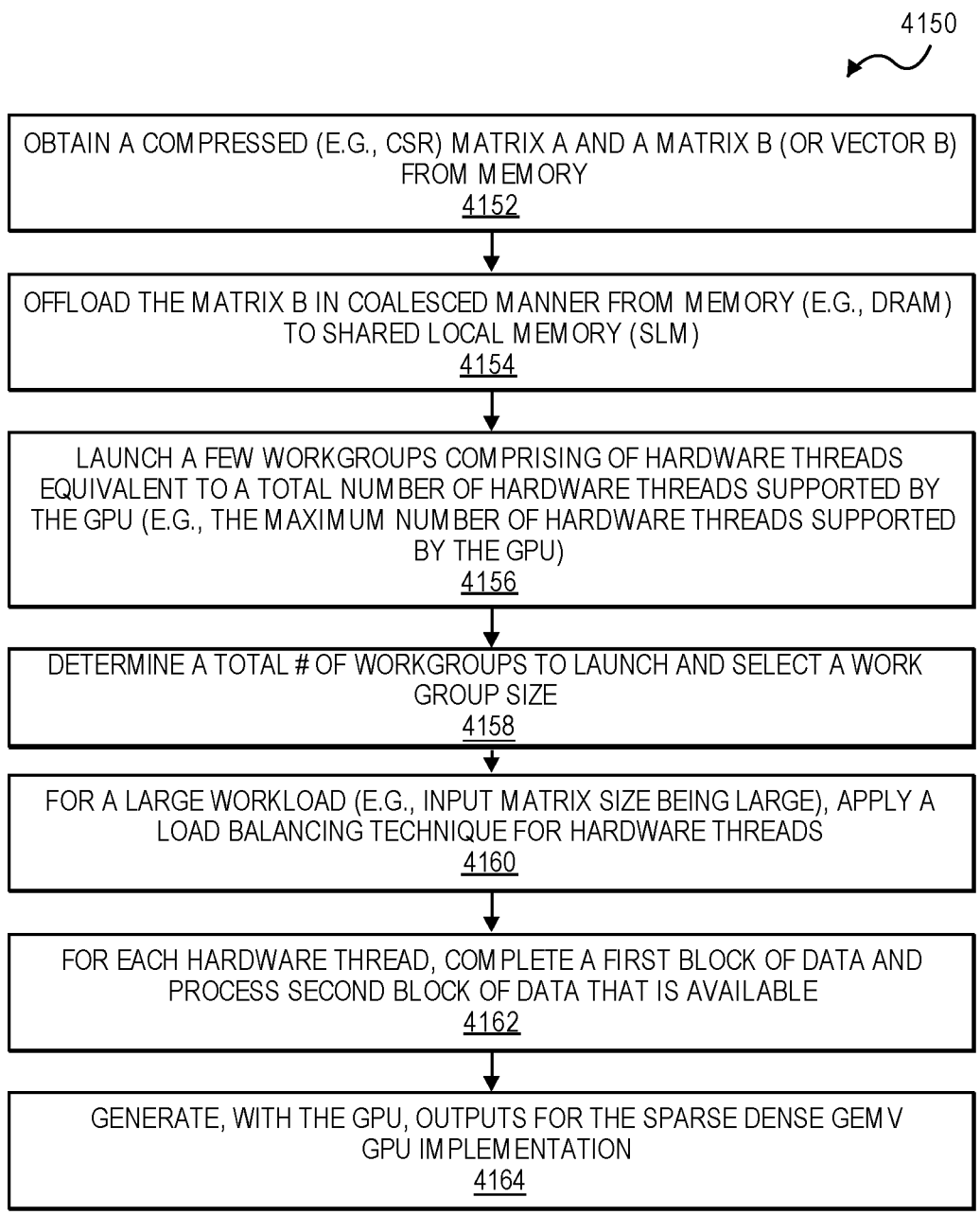
FIG. 41B illustrates a method for a Sparse Dense GEMV GPU implementation for training data having sparsity, according to an embodiment.

FIG. 41B illustrates a method for a Sparse Dense GEMV GPU implementation for training data having sparsity, according to an embodiment. A GPU (e.g., shared local memory (SLM) based GPU kernel) or multi-core CPU performs operations 4150 in accordance with one embodiment.

At operation 4152, a compressed (CSR) sparse matrix A and a dense matrix B (or vector B) are obtained from memory. In this implementation, the same matrix B or vector B is offloaded in coalesced manner from memory (e.g., DRAM) to shared local memory (SLM) by every workgroup at operation 4154. This introduces redundant global memory reads. Sparse GEMV is a bandwidth bound operation. Thus, to improve the performance of these kernels (e.g., functions), bandwidth efficiency should be improved. This occurs by reducing a number of global memory reads. In order to obtain the full benefit of SLM usage, the present design reduces the number of global loads to SLM. This can be done by reducing a number of total workgroups required to launch the sparse GEMV kernel. A workgroup is a collection of related work items that execute on a single compute unit. The work items in the group execute the same kernel and share local memory and workgroup barriers. At operation 4156, the present design launches only a few workgroups (e.g., minimum number of workgroups) comprising of hardware threads equivalent to total number of hardware threads supported by the GPU (e.g., the maximum number of hardware threads supported by the GPU). In one example, a total number of hardware threads that is supported on a GPU is 56*6=336 threads. A total number of workgroups (e.g., minimum number of workgroups) to launch to minimize global reads is based on (SIMD_WIDTH*total number of hardware threads) divided by WORKGROUP_SIZE. SIMD_WIDTH is usually 8, 16, or 32. In one example, the present design determines a total number of workgroups (e.g., minimum number of workgroups) to launch to minimize global memory reads (or to minimize global loads to SLM) and selects a work group size (e.g., WORKGROUP_SIZE=224) at operation 4158. In this example, a workgroup size of 224 is selected because it evenly divides the numerator and there is no wastage of threads. This example definitely reduces total number of redundant global reads but may not completely eliminate redundant global reads. For a large workload (e.g., input matrix size being large), the present design applies a load balancing technique at operation 4160 for hardware threads. In this technique, each hardware thread completes a first block of data and processes second block of data that is available at operation 4162. The same hardware thread is re-used to process next section of data until all data is processed. This happens in a FOR loop inside the kernel until there is no more data left to be processed. The hardware threads of the GPU generate outputs for the Sparse Dense GEMV GPU implementation for sparsity in training at operation 4164. This SLM technique gives good performance over L3 based implementation for certain matrix dimensions. For other dimensions, scattered L3 reads seems to be better than SLM bank conflicts and redundant global reads. Hence for other dimensions, no speedup occurs using SLM technique.

Figure 42:
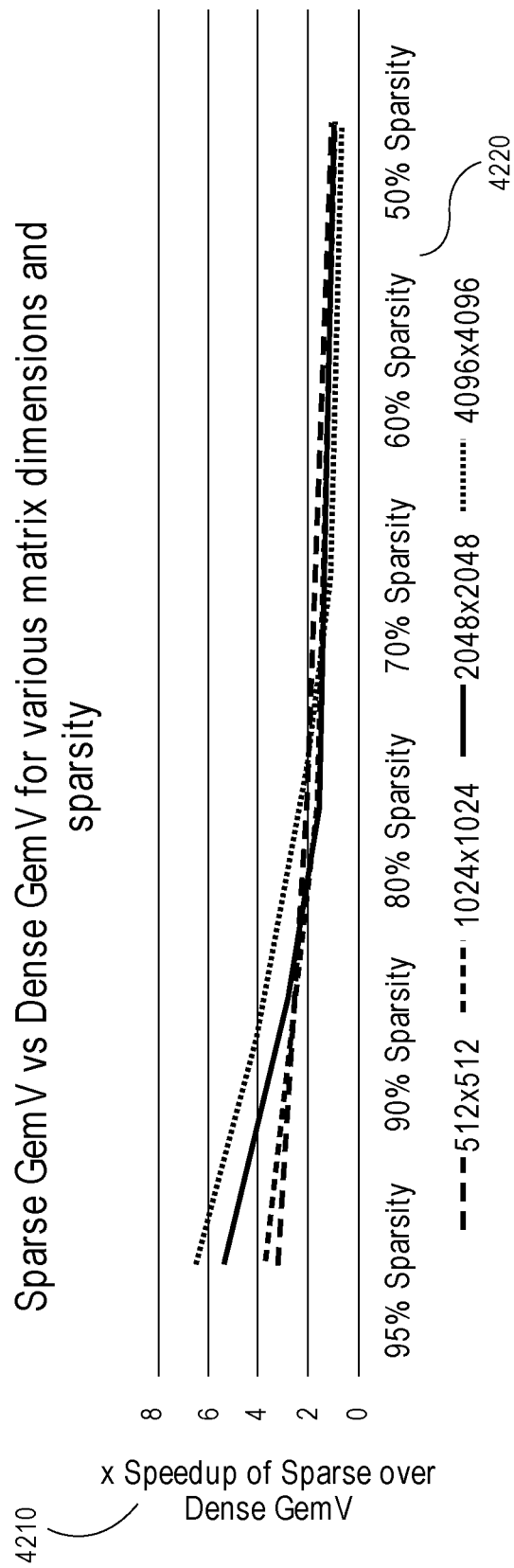
FIG. 42 illustrates a diagram of sparse GEMV and dense GEMV for various matrix dimensions and sparsity for L3 based sparse dense GEMV implementation, in accordance with an embodiment.

FIG. 42 illustrates a diagram of sparse GEMV and dense GEMV for various matrix dimensions and sparsity for L3 based sparse dense GEMV implementation, in accordance with an embodiment. A vertical axis 4210 represents x speedup (e.g., 2× speedup, 4× speedup, etc.) of sparse over dense GEMV with L3 implementation. A horizontal axis 4220 represents different levels (e.g., percentages) of sparsity for a sparse matrix. For sparsity greater than ~70%, sparse GEMV outperforms dense GEMV. For high sparsity levels (e.g., greater than 90%), the present design achieves performance speedup of about 3× to 6× (3 times to 6 times).

In one example, a SLM based sparse GEMV implementation achieves a 14% to 28% speedup over L3 based sparse GEMV implementation for certain matrix vector dimensions. The performance speedup for SLM (e.g., see values in sparsity 95%, 90% columns) was measured in comparison to L3 based implementations as indicated in Table 3 below.

TABLE 3

SLM Performance Speedup

| M | K | N | Sparsity 95% | Sparsity 90% |
|---|---|---|---|---|
| 2048 | 2048 | 1 | 1.17 | 1.18 |
| 4096 | 4096 | 1 | 1.24 | 1.18 |
| 1760 | 1760 | 1 | 1.24 | 1.14 |
| 2560 | 2560 | 1 | 1.33 | 1.12 |
| 3072 | 3072 | 1 | 1.24 | 1.03 |
| 3568 | 3568 | 1 | 1.28 | 1.21 |
| 7680 | 2560 | 1 | 1.25 | 1.22 |

Figure 43:
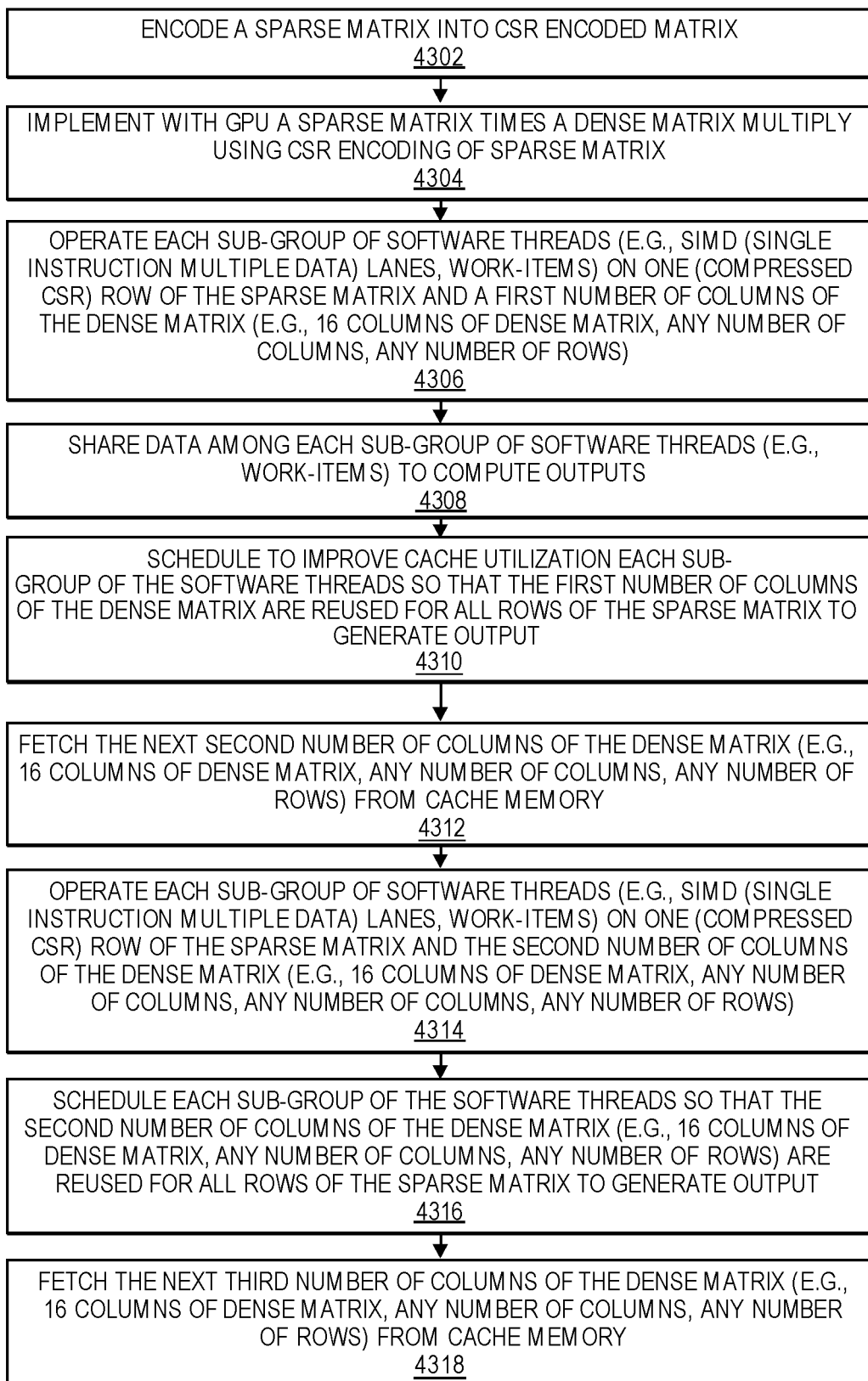
FIG. 43 illustrates a method for a Sparse Dense GEMM GPU implementation for sparsity in training, according to an embodiment.

FIG. 43 illustrates a method for a Sparse Dense GEMM GPU implementation for sparsity in training, according to an embodiment. A GPU or multi-core CPU performs operations of method 4300 in accordance with one embodiment.

At operation 4302, a GPU encodes a sparse matrix into CSR encoded matrix. At operation 4304, the GPU implements a sparse matrix times a dense matrix multiply using CSR encoding of sparse matrix. At operation 4306, each sub-group of software threads (e.g., SIMD (single instruction multiple data) lanes, work-items) operate on one (compressed CSR) row of the sparse matrix and a first number of columns of the dense matrix (e.g., 16 columns of dense matrix, any number of columns, any number of rows). At operation 4308, each sub-group of software threads share data among each other to compute outputs. At operation 4310, each sub-group of the software threads (e.g., workgroups) are scheduled to improve cache utilization so that the first number of columns of the dense matrix (e.g., 16 columns of dense matrix, any number of columns, any number of rows) are reused for all rows of the sparse matrix to generate output for sparsity in training. Subsequently, at operation 4312, the next second number of columns of the dense matrix (e.g., 16 columns of dense matrix, any number of columns, any number of rows) are fetched from cache memory.

At operation 4314, each sub-group of software threads (e.g., SIMD (single instruction multiple data) lanes, work-items) operate on one (compressed CSR) row of the sparse matrix and the second number of columns of the dense matrix (e.g., 16 columns of dense matrix, any number of columns, any number of rows). At operation 4316, each sub-group of the software threads are scheduled to improve cache utilization so that the second number of columns of the dense matrix (e.g., 16 columns of dense matrix, any number of columns, any number of rows) are reused for all rows of the sparse matrix to generate output for sparsity in training. Subsequently, at operation 4318, the next third number of columns of the dense matrix (e.g., 16 columns of dense matrix, any number of columns, any number of rows) are fetched from cache memory. The method 4300 continues until all columns of the dense matrix have been fetched from cache memory for the matrix operations to generate output for sparsity in training.

Figure 44:
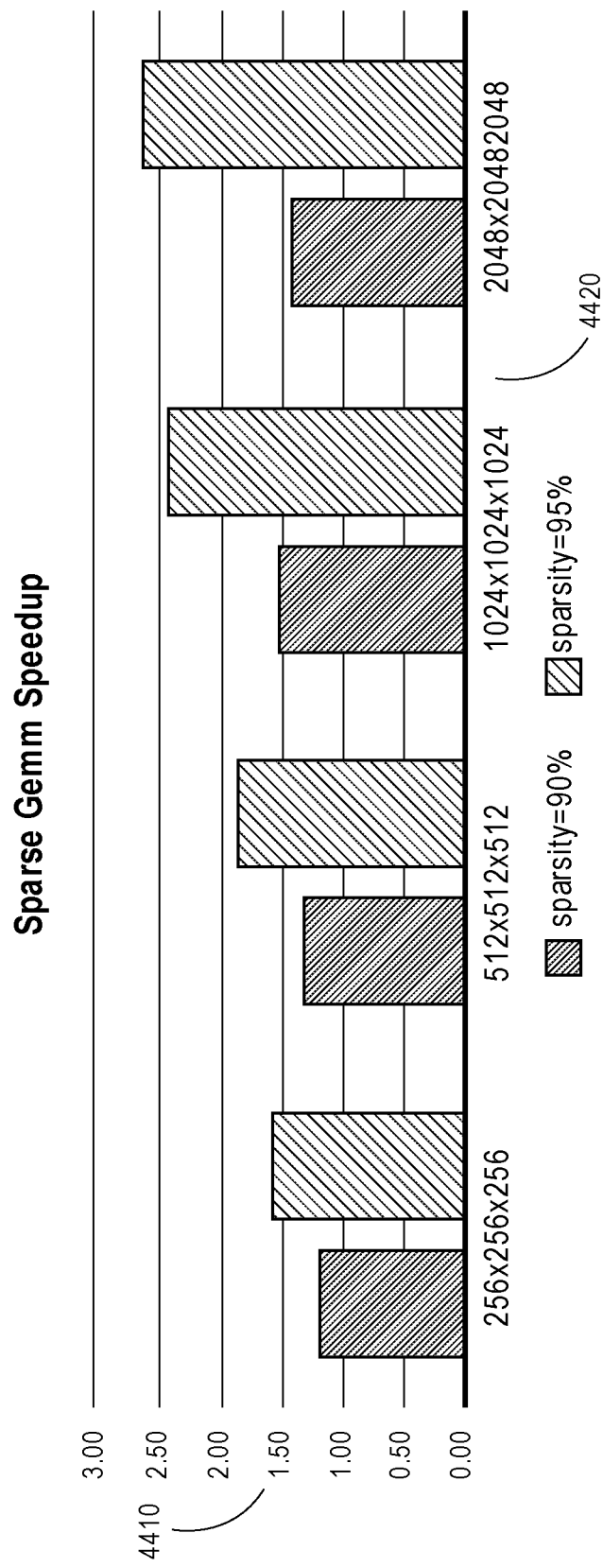
FIG. 44 illustrates a diagram of improved performance of sparse GEMM with respect to dense GEMM for standard matrix dimensions, in accordance with an embodiment.

FIG. 44 illustrates a diagram of improved performance of sparse GEMM with respect to dense GEMM for standard matrix dimensions, in accordance with an embodiment. A vertical axis 4410 represents x speedup (e.g., 1× speedup, 2× speedup, etc.) of sparse GEMM with respect to dense GEMM for standard matrix dimensions. A horizontal axis 4420 represents different standard matrix dimensions (e.g., m×n of sparse matrix x column of dense matrix. For high sparsity levels (e.g., approximately 95%), the present design achieves increased performance speedup as the matrix dimensions grow.

In one embodiment, detection logic (e.g., zero operand detection logic) for unimportant operands can optionally be implemented in any FPU of the present disclosure. In one example, detection logic 634*a-d* (e.g., zero operand detection logic) for unimportant operands has been inserted into the FPUs 634 of FIG. 6B.

All the SIMD lanes within a hardware thread execute instructions in lock step. If any of the input operands corresponding to any of the SIMD lanes for a multiply and accumulate operation (MAD) instruction comprises of unimportant values (e.g., zeros), MAD operation corresponding to those specific lanes are skipped. Since the design skips the compute operation for some of the lanes, this saves power. However, for this example, the present design does not save on bandwidth because the unimportant operand detection (e.g., zero operand detection) happens after reading the unimportant operands (e.g., zero operands) from the registers.

In some embodiments, a graphics processing unit (GPU) is communicatively coupled to host/processor cores to accelerate graphics operations, machine-learning operations, pattern analysis operations, and various general-purpose GPU (GPGPU) functions. The GPU may be communicatively coupled to the host processor/cores over a bus or another interconnect (e.g., a high-speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

System Overview

Figure 45:
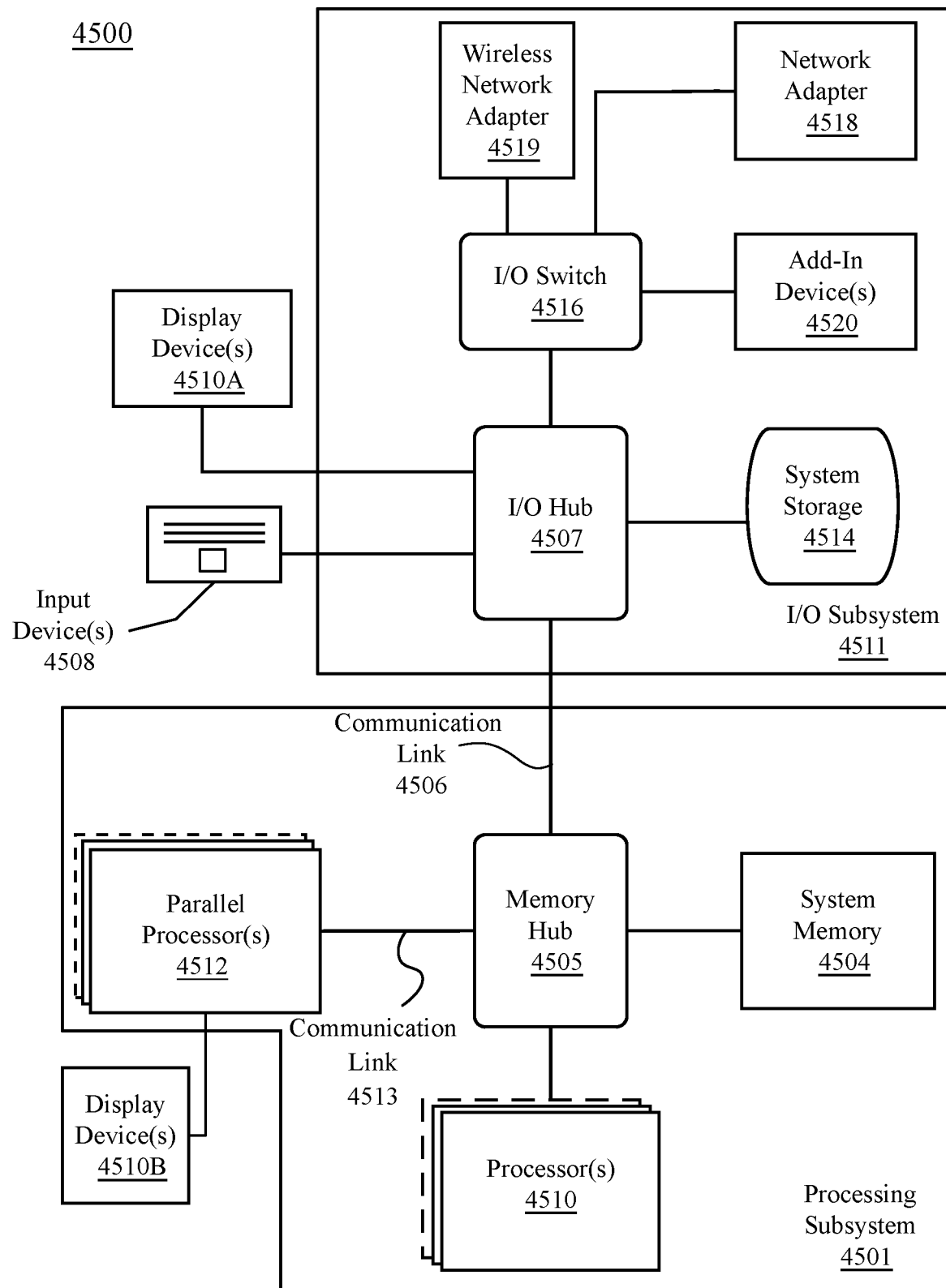
FIG. 45 is a block diagram illustrating a computer system configured to implement one or more aspects of the embodiments described herein.

FIG. 45 is a block diagram illustrating a computing system 4500 configured to implement one or more aspects of the embodiments described herein. The computing system 4500 includes a processing subsystem 4501 having one or more processor(s) 4502 and a system memory 4504 communicating via an interconnection path that may include a memory hub 4505. The memory hub 4505 may be a separate component within a chipset component or may be integrated within the one or more processor(s) 4502. The memory hub 4505 couples with an I/O subsystem 4511 via a communication link 4506. The I/O subsystem 4511 includes an I/O hub 4507 that can enable the computing system 4500 to receive input from one or more input device(s) 4508. Additionally, the I/O hub 4507 can enable a display controller, which may be included in the one or more processor(s) 4502, to provide outputs to one or more display device(s) 4510A. In one embodiment the one or more display device(s) 4510A coupled with the I/O hub 4507 can include a local, internal, or embedded display device.

In one embodiment the processing subsystem 4501 includes one or more parallel processor(s) 4512 coupled to memory hub 4505 via a bus or other communication link 4513. The communication link 4513 may be one of any number of standards based communication link technologies or protocols, such as, but not limited to PCI Express, or may be a vendor specific communications interface or communications fabric. In one embodiment the one or more parallel processor(s) 4512 form a computationally focused parallel or vector processing system that an include a large number of processing cores and/or processing clusters, such as a many integrated core (MIC) processor. In one embodiment the one or more parallel processor(s) 4512 form a graphics processing subsystem that can output pixels to one of the one or more display device(s) 4510A coupled via the I/O hub 4507. The one or more parallel processor(s) 4512 can also include a display controller and display interface (not shown) to enable a direct connection to one or more display device(s) 4510B.

Within the I/O subsystem 4511, a system storage unit 4514 can connect to the I/O hub 4507 to provide a storage mechanism for the computing system 4500. An I/O switch 4516 can be used to provide an interface mechanism to enable connections between the I/O hub 4507 and other components, such as a network adapter 4518 and/or wireless network adapter 4519 that may be integrated into the platform, and various other devices that can be added via one or more add-in device(s) 4520. The network adapter 4518 can be an Ethernet adapter or another wired network adapter. The wireless network adapter 4519 can include one or more of a Wi-Fi, Bluetooth, near field communication (NFC), or other network device that includes one or more wireless radios.

The computing system 4500 can include other components not explicitly shown, including USB or other port connections, optical storage drives, video capture devices, and the like, may also be connected to the I/O hub 4507. Communication paths interconnecting the various components in FIG. 45 may be implemented using any suitable protocols, such as PCI (Peripheral Component Interconnect) based protocols (e.g., PCI-Express), or any other bus or point-to-point communication interfaces and/or protocol(s), such as the NV-Link high-speed interconnect, or interconnect protocols known in the art.

In one embodiment, the one or more parallel processor(s) 4512 incorporate circuitry optimized for graphics and video processing, including, for example, video output circuitry, and constitutes a graphics processing unit (GPU). In another embodiment, the one or more parallel processor(s) 4512 incorporate circuitry optimized for general purpose processing, while preserving the underlying computational architecture, described in greater detail herein. In yet another embodiment, components of the computing system 4500 may be integrated with one or more other system elements on a single integrated circuit. For example, the one or more parallel processor(s), 4512 memory hub 4505, processor(s) 4502, and I/O hub 4507 can be integrated into a system on chip (SoC) integrated circuit. Alternatively, the components of the computing system 4500 can be integrated into a single package to form a system in package (SIP) configuration. In one embodiment at least a portion of the components of the computing system 488500 can be integrated into a multichip module (MCM), which can be interconnected with other multi-chip modules into a modular computing system.

It will be appreciated that the computing system 4500 shown herein is illustrative and that variations and modifications are possible. The connection topology, including the number and arrangement of bridges, the number of processor(s) 4502, and the number of parallel processor(s) 4512, may be modified as desired. For instance, in some embodiments, system memory 4504 is connected to the processor(s) 4502 directly rather than through a bridge, while other devices communicate with system memory 4504 via the memory hub 4505 and the processor(s) 4502. In other alternative topologies, the parallel processor(s) 4512 are connected to the I/O hub 4507 or directly to one of the one or more processor(s) 4502, rather than to the memory hub 4505. In other embodiments, the I/O hub 4507 and memory hub 4505 may be integrated into a single chip. Some embodiments may include two or more sets of processor(s) 4502 attached via multiple sockets, which can couple with two or more instances of the parallel processor(s) 4512.

Some of the particular components shown herein are optional and may not be included in all implementations of the computing system 4500. For example, any number of add-in cards or peripherals may be supported, or some components may be eliminated. Furthermore, some architectures may use different terminology for components similar to those illustrated in FIG. 1. For example, the memory hub 4505 may be referred to as a Northbridge in some architectures, while the I/O hub 4507 may be referred to as a Southbridge.

Figure 46A:
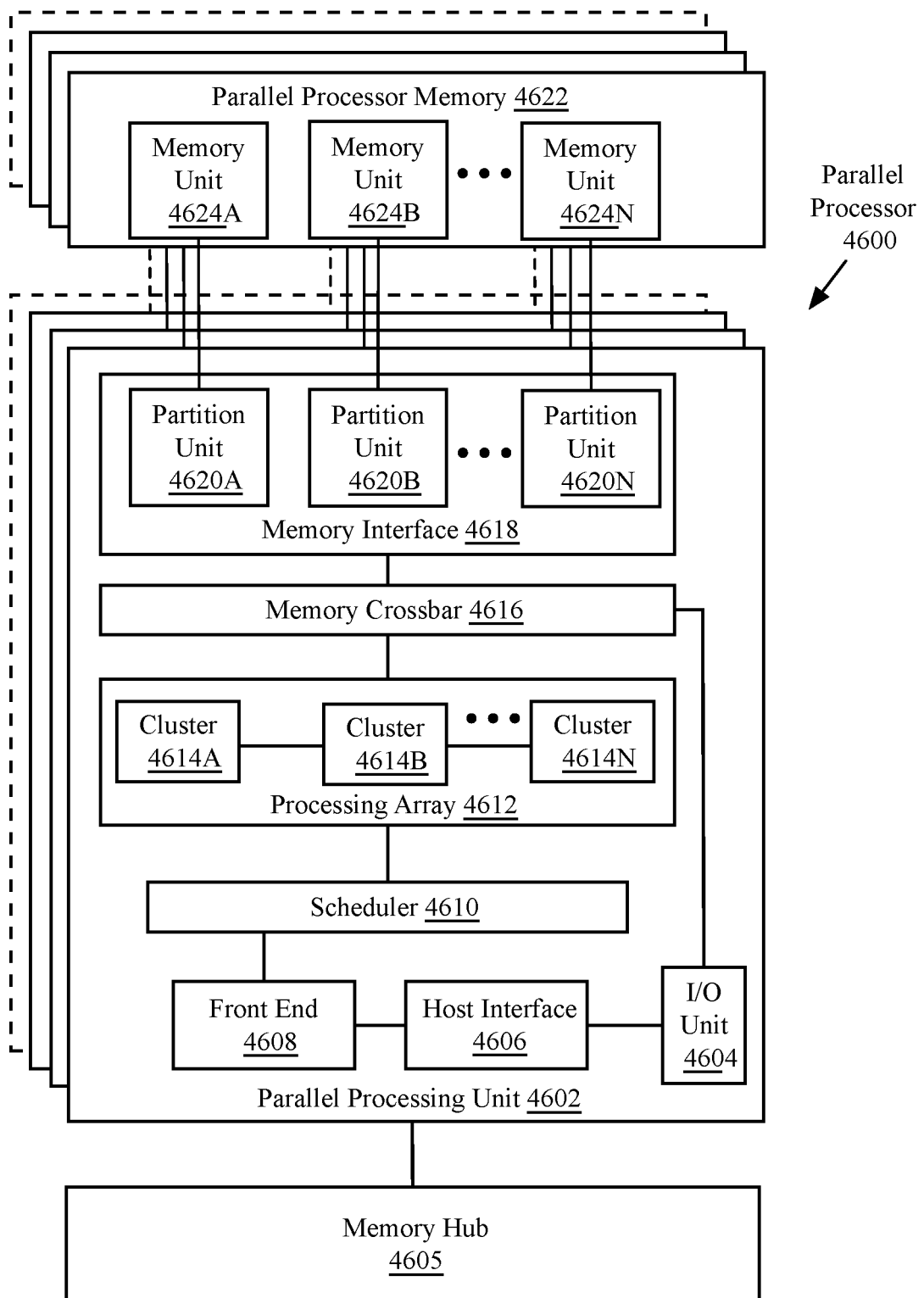
FIG. 46A-46D illustrate parallel processor components, according to an embodiment.

FIG. 46A illustrates a parallel processor 4600, according to an embodiment. The various components of the parallel processor 4600 may be implemented using one or more integrated circuit devices, such as programmable processors, application specific integrated circuits (ASICs), or field programmable gate arrays (FPGA). The illustrated parallel processor 4600 is a variant of the one or more parallel processor(s) 4512 shown in FIG. 45, according to an embodiment.

In one embodiment the parallel processor 4600 includes a parallel processing unit 4602. The parallel processing unit includes an I/O unit 4604 that enables communication with other devices, including other instances of the parallel processing unit 4602. The I/O unit 4604 may be directly connected to other devices. In one embodiment the I/O unit 4604 connects with other devices via the use of a hub or switch interface, such as memory hub 4505. The connections between the memory hub 4505 and the I/O unit 4604 form a communication link 4513. Within the parallel processing unit 4602, the I/O unit 4604 connects with a host interface 4606 and a memory crossbar 4616, where the host interface 4606 receives commands directed to performing processing operations and the memory crossbar 4616 receives commands directed to performing memory operations.

When the host interface 4606 receives a command buffer via the I/O unit 4604, the host interface 4606 can direct work operations to perform those commands to a front end 4608. In one embodiment the front end 4608 couples with a scheduler 4610, which is configured to distribute commands or other work items to a processing cluster array 4612. In one embodiment the scheduler 4610 ensures that the processing cluster array 4612 is properly configured and in a valid state before tasks are distributed to the processing clusters of the processing cluster array 4612. In one embodiment the scheduler 4610 is implemented via firmware logic executing on a microcontroller. The microcontroller implemented scheduler 4610 is configurable to perform complex scheduling and work distribution operations at coarse and fine granularity, enabling rapid preemption and context switching of threads executing on the processing cluster array 4612. In one embodiment, the host software can prove workloads for scheduling on the processing cluster array 4612 via one of multiple graphics processing doorbells. The workloads can then be automatically distributed across the processing array 4612 by the scheduler 4610 logic within the scheduler microcontroller.

The processing cluster array 4612 can include up to "N" processing clusters (e.g., cluster 4614A, cluster 4614B, through cluster 4614N). Each cluster 4614A-4614N of the processing cluster array 4612 can execute a large number of concurrent threads. The scheduler 4610 can allocate work to the clusters 4614A-4614N of the processing cluster array 4612 using various scheduling and/or work distribution algorithms, which may vary depending on the workload arising for each type of program or computation. The scheduling can be handled dynamically by the scheduler 4610, or can be assisted in part by compiler logic during compilation of program logic configured for execution by the processing cluster array 4612. In one embodiment, different clusters 4614A-4614N of the processing cluster array 4612 can be allocated for processing different types of programs or for performing different types of computations.

The processing cluster array 4612 can be configured to perform various types of parallel processing operations. In one embodiment the processing cluster array 4612 is configured to perform general-purpose parallel compute operations. For example, the processing cluster array 4612 can include logic to execute processing tasks including filtering of video and/or audio data, performing modeling operations, including physics operations, and performing data transformations.

In one embodiment the processing cluster array 4612 is configured to perform parallel graphics processing operations. In embodiments in which the parallel processor 4600 is configured to perform graphics processing operations, the processing cluster array 4612 can include additional logic to support the execution of such graphics processing operations, including, but not limited to texture sampling logic to perform texture operations, as well as tessellation logic and other vertex processing logic. Additionally, the processing cluster array 4612 can be configured to execute graphics processing related shader programs such as, but not limited to vertex shaders, tessellation shaders, geometry shaders, and pixel shaders. The parallel processing unit 4602 can transfer data from system memory via the I/O unit 4604 for processing. During processing the transferred data can be stored to on-chip memory (e.g., parallel processor memory 4622) during processing, then written back to system memory.

In one embodiment, when the parallel processing unit 4602 is used to perform graphics processing, the scheduler 4610 can be configured to divide the processing workload into approximately equal sized tasks, to better enable distribution of the graphics processing operations to multiple clusters 4614A-4614N of the processing cluster array 4612. In some embodiments, portions of the processing cluster array 4612 can be configured to perform different types of processing. For example, a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of the clusters 4614A-4614N may be stored in buffers to allow the intermediate data to be transmitted between clusters 4614A-4614N for further processing.

During operation, the processing cluster array 4612 can receive processing tasks to be executed via the scheduler 4610, which receives commands defining processing tasks from front end 4608. For graphics processing operations, processing tasks can include indices of data to be processed, e.g., surface (patch) data, primitive data, vertex data, and/or pixel data, as well as state parameters and commands defining how the data is to be processed (e.g., what program is to be executed). The scheduler 4610 may be configured to fetch the indices corresponding to the tasks or may receive the indices from the front end 4608. The front end 4608 can be configured to ensure the processing cluster array 4612 is configured to a valid state before the workload specified by incoming command buffers (e.g., batch-buffers, push buffers, etc.) is initiated.

Each of the one or more instances of the parallel processing unit 4602 can couple with parallel processor memory 4622. The parallel processor memory 4622 can be accessed via the memory crossbar 4616, which can receive memory requests from the processing cluster array 4612 as well as the I/O unit 4604. The memory crossbar 4616 can access the parallel processor memory 4622 via a memory interface 4618. The memory interface 4618 can include multiple partition units (e.g., partition unit 4620A, partition unit 4620B, through partition unit 4620N) that can each couple to a portion (e.g., memory unit) of parallel processor memory 4622. In one implementation, the number of partition units 4620A-4620N is configured to be equal to the number of memory units, such that a first partition unit 4620A has a corresponding first memory unit 4624A, a second partition unit 4620B has a corresponding memory unit 4624B, and an Nth partition unit 4620N has a corresponding Nth memory unit 4624N. In other embodiments, the number of partition units 4620A-4620N may not be equal to the number of memory devices.

In various embodiments, the memory units 4624A-4624N can include various types of memory devices, including dynamic random-access memory (DRAM) or graphics random access memory, such as synchronous graphics random access memory (SGRAM), including graphics double data rate (GDDR) memory. In one embodiment, the memory units 4624A-4624N may also include 3D stacked memory, including but not limited to high bandwidth memory (HBM). Persons skilled in the art will appreciate that the specific implementation of the memory units 4624A-4624N can vary, and can be selected from one of various conventional designs. Render targets, such as frame buffers or texture maps may be stored across the memory units 4624A-4624N, allowing partition units 4620A-4620N to write portions of each render target in parallel to efficiently use the available bandwidth of parallel processor memory 4622. In some embodiments, a local instance of the parallel processor memory 4622 may be excluded in favor of a unified memory design that utilizes system memory in conjunction with local cache memory.

In one embodiment, any one of the clusters 4614A-4614N of the processing cluster array 4612 can process data that will be written to any of the memory units 4624A-4624N within parallel processor memory 4622. The memory crossbar 4616 can be configured to transfer the output of each cluster 4614A-4614N to any partition unit 4620A-4620N or to another cluster 4614A-4614N, which can perform additional processing operations on the output. Each cluster 4614A-4614N can communicate with the memory interface 4618 through the memory crossbar 4616 to read from or write to various external memory devices. In one embodiment the memory crossbar 4616 has a connection to the memory interface 4618 to communicate with the I/O unit 4604, as well as a connection to a local instance of the parallel processor memory 4622, enabling the processing units within the different processing clusters 4614A-4614N to communicate with system memory or other memory that is not local to the parallel processing unit 4602. In one embodiment the memory crossbar 4616 can use virtual channels to separate traffic streams between the clusters 4614A-4614N and the partition units 4620A-4620N.

While a single instance of the parallel processing unit 4602 is illustrated within the parallel processor 4600, any number of instances of the parallel processing unit 4602 can be included. For example, multiple instances of the parallel processing unit 4602 can be provided on a single add-in card, or multiple add-in cards can be interconnected. The different instances of the parallel processing unit 4602 can be configured to inter-operate even if the different instances have different numbers of processing cores, different amounts of local parallel processor memory, and/or other configuration differences. For example, in one embodiment some instances of the parallel processing unit 4602 can include higher precision floating point units relative to other instances. Systems incorporating one or more instances of the parallel processing unit 4602 or the parallel processor 4600 can be implemented in a variety of configurations and form factors, including but not limited to desktop, laptop, or handheld personal computers, servers, workstations, game consoles, and/or embedded systems.

Figure 46B:
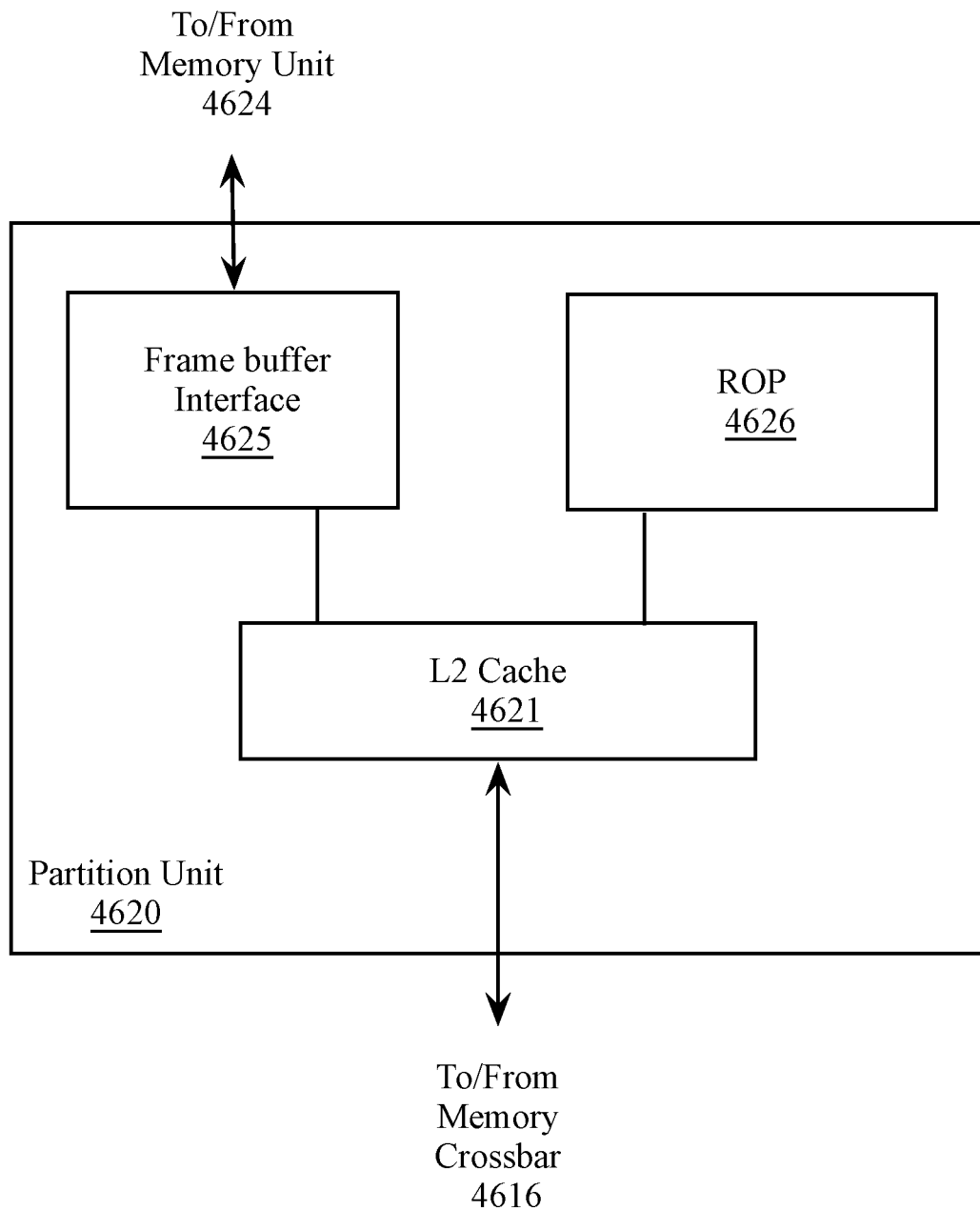

FIG. 46B is a block diagram of a partition unit 4620, according to an embodiment. In one embodiment the partition unit 4620 is an instance of one of the partition units 4620A-4620N of FIG. 46A. As illustrated, the partition unit 4620 includes an L2 cache 4621, a frame buffer interface 4625, and a ROP 4626 (raster operations unit). The L2 cache 4621 is a read/write cache that is configured to perform load and store operations received from the memory crossbar 4616 and ROP 4626. Read misses and urgent write-back requests are output by L2 cache 4621 to frame buffer interface 4625 for processing. Updates can also be sent to the frame buffer via the frame buffer interface 4625 for processing. In one embodiment the frame buffer interface 4625 interfaces with one of the memory units in parallel processor memory, such as the memory units 4624A-4624N of FIG. 46A (e.g., within parallel processor memory 4622).

In graphics applications, the ROP 4626 is a processing unit that performs raster operations such as stencil, z test, blending, and the like. The ROP 4626 then outputs processed graphics data that is stored in graphics memory. In some embodiments the ROP 4626 includes compression logic to compress depth or color data that is written to memory and decompress depth or color data that is read from memory. The compression logic can be lossless compression logic that makes use of one or more of multiple compression algorithms. The type of compression that is performed by the ROP 4626 can vary based on the statistical characteristics of the data to be compressed. For example, in one embodiment, delta color compression is performed on depth and color data on a per-tile basis.

In some embodiments, the ROP 4626 is included within each processing cluster (e.g., cluster 4614A-4614N of FIG. 46A) instead of within the partition unit 4620. In such embodiment, read and write requests for pixel data are transmitted over the memory crossbar 4616 instead of pixel fragment data. The processed graphics data may be displayed on a display device, such as one of the one or more display device(s) 4510 of FIG. 1, routed for further processing by the processor(s) 4502, or routed for further processing by one of the processing entities within the parallel processor 4600 of FIG. 46A.

Figure 46C:
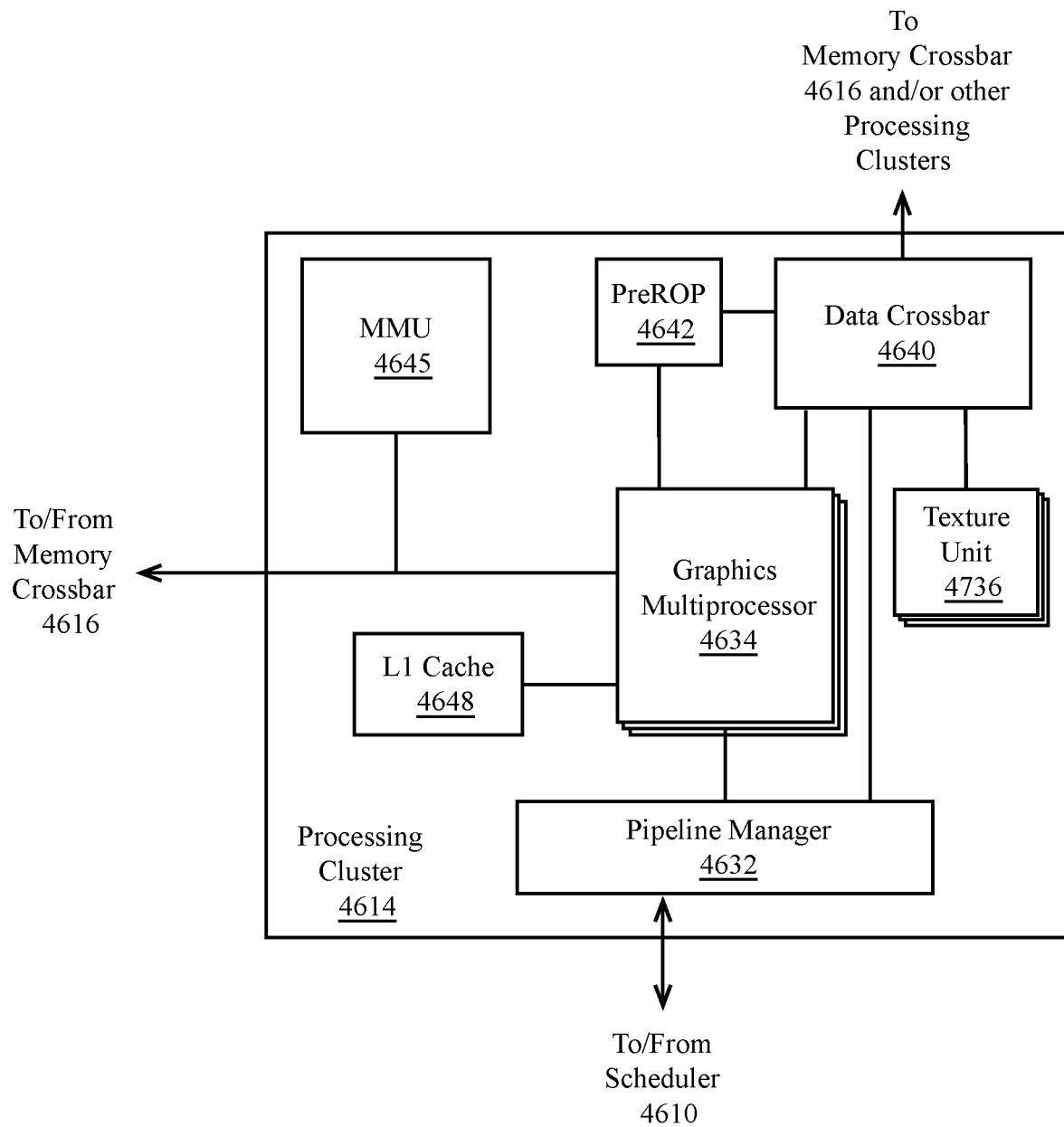

FIG. 46C is a block diagram of a processing cluster 4614 within a parallel processing unit, according to an embodiment. In one embodiment, the processing cluster is an instance of one of the processing clusters 4614A-4614N of FIG. 46A. The processing cluster 4614 can be configured to execute many threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the processing clusters. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of the processing cluster 4614 can be controlled via a pipeline manager 4632 that distributes processing tasks to SIMT parallel processors. The pipeline manager 4632 receives instructions from the scheduler 4610 of FIG. 46A and manages execution of those instructions via a graphics multiprocessor 4634 and/or a texture unit 4636. The illustrated graphics multiprocessor 4634 is an exemplary instance of a SIMT parallel processor. However, various types of SIMT parallel processors of differing architectures may be included within the processing cluster 4614. One or more instances of the graphics multiprocessor 4634 can be included within a processing cluster 4614. The graphics multiprocessor 4634 can process data and a data crossbar 4640 can be used to distribute the processed data to one of multiple possible destinations, including other shader units. The pipeline manager 4632 can facilitate the distribution of processed data by specifying destinations for processed data to be distributed vis the data crossbar 4640.

Each graphics multiprocessor 4634 within the processing cluster 4614 can include an identical set of functional execution logic (e.g., arithmetic logic units, load-store units, etc.). The functional execution logic can be configured in a pipelined manner in which new instructions can be issued before previous instructions are complete. The functional execution logic supports a variety of operations including integer and floating-point arithmetic, comparison operations, Boolean operations, bit-shifting, and computation of various algebraic functions. In one embodiment the same functional-unit hardware can be leveraged to perform different operations and any combination of functional units may be present.

The instructions transmitted to the processing cluster 4614 constitutes a thread. A set of threads executing across the set of parallel processing engines is a thread group. A thread group executes the same program on different input data. Each thread within a thread group can be assigned to a different processing engine within a graphics multiprocessor 4634. A thread group may include fewer threads than the number of processing engines within the graphics multiprocessor 4634. When a thread group includes fewer threads than the number of processing engines, one or more of the processing engines may be idle during cycles in which that thread group is being processed. A thread group may also include more threads than the number of processing engines within the graphics multiprocessor 4634. When the thread group includes more threads than the number of processing engines within the graphics multiprocessor 4634, processing can be performed over consecutive clock cycles. In one embodiment multiple thread groups can be executed concurrently on a graphics multiprocessor 4634.

In one embodiment the graphics multiprocessor 4634 includes an internal cache memory to perform load and store operations. In one embodiment, the graphics multiprocessor 4634 can forego an internal cache and use a cache memory (e.g., L1 cache 4648) within the processing cluster 4614. Each graphics multiprocessor 4634 also has access to L2 caches within the partition units (e.g., partition units 4620A-4620N of FIG. 46A) that are shared among all processing clusters 4614 and may be used to transfer data between threads. The graphics multiprocessor 4634 may also access off-chip global memory, which can include one or more of local parallel processor memory and/or system memory. Any memory external to the parallel processing unit 4602 may be used as global memory. Embodiments in which the processing cluster 4614 includes multiple instances of the graphics multiprocessor 4634 can share common instructions and data, which may be stored in the L1 cache 4748.

Each processing cluster 4614 may include an MMU 4645 (memory management unit) that is configured to map virtual addresses into physical addresses. In other embodiments, one or more instances of the MMU 4645 may reside within the memory interface 4618 of FIG. 46A. The MMU 4645 includes a set of page table entries (PTEs) used to map a virtual address to a physical address of a tile and optionally a cache line index. The MMU 4645 may include address translation lookaside buffers (TLB) or caches that may reside within the graphics multiprocessor 4634 or the L1 cache or processing cluster 4614. The physical address is processed to distribute surface data access locality to allow efficient request interleaving among partition units. The cache line index may be used to determine whether a request for a cache line is a hit or miss.

In graphics and computing applications, a processing cluster 4614 may be configured such that each graphics multiprocessor 4634 is coupled to a texture unit 4636 for performing texture mapping operations, e.g., determining texture sample positions, reading texture data, and filtering the texture data. Texture data is read from an internal texture L1 cache (not shown) or in some embodiments from the L1 cache within graphics multiprocessor 4634 and is fetched from an L2 cache, local parallel processor memory, or system memory, as needed. Each graphics multiprocessor 4634 outputs processed tasks to the data crossbar 4640 to provide the processed task to another processing cluster 4614 for further processing or to store the processed task in an L2 cache, local parallel processor memory, or system memory via the memory crossbar 4616. A preROP 4642 (pre-raster operations unit) is configured to receive data from graphics multiprocessor 4634, direct data to ROP units, which may be located with partition units as described herein (e.g., partition units 4620A-4620N of FIG. 2). The preROP 4642 unit can perform optimizations for color blending, organize pixel color data, and perform address translations.

It will be appreciated that the core architecture described herein is illustrative and that variations and modifications are possible. Any number of processing units, e.g., graphics multiprocessor 4634, texture units 4636, preROPs 4642, etc., may be included within a processing cluster 4614. Further, while only one processing cluster 4614 is shown, a parallel processing unit as described herein may include any number of instances of the processing cluster 4614. In one embodiment, each processing cluster 4614 can be configured to operate independently of other processing clusters 4614 using separate and distinct processing units, L1 caches, etc.

Figure 46D:
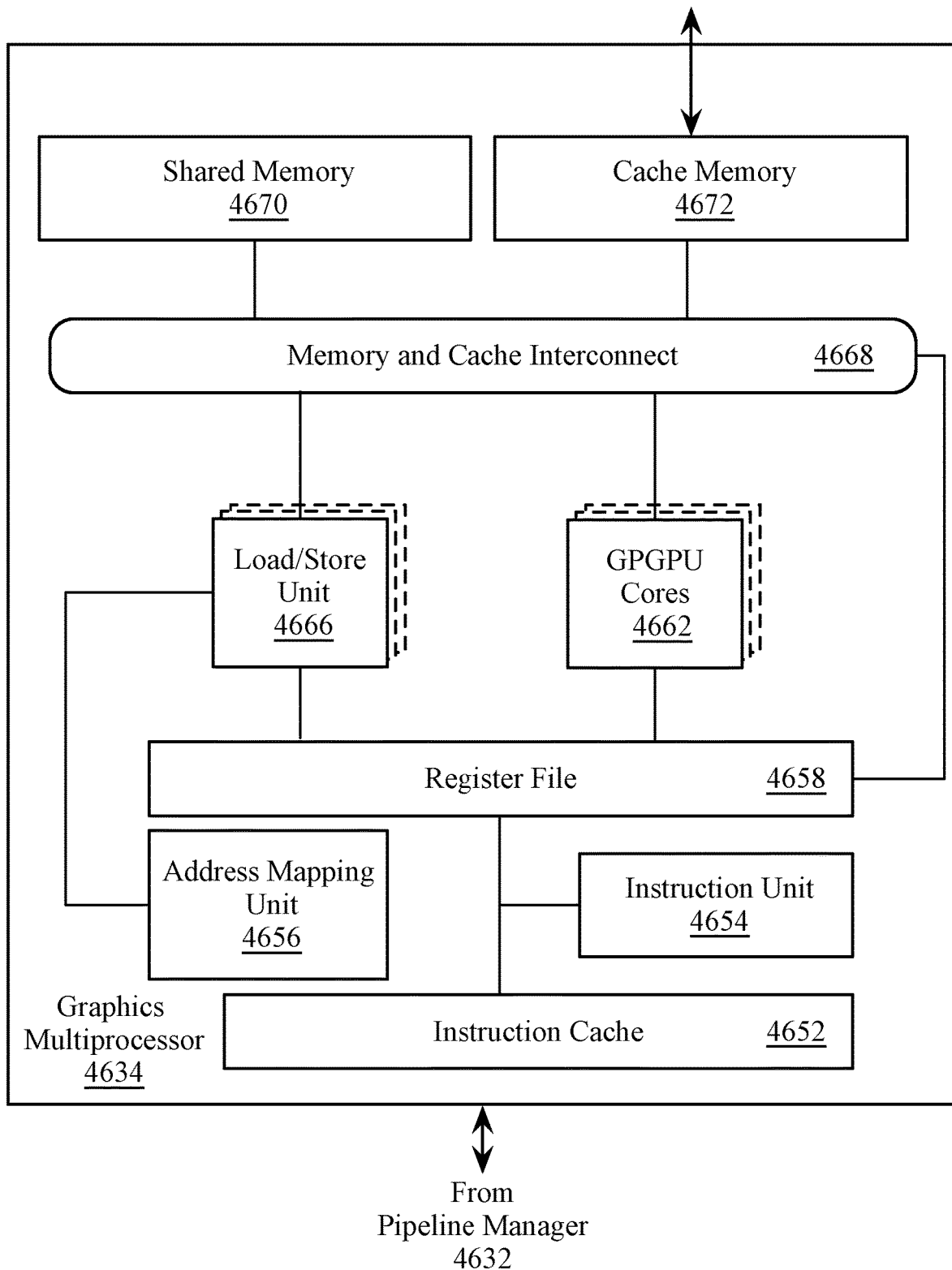

FIG. 46D shows a graphics multiprocessor 4634, according to one embodiment. In such embodiment, the graphics multiprocessor 4634 couples with the pipeline manager 4632 of the processing cluster 4614. The graphics multiprocessor 4634 has an execution pipeline including but not limited to an instruction cache 4652, an instruction unit 4654, an address mapping unit 4656, a register file 4658, one or more general purpose graphics processing unit (GPGPU) cores 4662, and one or more load/store units 4666. The GPGPU cores 4662 and load/store units 4666 are coupled with cache memory 4672 and shared memory 4670 via a memory and cache interconnect 4668.

In one embodiment, the instruction cache 4652 receives a stream of instructions to execute from the pipeline manager 4632. The instructions are cached in the instruction cache 4652 and dispatched for execution by the instruction unit 4654. The instruction unit 4654 can dispatch instructions as thread groups (e.g., warps), with each thread of the thread group assigned to a different execution unit within GPGPU core 4662. An instruction can access any of a local, shared, or global address space by specifying an address within a unified address space. The address mapping unit 4656 can be used to translate addresses in the unified address space into a distinct memory address that can be accessed by the load/store units 4666.

The register file 4658 provides a set of registers for the functional units of the graphics multiprocessor 4624. The register file 4658 provides temporary storage for operands connected to the data paths of the functional units (e.g., GPGPU cores 4662, load/store units 4666) of the graphics multiprocessor 4624. In one embodiment, the register file 4658 is divided between each of the functional units such that each functional unit is allocated a dedicated portion of the register file 4658. In one embodiment, the register file 4658 is divided between the different warps being executed by the graphics multiprocessor 4624.

The GPGPU cores 4662 can each include floating point units (FPUs) and/or integer arithmetic logic units (ALUs) that are used to execute instructions of the graphics multiprocessor 4624. The GPGPU cores 4662 can be similar in architecture or can differ in architecture, according to embodiments. For example, in one embodiment, a first portion of the GPGPU cores 4662 include a single precision FPU and an integer ALU while a second portion of the GPGPU cores include a double precision FPU. In one embodiment, the FPUs can implement the IEEE 754-46008 standard for floating point arithmetic or enable variable precision floating point arithmetic. The graphics multiprocessor 4624 can additionally include one or more fixed function or special function units to perform specific functions such as copy rectangle or pixel blending operations. In one embodiment one or more of the GPGPU cores can also include fixed or special function logic.

In one embodiment, the GPGPU cores 4662 include SIMD logic capable of performing a single instruction on multiple sets of data. In one embodiment GPGPU cores 4662 can physically execute SIMD4, SIMD8, and SIMD16 instructions and logically execute SIMD1, SIMD2, and SIMD32 instructions. The SIMD instructions for the GPGPU cores can be generated at compile time by a shader compiler or automatically generated when executing programs written and compiled for single program multiple data (SPMD) or SIMT architectures. Multiple threads of a program configured for the SIMT execution model can executed via a single SIMD instruction. For example and in one embodiment, eight SIMT threads that perform the same or similar operations can be executed in parallel via a single SIMD8 logic unit.

The memory and cache interconnect 4668 is an interconnect network that connects each of the functional units of the graphics multiprocessor 4624 to the register file 4658 and to the shared memory 4670. In one embodiment, the memory and cache interconnect 4668 is a crossbar interconnect that allows the load/store unit 4666 to implement load and store operations between the shared memory 4670 and the register file 4658. The register file 4658 can operate at the same frequency as the GPGPU cores 4662, thus data transfer between the GPGPU cores 4662 and the register file 4658 is very low latency. The shared memory 4670 can be used to enable communication between threads that execute on the functional units within the graphics multiprocessor 4634. The cache memory 4672 can be used as a data cache for example, to cache texture data communicated between the functional units and the texture unit 4636. The shared memory 4670 can also be used as a program managed cached. Threads executing on the GPGPU cores 4662 can programmatically store data within the shared memory in addition to the automatically cached data that is stored within the cache memory 4672.

Figure 47A:
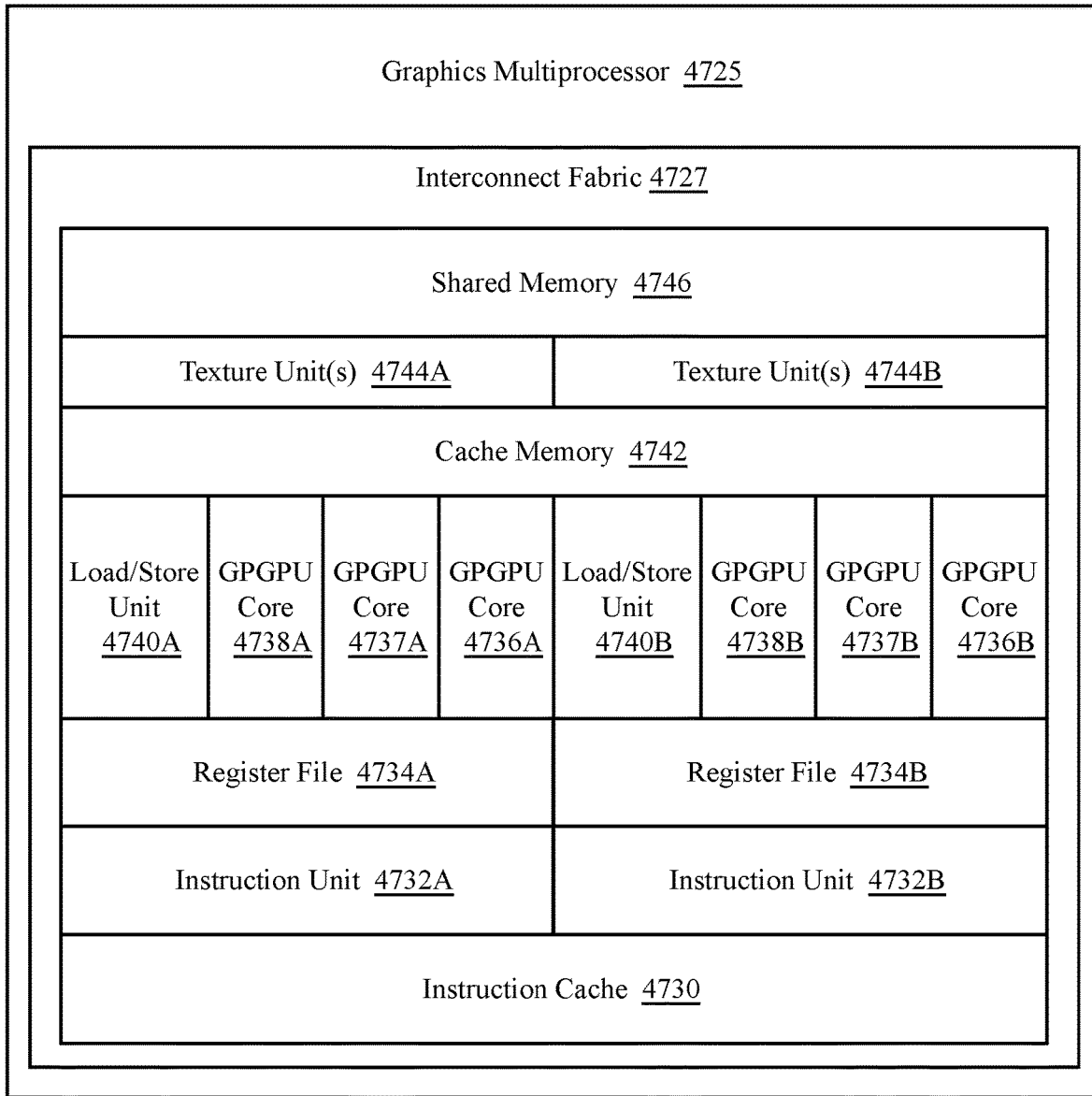
FIGS. 47A-47B are block diagrams of graphics multiprocessors, according to embodiments.
Figure 47B:
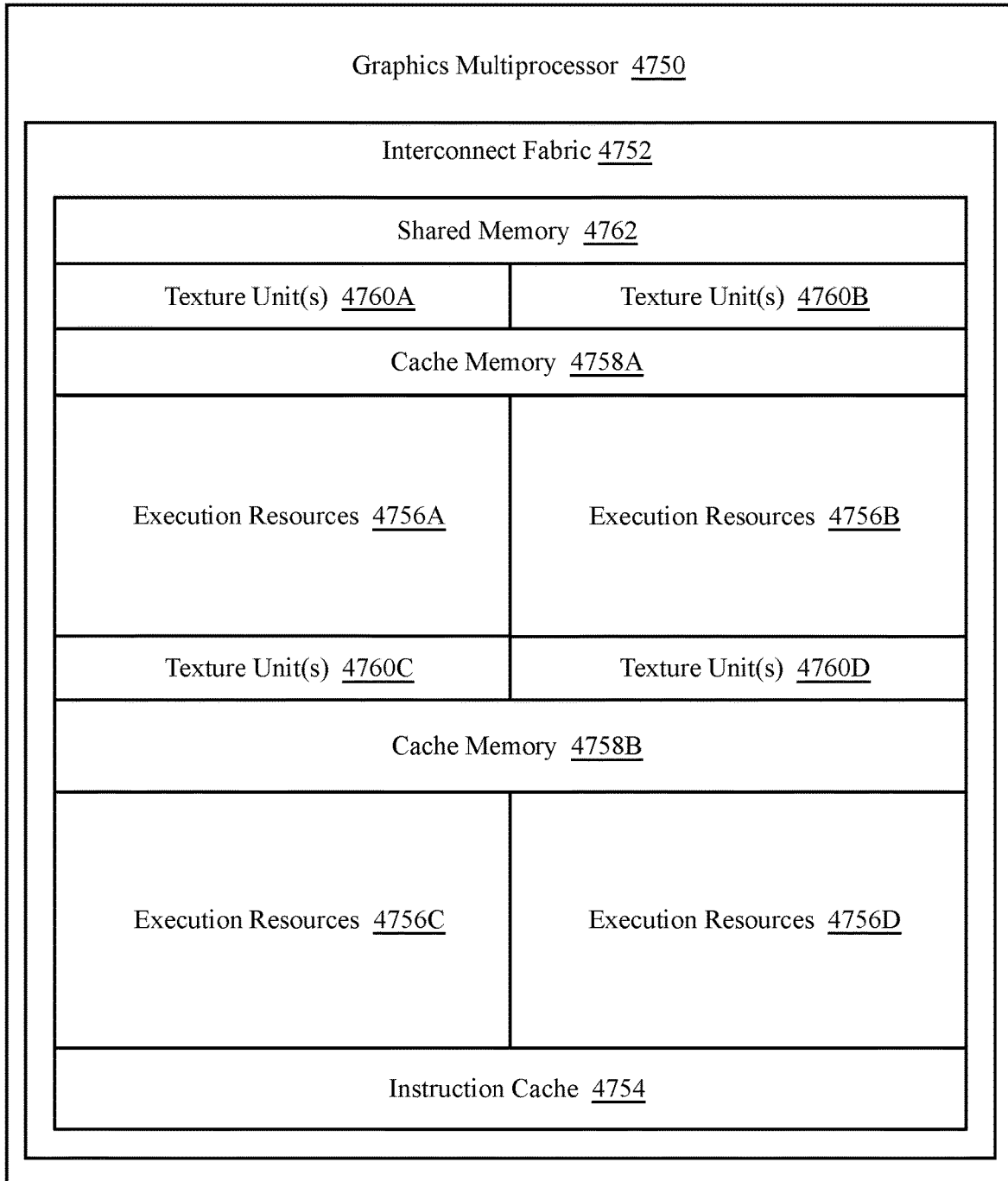

FIGS. 47A-47B illustrate additional graphics multiprocessors, according to embodiments. The illustrated graphics multiprocessors 4725, 4750 are variants of the graphics multiprocessor 4634 of FIG. 46C. The illustrated graphics multiprocessors 4725, 4750 can be configured as a streaming multiprocessor (SM) capable of simultaneous execution of a large number of execution threads.

FIG. 47A shows a graphics multiprocessor 4725 according to an additional embodiment. The graphics multiprocessor 4725 includes multiple additional instances of execution resource units relative to the graphics multiprocessor 4634 of FIG. 46D. For example, the graphics multiprocessor 4725 can include multiple instances of the instruction unit 4732A-4732B, register file 4734A-4734B, and texture unit(s)

4744A-4744B. The graphics multiprocessor 4725 also includes multiple sets of graphics or compute execution units (e.g., GPGPU core 4736A-4736B, GPGPU core 4737A-4737B, GPGPU core 4738A-4738B) and multiple sets of load/store units 4740A-4740B. In one embodiment the execution resource units have a common instruction cache 4730, texture and/or data cache memory 4742, and shared memory 4746.

The various components can communicate via an interconnect fabric 4727. In one embodiment the interconnect fabric 4727 includes one or more crossbar switches to enable communication between the various components of the graphics multiprocessor 4725. In one embodiment the interconnect fabric 4727 is a separate, high-speed network fabric layer upon which each component of the graphics multiprocessor 4725 is stacked. The components of the graphics multiprocessor 4725 communicate with remote components via the interconnect fabric 4727. For example, the GPGPU cores 4736A-4736B, 4737A-4737B, and 47378A-4738B can each communicate with shared memory 4746 via the interconnect fabric 4727. The interconnect fabric 4727 can arbitrate communication within the graphics multiprocessor 4725 to ensure a fair bandwidth allocation between components.

FIG. 47B shows a graphics multiprocessor 4750 according to an additional embodiment. The graphics processor includes multiple sets of execution resources 4756A-4756D, where each set of execution resource includes multiple instruction units, register files, GPGPU cores, and load store units, as illustrated in FIG. 46D and FIG. 47A. The execution resources 4756A-4756D can work in concert with texture unit(s) 4760A-4760D for texture operations, while sharing an instruction cache 4754, and shared memory 4762. In one embodiment the execution resources 4756A-4756D can share an instruction cache 4754 and shared memory 4762, as well as multiple instances of a texture and/or data cache memory 4758A-4758B. The various components can communicate via an interconnect fabric 4752 similar to the interconnect fabric 4727 of FIG. 47A.

Persons skilled in the art will understand that the architecture described in FIGS. 45, 46A-46D, and 47A-47B are descriptive and not limiting as to the scope of the present embodiments. Thus, the techniques described herein may be implemented on any properly configured processing unit, including, without limitation, one or more mobile application processors, one or more desktop or server central processing units (CPUs) including multi-core CPUs, one or more parallel processing units, such as the parallel processing unit 4602 of FIG. 46A, as well as one or more graphics processors or special purpose processing units, without departure from the scope of the embodiments described herein.

Figure 48A:
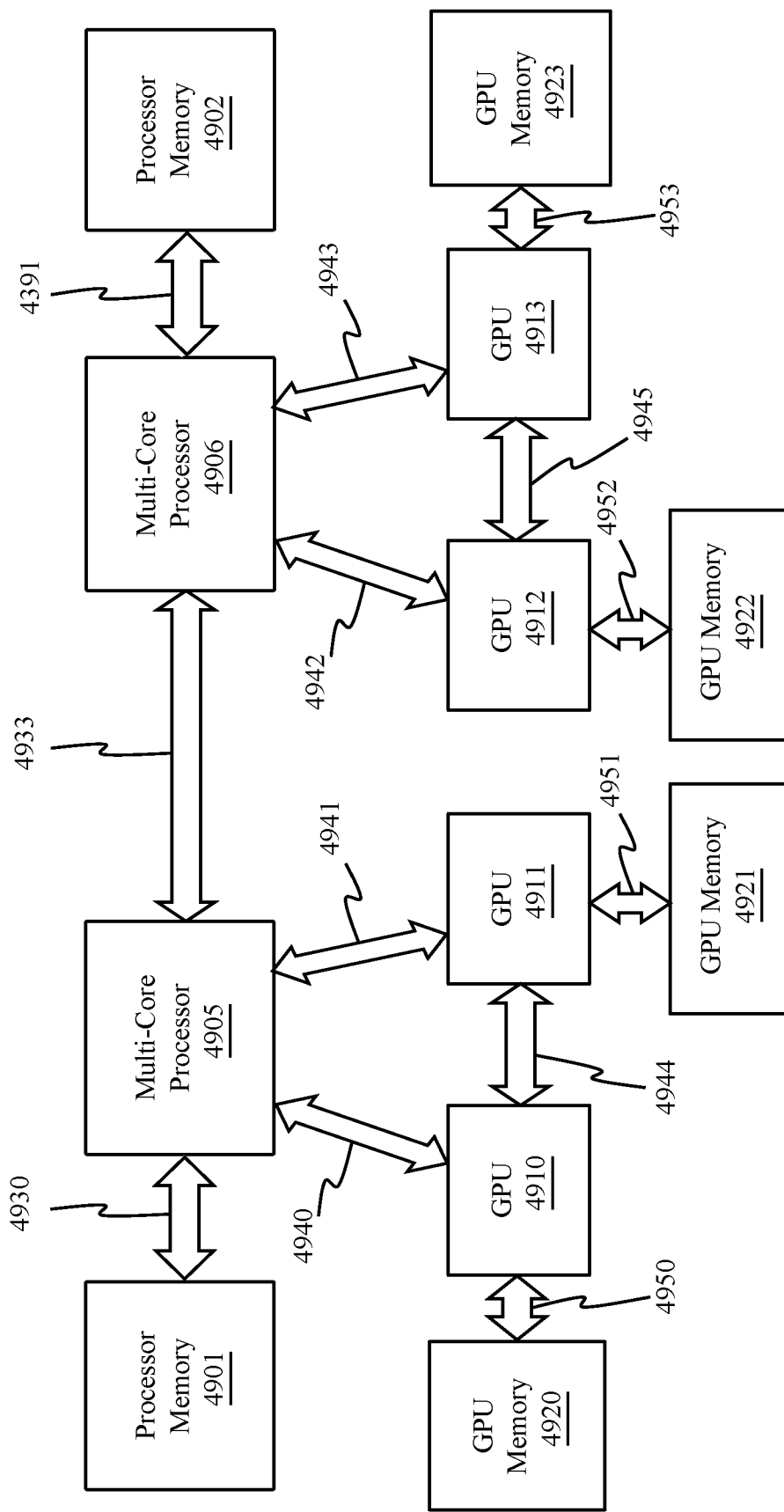
FIG. 48A-48G illustrate an exemplary architecture in which a plurality of GPUs is communicatively coupled to a plurality of multi-core processors.

In some embodiments a parallel processor or GPGPU as described herein is communicatively coupled to host/processor cores to accelerate graphics operations, machine-learning operations, pattern analysis operations, and various general purpose GPU (GPGPU) functions. The GPU may be communicatively coupled to the host processor/cores over a bus or other interconnect (e.g., a high speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions. Techniques for GPU to Host Processor Interconnection FIG. 48A illustrates an exemplary architecture in which a plurality of GPUs 4910-4913 is communicatively coupled to a plurality of multi-core processors 4905-4906 over high-speed links 4940-4943 (e.g., buses, point-to-point interconnects, etc.). In one embodiment, the high-speed links 4940-4943 support a communication throughput of 4 GB/s, 30 GB/s, 80 GB/s or higher, depending on the implementation. Various interconnect protocols may be used including, but not limited to, PCIe 4.0 or 5.0 and NVLink 2.0. However, the underlying principles of the invention are not limited to any particular communication protocol or throughput.

In addition, in one embodiment, two or more of the GPUs 4910-413 are interconnected over high-speed links 4944-4945, which may be implemented using the same or different protocols/links than those used for high-speed links 4940-4943. Similarly, two or more of the multi-core processors 4905-4906 may be connected over high speed link 4933 which may be symmetric multi-processor (SMP) buses operating at 20 GB/s, 30 GB/s, 4520 GB/s or higher. Alternatively, all communication between the various system components shown in FIG. 48A may be accomplished using the same protocols/links (e.g., over a common interconnection fabric). As mentioned, however, the underlying principles of the invention are not limited to any particular type of interconnect technology.

In one embodiment, each multi-core processor 4905-4906 is communicatively coupled to a processor memory 4901-4902, via memory interconnects 4930-4931, respectively, and each GPU 4910-4913 is communicatively coupled to GPU memory 4920-4923 over GPU memory interconnects 4950-4953, respectively. The memory interconnects 4930-4931 and 4950-4953 may utilize the same or different memory access technologies. By way of example, and not limitation, the processor memories 4901-4902 and GPU memories 4920-4923 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D)(Point or Nano-Ram. In one embodiment, some portion of the memories may be volatile memory and another portion may be non-volatile memory (e.g., using a two-level memory (2LM) hierarchy).

As described below, although the various processors 4905-4906 and GPUs 4910-4913 may be physically coupled to a particular memory 4901-4902, 4920-4923, respectively, a unified memory architecture may be implemented in which the same virtual system address space (also referred to as the "effective address" space) is distributed among all of the various physical memories. For example, processor memories 4901-4902 may each comprise 64 GB of the system memory address space and GPU memories 4920-4923 may each comprise 32 GB of the system memory address space (resulting in a total of 4656 GB addressable memory in this example).

Figure 48B:
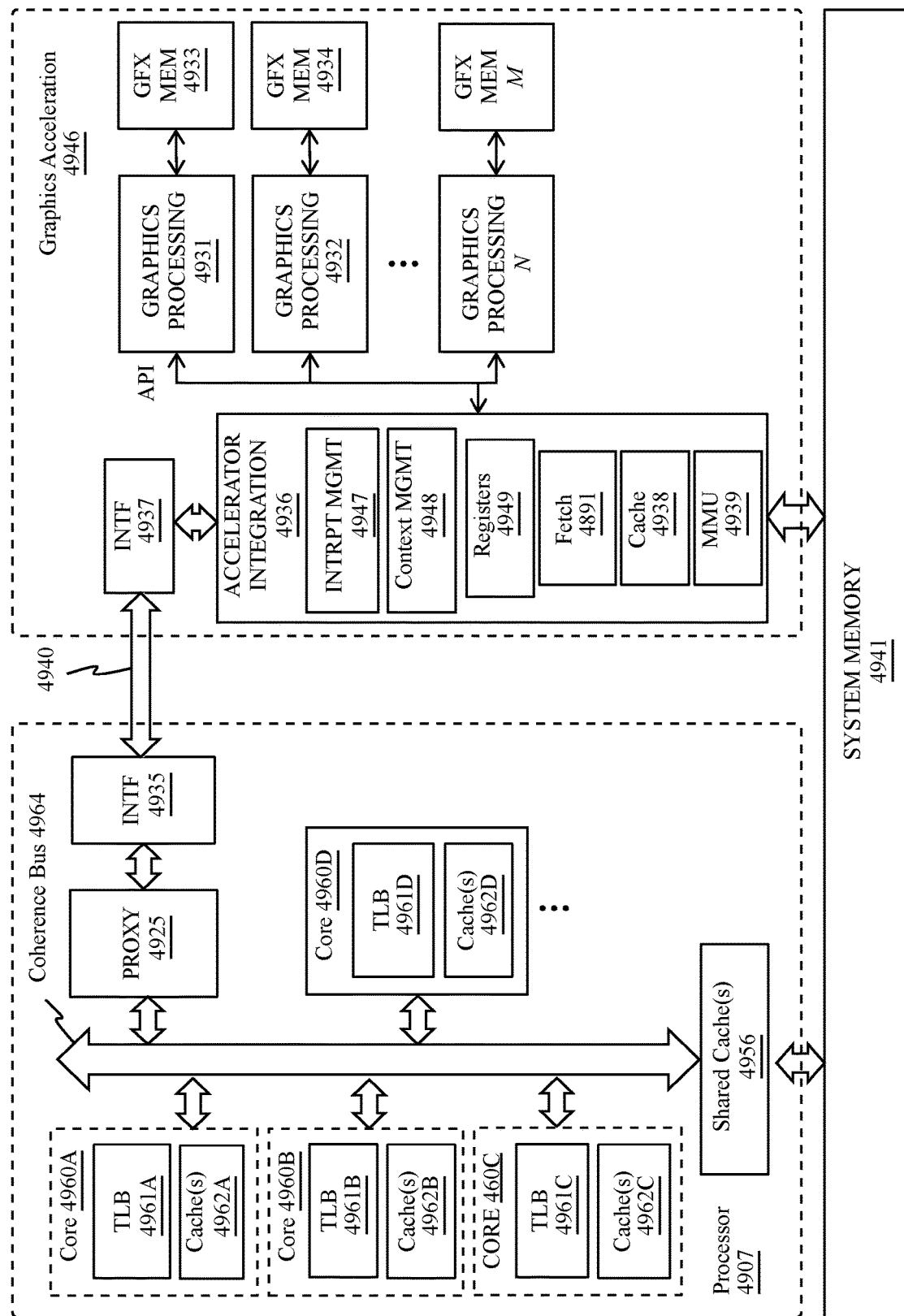

FIG. 48B illustrates additional details for an interconnection between a multi-core processor 4907 and a graphics acceleration module 4946 in accordance with one embodiment. The graphics acceleration module 4946 may include one or more GPU chips integrated on a line card which is coupled to the processor 4907 via the high-speed link 4940. Alternatively, the graphics acceleration module 4946 may be integrated on the same package or chip as the processor 4907.

The illustrated processor 4907 includes a plurality of cores 4960A-4960D, each with a translation lookaside buffer 4961A-4961D and one or more caches 4962A-4962D. The cores may include various other components for executing instructions and processing data which are not illustrated to avoid obscuring the underlying principles of the invention (e.g., instruction fetch units, branch prediction units, decoders, execution units, reorder buffers, etc.). The caches 4962A-4962D may comprise level 1 (L1) and level 2 (L2) caches. In addition, one or more shared caches 4956 may be included in the caching hierarchy and shared by sets of the cores 4960A-4960D. For example, one embodiment of the processor 4907 includes 24 cores, each with its own L1 cache, twelve shared L2 caches, and twelve shared L3 caches. In this embodiment, one of the L2 and L3 caches are shared by two adjacent cores. The processor 4907 and the graphics accelerator integration module 4946 connect with system memory 4941, which may include processor memories 4901-4902

Coherency is maintained for data and instructions stored in the various caches 4962A-4962D, 4956 and system memory 4941 via inter-core communication over a coherence bus 4964. For example, each cache may have cache coherency logic/circuitry associated therewith to communicate to over the coherence bus 4964 in response to detected reads or writes to particular cache lines. In one implementation, a cache snooping protocol is implemented over the coherence bus 4964 to snoop cache accesses. Cache snooping/coherency techniques are well understood by those of skill in the art and will not be described in detail here to avoid obscuring the underlying principles of the invention.

In one embodiment, a proxy circuit 4925 communicatively couples the graphics acceleration module 4946 to the coherence bus 4964, allowing the graphics acceleration module 4946 to participate in the cache coherence protocol as a peer of the cores. In particular, an interface 4935 provides connectivity to the proxy circuit 4925 over high-speed link 4940 (e.g., a PCIe bus, NVLink, etc.) and an interface 4937 connects the graphics acceleration module 4946 to the high-speed link 4940.

In one implementation, an accelerator integration circuit 4936 provides cache management, memory access, context management, and interrupt management services on behalf of a plurality of graphics processing engines 4931, 4932, N of the graphics acceleration module 4946. The graphics processing engines 4931, 4932, N may each comprise a separate graphics processing unit (GPU). Alternatively, the graphics processing engines 4931, 4932, N may comprise different types of graphics processing engines within a GPU such as graphics execution units, media processing engines (e.g., video encoders/decoders), samplers, and blit engines. In other words, the graphics acceleration module may be a GPU with a plurality of graphics processing engines 4931-4932, N or the graphics processing engines 4931-4932, N may be individual GPUs integrated on a common package, line card, or chip.

In one embodiment, the accelerator integration circuit 4936 includes a memory management unit (MMU) 4939 for performing various memory management functions such as virtual-to-physical memory translations (also referred to as effective-to-real memory translations) and memory access protocols for accessing system memory 4941. The MMU 4939 may also include a translation lookaside buffer (TLB) (not shown) for caching the virtual/effective to physical/real address translations. In one implementation, a cache 4938 stores commands and data for efficient access by the graphics processing engines 4931-4932, N. In one embodiment, the data stored in cache 4938 and graphics memories 4933-4934, N is kept coherent with the core caches 4962A-4962D, 4956 and system memory 4911. As mentioned, this may be accomplished via proxy circuit 4925 which takes part in the cache coherency mechanism on behalf of cache 4938 and memories 4933-4934, N (e.g., sending updates to the cache 4938 related to modifications/accesses of cache lines on processor caches 4962A-4962D, 4956 and receiving updates from the cache 4938).

A set of registers 4949 store context data for threads executed by the graphics processing engines 4931-4932, N and a context management circuit 4948 manages the thread contexts. For example, the context management circuit 4948 may perform save and restore operations to save and restore contexts of the various threads during contexts switches (e.g., where a first thread is saved, and a second thread is stored so that the second thread can be execute by a graphics processing engine). For example, on a context switch, the context management circuit 4948 may store current register values to a designated region in memory (e.g., identified by a context pointer). It may then restore the register values when returning to the context. In one embodiment, an interrupt management circuit 4947 receives and processes interrupts received from system devices.

In one implementation, virtual/effective addresses from a graphics processing engine 4931 are translated to real/physical addresses in system memory 4911 by the MMU 4939. One embodiment of the accelerator integration circuit 4936 supports multiple (e.g., 4, 8, 16) instances of graphics accelerator module 4946 and/or other accelerator devices. The graphics accelerator module 4946 may be dedicated to a single application executed on the processor 4907 or may be shared between multiple applications. In one embodiment, a virtualized graphics execution environment is presented in which the resources of the graphics processing engines 4931-4932, N are shared with multiple applications or virtual machines (VMs). The resources may be subdivided into "slices" which are allocated to different VMs and/or applications based on the processing requirements and priorities associated with the VMs and/or applications.

Thus, the accelerator integration circuit acts as a bridge to the system for the graphics acceleration module 4946 and provides address translation and system memory cache services. In addition, the accelerator integration circuit 4936 may provide virtualization facilities for the host processor to manage virtualization of the graphics processing engines, interrupts, and memory management.

Because hardware resources of the graphics processing engines 4931-4932, N are mapped explicitly to the real address space seen by the host processor 4907, any host processor can address these resources directly using an effective address value. One function of the accelerator integration circuit 4936, in one embodiment, is the physical separation of the graphics processing engines 4931-4932, N so that they appear to the system as independent units.

As mentioned, in the illustrated embodiment, one or more graphics memories 4933-4934, M are coupled to each of the graphics processing engines 4931-4932, N, respectively. The graphics memories 4933-4934, M store instructions and data being processed by each of the graphics processing engines 4931-4932, N. The graphics memories 4933-4934, M may be volatile memories such as DRAMs (including stacked DRAMs), GDDR memory (e.g., GDDR5, GDDR6), or HBM, and/or may be non-volatile memories such as 3D)(Point or Nano-Ram.

In one embodiment, to reduce data traffic over the high-speed link 4940, biasing techniques are used to ensure that the data stored in graphics memories 4933-4934, M is data which will be used most frequently by the graphics processing engines 4931-4932, N and preferably not used by the cores 4960A-4960D (at least not frequently). Similarly, the biasing mechanism attempts to keep data needed by the cores (and preferably not the graphics processing engines 4931-4932, N) within the caches 4962A-4962D, 4956 of the cores and system memory 4911.

Figure 48C:
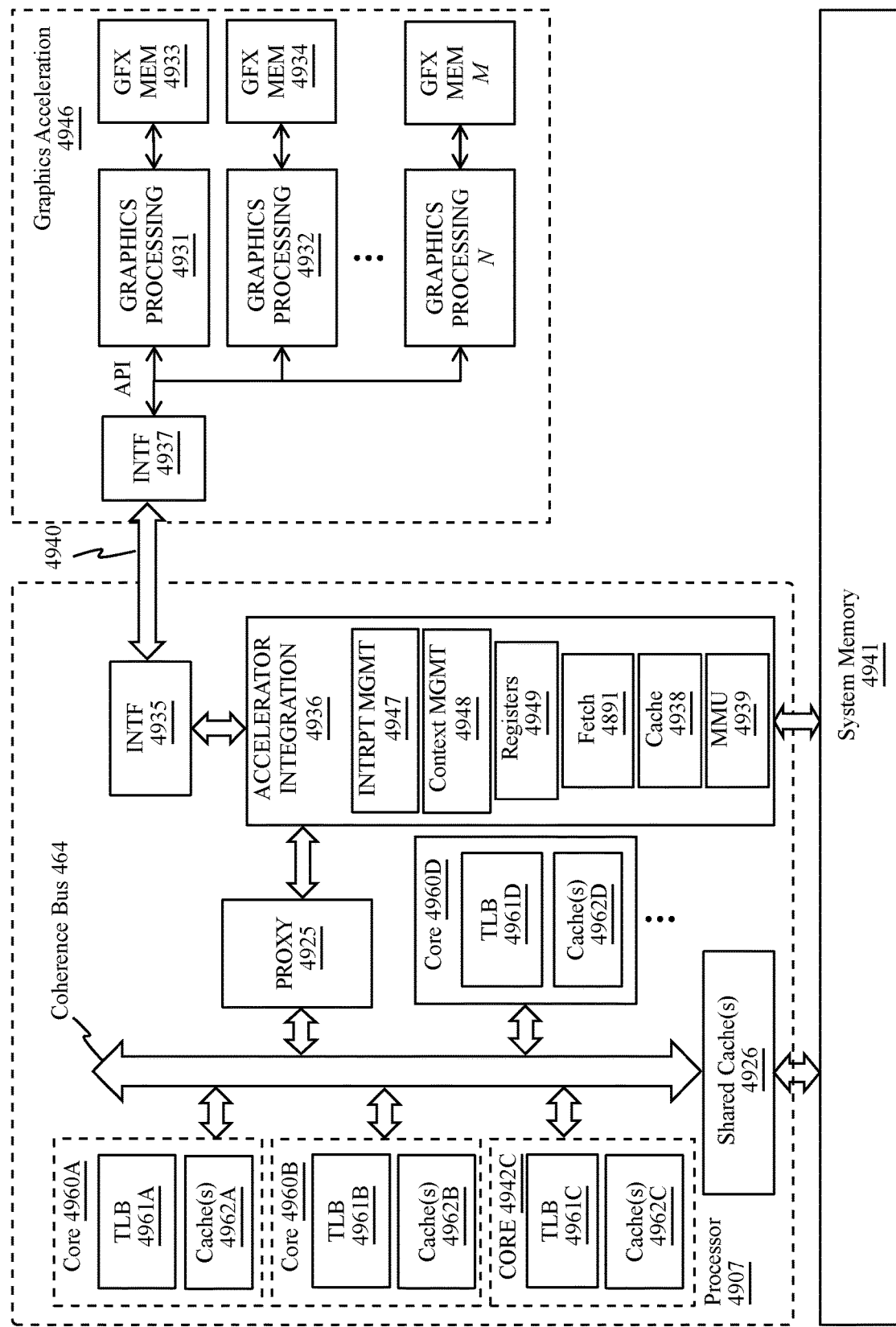

FIG. 48C illustrates another embodiment in which the accelerator integration circuit 4936 is integrated within the processor 4907. In this embodiment, the graphics processing engines 4931-4932, N communicate directly over the high-speed link 4940 to the accelerator integration circuit 4936 via interface 4937 and interface 4935 (which, again, may be utilize any form of bus or interface protocol). The accelerator integration circuit 4936 may perform the same operations as those described with respect to FIG. 48B, but potentially at a higher throughput given its close proximity to the coherency bus 4962 and caches 4962A-4962D, 4926.

One embodiment supports different programming models including a dedicated-process programming model (no graphics acceleration module virtualization) and shared programming models (with virtualization). The latter may include programming models which are controlled by the accelerator integration circuit 4936 and programming models which are controlled by the graphics acceleration module 4946.

In one embodiment of the dedicated process model, graphics processing engines 4931-4932, N are dedicated to a single application or process under a single operating system. The single application can funnel other application requests to the graphics engines 4931-4932, N, providing virtualization within a VM/partition.

In the dedicated-process programming models, the graphics processing engines 4931-4932, N, may be shared by multiple VM/application partitions. The shared models require a system hypervisor to virtualize the graphics processing engines 4931-4932, N to allow access by each operating system. For single-partition systems without a hypervisor, the graphics processing engines 4931-4932, N are owned by the operating system. In both cases, the operating system can virtualize the graphics processing engines 4931-4932, N to provide access to each process or application.

For the shared programming model, the graphics acceleration module 4946 or an individual graphics processing engine 4931-4932, N selects a process element using a process handle. In one embodiment, process elements are stored in system memory 4911 and are addressable using the effective address to real address translation techniques described herein. The process handle may be an implementation-specific value provided to the host process when registering its context with the graphics processing engine 4931-4932, N (that is, calling system software to add the process element to the process element linked list). The lower 16-bits of the process handle may be the offset of the process element within the process element linked list.

Figure 48D:
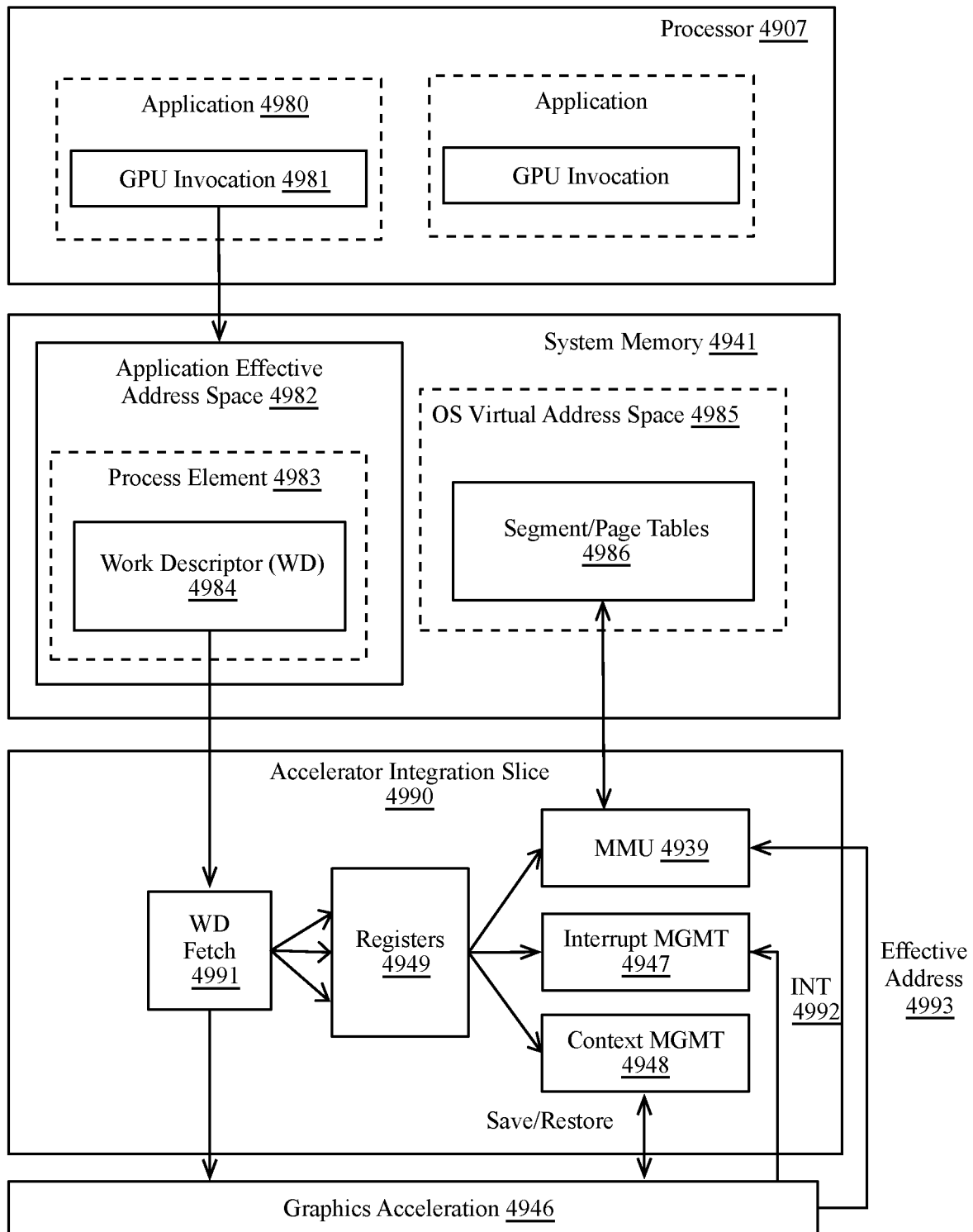

FIG. 48D illustrates an exemplary accelerator integration slice 4890. As used herein, a "slice" comprises a specified portion of the processing resources of the accelerator integration circuit 4936. Application effective address space 4942 within system memory 4911 stores process elements 4943. In one embodiment, the process elements 4943 are stored in response to GPU invocations 4981 from applications 4980 executed on the processor 4907. A process element 4943 contains the process state for the corresponding application 4980. A work descriptor (WD) 4984 contained in the process element 4943 can be a single job requested by an application or may contain a pointer to a queue of jobs. In the latter case, the WD 4984 is a pointer to the job request queue in the application's address space 4942.

The graphics acceleration module 4946 and/or the individual graphics processing engines 4931-4932, N can be shared by all or a subset of the processes in the system. Embodiments of the invention include an infrastructure for setting up the process state and sending a WD 4984 to a graphics acceleration module 4946 to start a job in a virtualized environment.

In one implementation, the dedicated-process programming model is implementation-specific. In this model, a single process owns the graphics acceleration module 4946 or an individual graphics processing engine 4931. Because the graphics acceleration module 4946 is owned by a single process, the hypervisor initializes the accelerator integration circuit 4936 for the owning partition and the operating system initializes the accelerator integration circuit 4936 for the owning process at the time when the graphics acceleration module 4946 is assigned.

In operation, a WD fetch unit 4891 in the accelerator integration slice 4890 fetches the next WD 44 which includes an indication of the work to be done by one of the graphics processing engines of the graphics acceleration module 4946. Data from the WD 44 may be stored in registers 4949 and used by the MMU 4939, interrupt management circuit 4947 and/or context management circuit 4948 as illustrated. For example, one embodiment of the MMU 4939 includes segment/page walk circuitry for accessing segment/page tables 4986 within the OS virtual address space 4985. The interrupt management circuit 4947 may process interrupt events 4892 received from the graphics acceleration module 4946. When performing graphics operations, an effective address 4893 generated by a graphics processing engine 4931-4932, N is translated to a real address by the MMU 4939.

In one embodiment, the same set of registers 4949 are duplicated for each graphics processing engine 4931-4932, N and/or graphics acceleration module 4946 and may be initialized by the hypervisor or operating system. Each of these duplicated registers may be included in an accelerator integration slice 4890. Exemplary registers that may be initialized by the hypervisor are shown in Table 4.

TABLE 4

Hypervisor Initialized Registers

| | |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by the operating system are shown in Table 5.

TABLE 5

Operating System Initialized Registers

| | |
|---|---|
| 1 | Process and Thread Identification |
| 2 | Effective Address (EA) Context Save/Restore Pointer |

TABLE 5-continued

Operating System Initialized Registers

| | |
|---|---|
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 4984 is specific to a particular graphics acceleration module 4946 and/or graphics processing engine 4931-4932, N. It contains all the information a graphics processing engine 4931-4932, N requires to do its work, or it can be a pointer to a memory location where the application has set up a command queue of work to be completed.

Figure 48E:
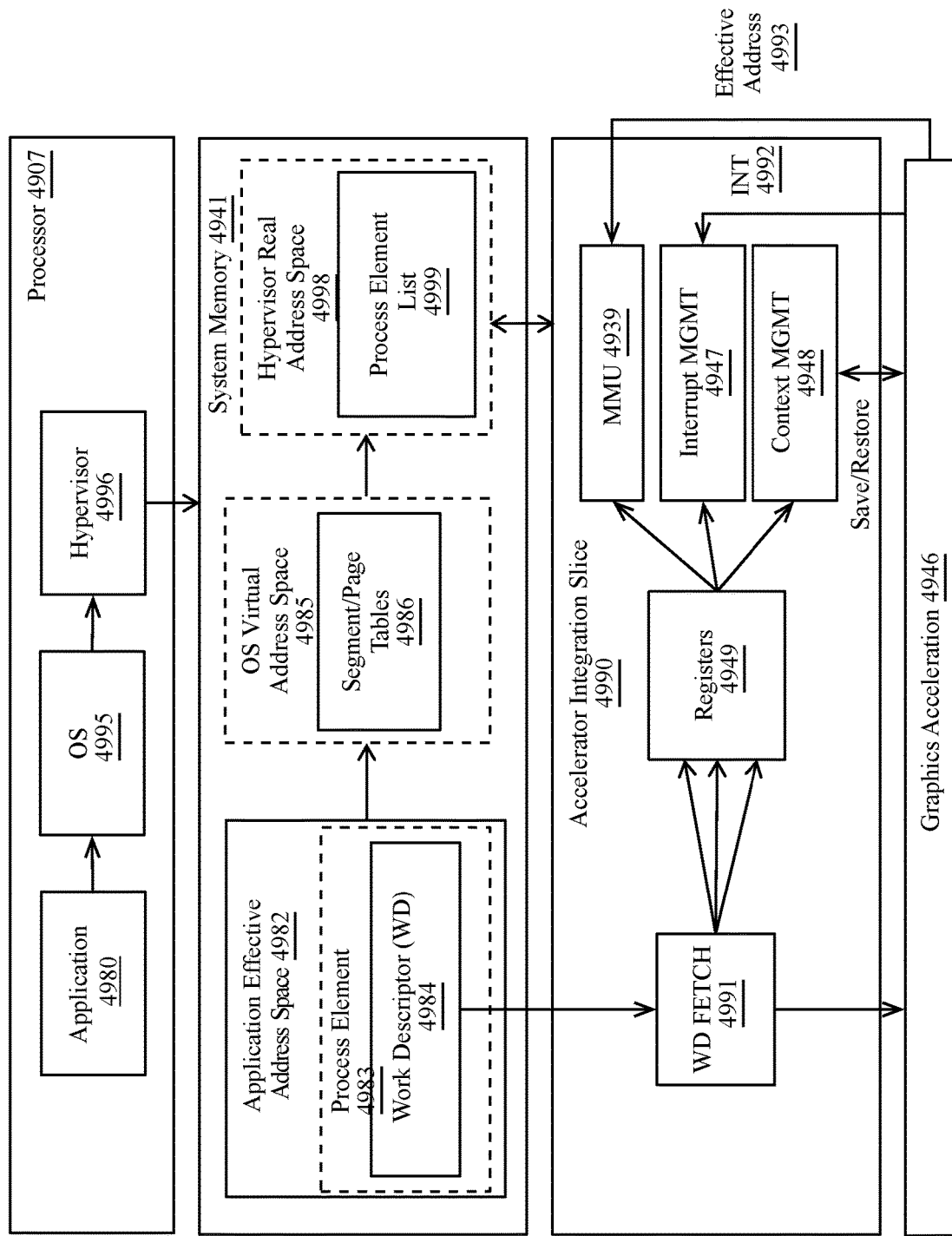

FIG. 48E illustrates additional details for one embodiment of a shared model. This embodiment includes a hypervisor real address space 4898 in which a process element list 4899 is stored. The hypervisor real address space 4898 is accessible via a hypervisor 4896 which virtualizes the graphics acceleration module engines for the operating system 4895.

The shared programming models allow for all or a subset of processes from all or a subset of partitions in the system to use a graphics acceleration module 4946. There are two programming models where the graphics acceleration module 4946 is shared by multiple processes and partitions: time-sliced shared and graphics directed shared.

In this model, the system hypervisor 4896 owns the graphics acceleration module 4946 and makes its function available to all operating systems 4895. For a graphics acceleration module 4946 to support virtualization by the system hypervisor 4896, the graphics acceleration module 4946 may adhere to the following requirements: 1) An application's job request must be autonomous (that is, the state does not need to be maintained between jobs), or the graphics acceleration module 4946 must provide a context save and restore mechanism. 2) An application's job request is guaranteed by the graphics acceleration module 4946 to complete in a specified amount of time, including any translation faults, or the graphics acceleration module 4946 provides the ability to preempt the processing of the job. 3) The graphics acceleration module 4946 must be guaranteed fairness between processes when operating in the directed shared programming model.

In one embodiment, for the shared model, the application 40 is required to make an operating system 4895 system call with a graphics acceleration module 4946 type, a work descriptor (WD), an authority mask register (AMR) value, and a context save/restore area pointer (CSRP). The graphics acceleration module 4946 type describes the targeted acceleration function for the system call. The graphics acceleration module 4946 type may be a system-specific value. The WD is formatted specifically for the graphics acceleration module 4946 and can be in the form of a graphics acceleration module 4946 command, an effective address pointer to a user-defined structure, an effective address pointer to a queue of commands, or any other data structure to describe the work to be done by the graphics acceleration module 4946. In one embodiment, the AMR value is the AMR state to use for the current process. The value passed to the operating system is similar to an application setting the AMR. If the accelerator integration circuit 4936 and graphics acceleration module 4946 implementations do not support a User Authority Mask Override Register (UAMOR), the operating system may apply the current UAMOR value to the AMR value before passing the AMR in the hypervisor call. The hypervisor 4896 may optionally apply the current Authority Mask Override Register (AMOR) value before placing the AMR into the process element 4943. In one embodiment, the CSRP is one of the registers 4949 containing the effective address of an area in the application's address space 4842 for the graphics acceleration module 4946 to save and restore the context state. This pointer is optional if no state is required to be saved between jobs or when a job is preempted. The context save/restore area may be pinned system memory.

Upon receiving the system call, the operating system 4895 may verify that the application 4980 has registered and been given the authority to use the graphics acceleration module 4946. The operating system 4895 then calls the hypervisor 4896 with the information shown in Table 6.

TABLE 6

OS to Hypervisor Call Parameters

| | |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | The virtual address of the storage segment table pointer (SSTP) |
| 7 | A logical interrupt service number (LISN) |

Upon receiving the hypervisor call, the hypervisor 4896 verifies that the operating system 4895 has registered and been given the authority to use the graphics acceleration module 4946. The hypervisor 4896 then puts the process element 4943 into the process element linked list for the corresponding graphics acceleration module 4946 type. The process element may include the information shown in Table 7.

TABLE 7

Process Element Information

| | |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | The virtual address of the storage segment table pointer (SSTP) |
| 7 | A logical interrupt service number (LISN) |
| 8 | Interrupt vector table, derived from the hypervisor call parameters. |
| 9 | A state register (SR) value |
| 10 | A logical partition ID (LPID) |
| 11 | A real address (RA) hypervisor accelerator utilization record pointer |
| 12 | The Storage Descriptor Register (SDR) |

In one embodiment, the hypervisor initializes a plurality of accelerator integration slice 4890 registers 4949.

Figure 48F:
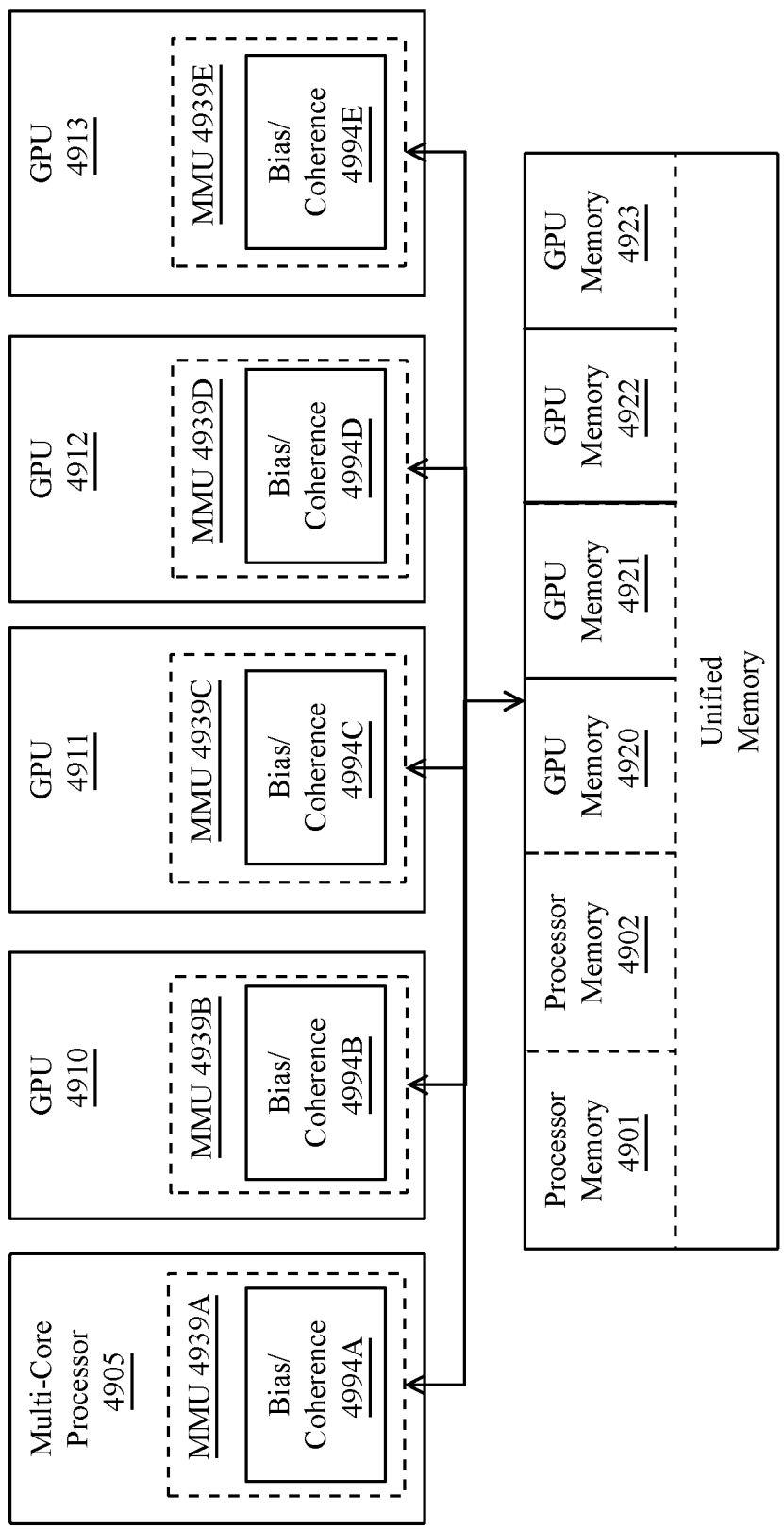

As illustrated in FIG. 48F, one embodiment of the invention employs a unified memory addressable via a common virtual memory address space used to access the physical processor memories 4901-4902 and GPU memories 4920-4923. In this implementation, operations executed on the GPUs 4910-4913 utilize the same virtual/effective memory address space to access the processors memories 4901-4902 and vice versa, thereby simplifying programmability. In one embodiment, a first portion of the virtual/effective address space is allocated to the processor memory 4901, a second portion to the second processor memory 4902, a third portion to the GPU memory 4920, and so on. The entire virtual/effective memory space (sometimes referred to as the effective address space) is thereby distributed across each of the processor memories 4901-4902 and GPU memories

4920-4923, allowing any processor or GPU to access any physical memory with a virtual address mapped to that memory.

In one embodiment, bias/coherence management circuitry 4894A-4894E within one or more of the MMUs 4939A-4939E ensures cache coherence between the caches of the host processors (e.g., 4905) and the GPUs 4910-4913 and implements biasing techniques indicating the physical memories in which certain types of data should be stored. While multiple instances of bias/coherence management circuitry 4894A-4894E are illustrated in FIG. 48F, the bias/coherence circuitry may be implemented within the MMU of one or more host processors 4905 and/or within the accelerator integration circuit 4936.

One embodiment allows GPU-attached memory 4920-4923 to be mapped as part of system memory, and accessed using shared virtual memory (SVM) technology, but without suffering the typical performance drawbacks associated with full system cache coherence. The ability to GPU-attached memory 4920-4923 to be accessed as system memory without onerous cache coherence overhead provides a beneficial operating environment for GPU offload. This arrangement allows the host processor 4905 software to setup operands and access computation results, without the overhead of tradition I/O DMA data copies. Such traditional copies involve driver calls, interrupts and memory mapped I/O (MMIO) accesses that are all inefficient relative to simple memory accesses. At the same time, the ability to access GPU attached memory 4920-4923 without cache coherence overheads can be critical to the execution time of an offloaded computation. In cases with substantial streaming write memory traffic, for example, cache coherence overhead can significantly reduce the effective write bandwidth seen by a GPU 4910-4913. The efficiency of operand setup, the efficiency of results access, and the efficiency of GPU computation all play a role in determining the effectiveness of GPU offload.

In one implementation, the selection of between GPU bias and host processor bias is driven by a bias tracker data structure. A bias table may be used, for example, which may be a page-granular structure (i.e., controlled at the granularity of a memory page) that includes 1 or 2 bits per GPU-attached memory page. The bias table may be implemented in a stolen memory range of one or more GPU-attached memories 4920-4923, with or without a bias cache in the GPU 4910-4913 (e.g., to cache frequently/recently used entries of the bias table). Alternatively, the entire bias table may be maintained within the GPU.

In one implementation, the bias table entry associated with each access to the GPU-attached memory 4920-4923 is accessed prior the actual access to the GPU memory, causing the following operations. First, local requests from the GPU 4910-4913 that find their page in GPU bias are forwarded directly to a corresponding GPU memory 4920-4923. Local requests from the GPU that find their page in host bias are forwarded to the processor 4905 (e.g., over a high-speed link as discussed above). In one embodiment, requests from the processor 4905 that find the requested page in host processor bias complete the request like a normal memory read. Alternatively, requests directed to a GPU-biased page may be forwarded to the GPU 4910-4913. The GPU may then transition the page to a host processor bias if it is not currently using the page.

The bias state of a page can be changed either by a software-based mechanism, a hardware-assisted software-based mechanism, or, for a limited set of cases, a purely hardware-based mechanism.

One mechanism for changing the bias state employs an API call (e.g. OpenCL), which, in turn, calls the GPU's device driver which, in turn, sends a message (or enqueues a command descriptor) to the GPU directing it to change the bias state and, for some transitions, perform a cache flushing operation in the host. The cache flushing operation is required for a transition from host processor 4905 bias to GPU bias, but is not required for the opposite transition.

In one embodiment, cache coherency is maintained by temporarily rendering GPU-biased pages uncacheable by the host processor 4905. To access these pages, the processor 4905 may request access from the GPU 4910 which may or may not grant access right away, depending on the implementation. Thus, to reduce communication between the processor 4905 and GPU 4910 it is beneficial to ensure that GPU-biased pages are those which are required by the GPU but not the host processor 4905 and vice versa.

Figure 48G:
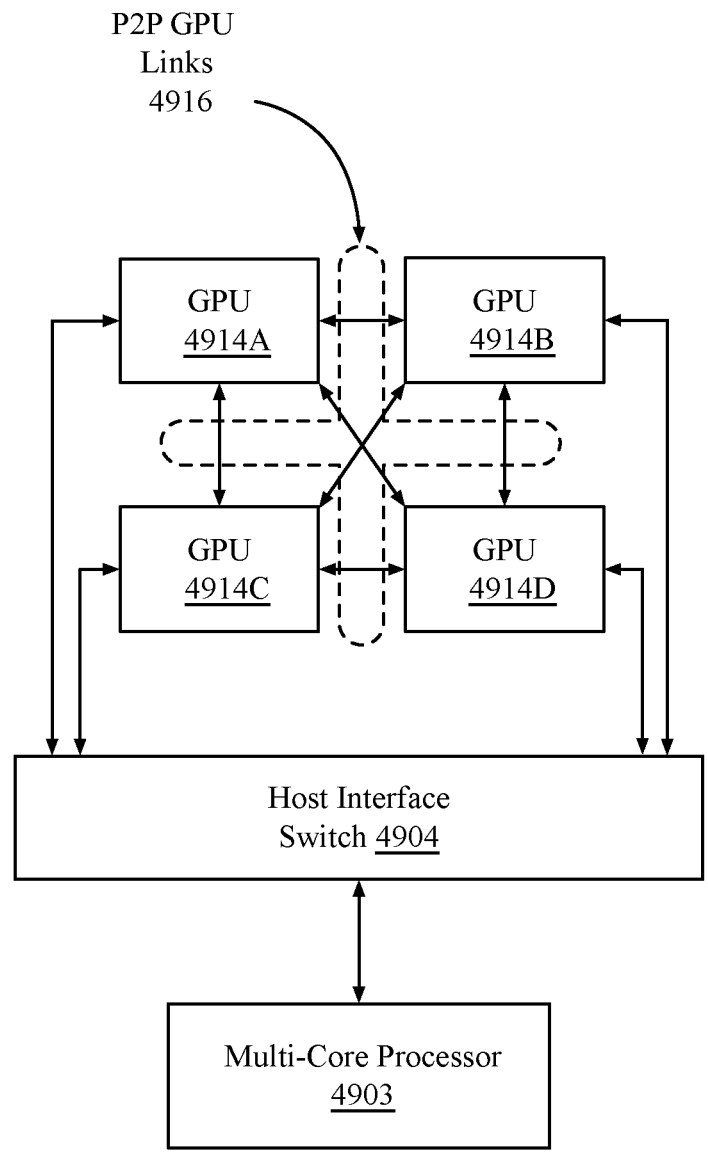

FIG. 48G illustrates a multi-GPU computing system, according to an embodiment. The multi-GPU computing system can include a processor 4903 coupled to multiple GPUs 4914A-4914D via a host interface switch 4904. The host interface switch 4904, in one embodiment, is a PCI express switch device that couples the processor 4903 to a PCI express bus over which the processor 4903 can communicate with the set of GPUs 4914A-4914D. The GPUs 4914A-4914D can interconnect via a set of high-speed point to point GPU to GPU links 4916. The high-speed GPU to GPU links can connect to each of the GPUs 4914A-4914D via a dedicated GPU link, such as the GPU link DPLAB10 as in FIG. DPLAB. The P2P GPU links 4916 enable direct communication between each of the GPUs 4914A-4914D without requiring communication over the host interface bus to which the processor 4903 is connected. With GPU-to-GPU traffic directed to the P2P GPU links, the host interface bus remains available for system memory access or to communicate with other instances of the multi-GPU computing system 4900, for example, via one or more network devices. While in the illustrated embodiment the GPUs 4914A-4914D connect to the processor 4903 via the host interface switch 4904, in one embodiment the processor 4903 includes direct support for the P2P GPU links 4916 and can connect directly to the GPUs 4914A-4914D.

Graphics Processing Pipeline

Figure 49:
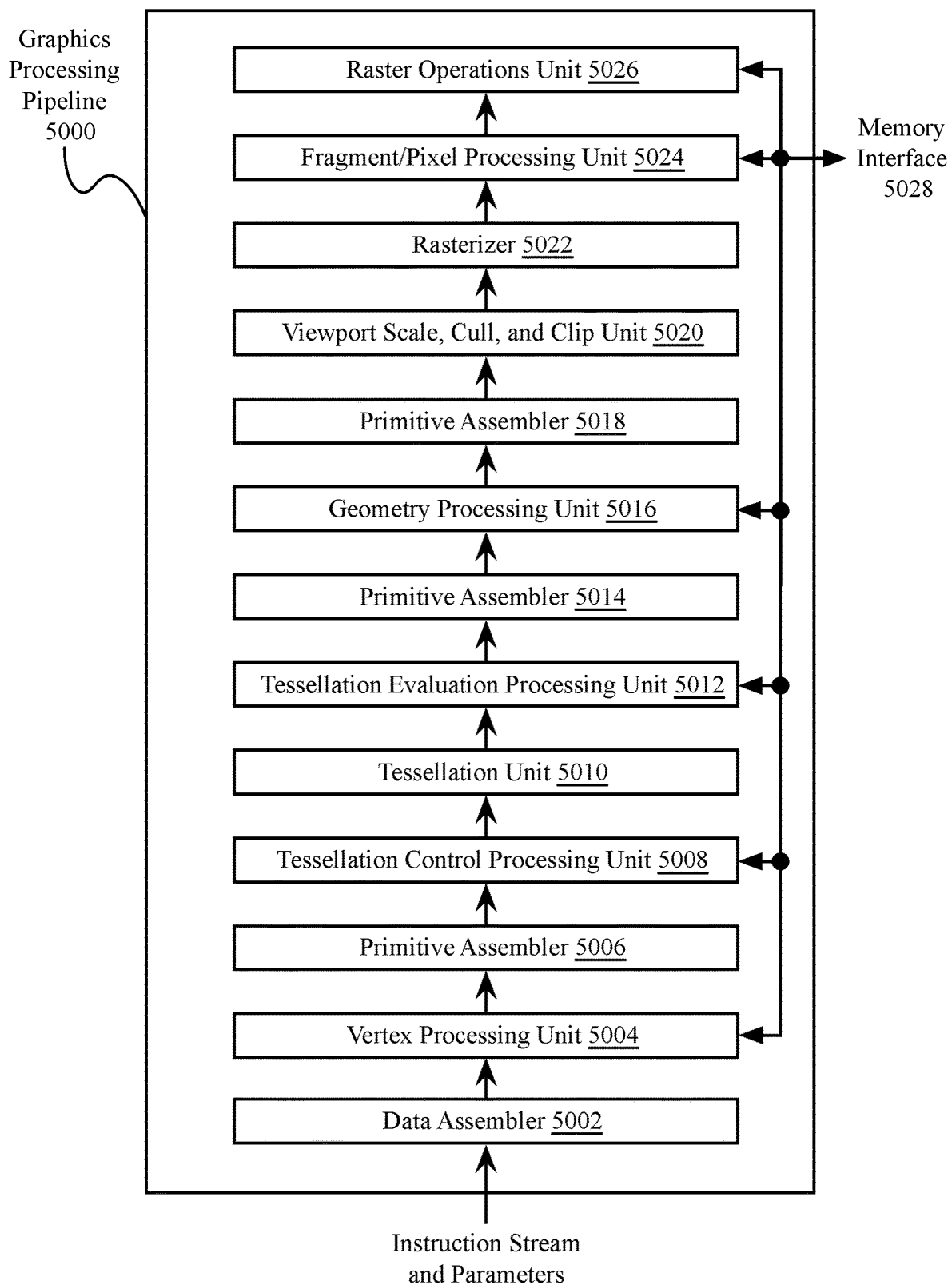
FIG. 49 illustrates a graphics processing pipeline, according to an embodiment.

FIG. 49 illustrates a graphics processing pipeline 5000, according to an embodiment. In one embodiment, a graphics processor can implement the illustrated graphics processing pipeline 5000. The graphics processor can be included within the parallel processing subsystems as described herein, such as the parallel processor 4600 of FIG. 46A, which, in one embodiment, is a variant of the parallel processor(s) 4512 of FIG. 45. The various parallel processing systems can implement the graphics processing pipeline 5000 via one or more instances of the parallel processing unit (e.g., parallel processing unit 4602 of FIG. 46A) as described herein. For example, a shader unit (e.g., graphics multiprocessor 4725 of FIG. 47A) may be configured to perform the functions of one or more of a vertex processing unit 5004, a tessellation control processing unit 5008, a tessellation evaluation processing unit 5012, a geometry processing unit 5016, and a fragment/pixel processing unit 5024. The functions of data assembler 5002, primitive assemblers 5006, 5014, 5018, tessellation unit 5010, rasterizer 5022, and raster operations unit 2650 may also be performed by other processing engines within a processing cluster (e.g., processing cluster 4614A-4614N of FIG. 47A) and a corresponding partition unit (e.g., partition unit 4620A-4620N of FIG. 46A). The graphics processing pipeline 5000 may also be implemented using dedicated processing units for one or more functions. In one embodiment, one or more portions of the graphics processing pipeline 5000 can be performed by parallel processing logic within a general-purpose processor (e.g., CPU). In one embodiment, one or more portions of the graphics processing pipeline 5000 can access on-chip memory (e.g., parallel processor memory 4622 as in FIG. 46A) via a memory interface 5028, which may be an instance of the memory interface 4618 of FIG. 46A.

In one embodiment, the data assembler 5002 is a processing unit that collects vertex data for surfaces and primitives. The data assembler 5002 then outputs the vertex data, including the vertex attributes, to the vertex processing unit 5004. The vertex processing unit 5004 is a programmable execution unit that executes vertex shader programs, lighting and transforming vertex data as specified by the vertex shader programs. The vertex processing unit 5004 reads data that is stored in cache, local or system memory for use in processing the vertex data and may be programmed to transform the vertex data from an object-based coordinate representation to a world space coordinate space or a normalized device coordinate space.

A first instance of a primitive assembler 5006 receives vertex attributes from the vertex processing unit 5004. The primitive assembler 5006 readings stored vertex attributes as needed and constructs graphics primitives for processing by tessellation control processing unit 5008. The graphics primitives include triangles, line segments, points, patches, and so forth, as supported by various graphics processing application programming interfaces (APIs).

The tessellation control processing unit 5008 treats the input vertices as control points for a geometric patch. The control points are transformed from an input representation from the patch (e.g., the patch's bases) to a representation that is suitable for use in surface evaluation by the tessellation evaluation processing unit 5012. The tessellation control processing unit 5008 can also compute tessellation factors for edges of geometric patches. A tessellation factor applies to a single edge and quantifies a view-dependent level of detail associated with the edge. A tessellation unit 5010 is configured to receive the tessellation factors for edges of a patch and to tessellate the patch into multiple geometric primitives such as line, triangle, or quadrilateral primitives, which are transmitted to a tessellation evaluation processing unit 5012. The tessellation evaluation processing unit 5012 operates on parameterized coordinates of the subdivided patch to generate a surface representation and vertex attributes for each vertex associated with the geometric primitives.

A second instance of a primitive assembler 5014 receives vertex attributes from the tessellation evaluation processing unit 5012, reading stored vertex attributes as needed, and constructs graphics primitives for processing by the geometry processing unit 5016. The geometry processing unit 5016 is a programmable execution unit that executes geometry shader programs to transform graphics primitives received from primitive assembler 5014 as specified by the geometry shader programs. In one embodiment the geometry processing unit 5016 is programmed to subdivide the graphics primitives into one or more new graphics primitives and calculate parameters used to rasterize the new graphics primitives.

In some embodiments the geometry processing unit 5016 can add or delete elements in the geometry stream. The geometry processing unit 5016 outputs the parameters and vertices specifying new graphics primitives to primitive assembler 5018. The primitive assembler 5018 receives the parameters and vertices from the geometry processing unit 5016 and constructs graphics primitives for processing by a viewport scale, cull, and clip unit 5020. The geometry processing unit 5016 reads data that is stored in parallel processor memory or system memory for use in processing the geometry data. The viewport scale, cull, and clip unit 5020 performs clipping, culling, and viewport scaling and outputs processed graphics primitives to a rasterizer 5022.

The rasterizer 5022 can perform depth culling and other depth-based optimizations. The rasterizer 5022 also performs scan conversion on the new graphics primitives to generate fragments and output those fragments and associated coverage data to the fragment/pixel processing unit 5024. The fragment/pixel processing unit 5024 is a programmable execution unit that is configured to execute fragment shader programs or pixel shader programs. The fragment/pixel processing unit 5024 transforming fragments or pixels received from rasterizer 5022, as specified by the fragment or pixel shader programs. For example, the fragment/pixel processing unit 5024 may be programmed to perform operations included but not limited to texture mapping, shading, blending, texture correction and perspective correction to produce shaded fragments or pixels that are output to a raster operations unit 5026. The fragment/pixel processing unit 5024 can read data that is stored in either the parallel processor memory or the system memory for use when processing the fragment data. Fragment or pixel shader programs may be configured to shade at sample, pixel, tile, or other granularities depending on the sampling rate configured for the processing units.

The raster operations unit 5026 is a processing unit that performs raster operations including, but not limited to stencil, z test, blending, and the like, and outputs pixel data as processed graphics data to be stored in graphics memory (e.g., parallel processor memory 4622 as in FIG. 46A, and/or system memory 4504 as in FIG. 45, to be displayed on the one or more display device(s) 4510 or for further processing by one of the one or more processor(s) 4502 or parallel processor(s) 4512. In some embodiments the raster operations unit 5026 is configured to compress z or color data that is written to memory and decompress z or color data that is read from memory.

The foregoing description and drawings are to be regarded in an illustrative rather than a restrictive sense. Persons skilled in the art will understand that various modifications and changes may be made to the embodiments described herein without departing from the broader spirit and scope of the invention as set forth in the appended claims.

Some embodiments pertain to Example 1 that includes an apparatus to facilitate processing a sparse matrix for an arbitrary neural network, comprises a graphics processing unit, including a data management unit (DMU) having a scheduler to schedule matrix operations, an active circuitry to track active input operands, and a skip circuitry to track unimportant input operands to be skipped by the scheduler. Processing circuitry is coupled to the DMU. The processing circuitry comprises a plurality of processing elements including circuitry to read operands and a multiplication unit to multiply two or more operands for the arbitrary neural network.

Example 2 includes the subject matter of Example 1, wherein the scheduler to schedule non-zero operands at the multiplication unit.

Example 3 includes the subject matter of Examples 1 and 2, further comprising memory having pointer circuitry to store base pointers for input and output vectors; and memory to store input and output vectors.

Example 4 includes the subject matter of Examples 1-3, wherein each processing element includes the circuitry to read operands, pointer circuitry to provide a column pointer to a memory address of a weighted coefficient of a matrix, data circuitry to generate and send a weighted coefficient value that is identified by the column pointer to the multiplication unit.

Example 5 includes the subject matter of Examples 1-4, wherein the data circuitry sends an identifier of a memory address or a position of the output vector to the output buffer.

Example 6 includes the subject matter of Examples 1-5, further comprising, wherein the graphics processing unit to support arbitrary connections across any layers of the arbitrary irregular neural network.

Some embodiments pertain to Example 7 that includes a hardware accelerator to facilitate processing a sparse matrix for an arbitrary neural network, comprising a data management unit (DMU) having a scheduler to schedule matrix operations and an auxiliary buffer to store active input operands; and a plurality of processing elements coupled to the DMU, each processing element includes an input buffer for edge data and message data, and customizable circuitry to support an input vertex program for the arbitrary neural network.

Example 8 includes the subject matter of Example 7, wherein the customizable circuitry to support an input vertex program supports multiply, accumulate, activate, and send message functions.

Example 9 includes the subject matter of Examples 7-8, wherein each processing element further comprises on-chip memory to receive vector data from off-chip memory via the DMU.

Example 10 includes the subject matter of Examples 7-9, wherein the DMU to obtain updated vector data from the on-chip memory based on the customized functions and then to send the updated vector data to the off-chip memory.

Example 11 includes the subject matter of Examples 7-10, wherein the hardware accelerator to support arbitrary connections across any layers of the arbitrary irregular neural network.

Some embodiments pertain to Example 12 that includes a graphics processing unit, comprising a sparsity management unit to manage sparsity operations, a block floating point (FP) management unit 3120 to support block FP operations, and a variable and mix precision compute unit to support variable and mix precision operations.

Example 13 includes the subject matter of Example 12, wherein the sparsity management unit comprises a value check mechanism to detect unimportant values including zero operands and skip these unimportant values of input vectors; and a scheduler to determine scheduling of computations based on scheduling important values and skipping unimportant values of input vectors that are detected by the value check mechanism.

Example 14 includes the subject matter of Examples 12-13, wherein the block FP management unit includes select circuitry to select a shared exponent for input vectors if the input vectors have block FP and thus different exponents.

Example 15 includes the subject matter of Examples 12-14, wherein the block FP management unit includes align circuitry to cause alignment of a mantissa for the input vector that has a change in exponent.

Example 16 includes the subject matter of Examples 12-15, wherein the variable and mix precision compute unit include computations units and accumulators to perform computations for input vectors, wherein the computations include at least one of spatial and temporal computations including any spatial and temporal combinations.

Some embodiments pertain to Example 17 that includes a method for training of data, comprising obtaining a first sparse matrix encoded with compressed sparse row (CSR) and a second dense matrix, offloading the second dense matrix in a coalesced manner from memory to a shared local memory (SLM), and launching at least one workgroup (e.g., a minimum number of workgroups) comprising of approximately a total number of hardware threads supported by a graphics processing unit (GPU).

Example 18 includes the subject matter of Example 17, further comprising determining a minimum number of workgroups to launch to minimize global memory loads to the SLM and selecting a work group size.

Example 19 includes the subject matter of Examples 17-18, further comprising applying a load balancing technique for hardware threads such that each hardware thread completes a first block of data and processes a second block of data that is available.

Example 20 includes the subject matter of Examples 17-19, further comprising generating outputs for a Sparse Dense GEMV GPU implementation for training of data.

In addition to the above example, one embodiment provides a graphics processor comprising a data management unit (DMU) having a scheduler to schedule matrix operations; and a plurality of processing elements coupled to the DMU. The DMU is configured to determine a number of workgroups to launch, select a work group size for each of the number of workgroups, and launch the number of workgroups for execution via the plurality of processing elements, wherein the number of workgroups is determined based on a total number of hardware threads supported by the plurality of processing elements and a number of data elements associated with a hardware thread. Each workgroup to configure a processing element of the plurality of processing elements to obtain a first matrix and a second matrix, wherein the first matrix is a sparse matrix that is encoded in a compressed tensor representation and the second matrix a dense matrix and offload the second matrix in a coalesced manner from memory to a shared local memory (SLM), wherein the number of work groups to launch is determined to reduce a number of redundant memory loads from a global memory to the SLM associated with the offload of the second matrix.

A further embodiment provides a hardware accelerator, comprising a data management unit (DMU) including a scheduler to schedule matrix operations and a buffer to store active input operands and a plurality of processing elements coupled to the DMU. Each processing element includes an input buffer for edge data and message data and customizable circuitry to support a vertex program for an arbitrary neural network. The customizable circuitry is dynamically synthesized based on input including the vertex program for the arbitrary neural network.

The foregoing description and drawings are to be regarded in an illustrative rather than a restrictive sense. Persons skilled in the art will understand that various modifications and changes may be made to the embodiments described herein without departing from the broader spirit and scope of the invention as set forth in the appended claims.

What is claimed is:

1. A hardware accelerator, comprising:
a data management unit (DMU) including a scheduler to schedule matrix operations and a buffer to store active input operands; and
a plurality of processing elements coupled to the DMU, each processing element includes an input buffer for edge data and message data, and customizable circuitry to support a vertex program for an arbitrary neural network, wherein the customizable circuitry is dynamically synthesized based on input including the vertex program for the arbitrary neural network.

2. The hardware accelerator of claim 1, wherein the vertex program to specify types of data associated with edges and vertices in a graph that defines the arbitrary neural network and messages to be sent across vertices in the graph.

3. The hardware accelerator of claim 2, the plurality of processing elements configured to execute the vertex program via the customizable circuitry.

4. The hardware accelerator of claim 3, the customizable circuitry configured to support customized functions to be used to execute the vertex program.

5. The hardware accelerator of claim 4, the customized functions including a multiply, accumulate, activate, and send message function.

6. The hardware accelerator of claim 1, the hardware accelerator including a plurality of tiles, each tile including an instance of the DMU and the plurality of processing elements.

7. The hardware accelerator of claim 6, each tile of the plurality of tiles including memory coupled with the plurality of processing elements of the tile.

8. The hardware accelerator of claim 7, including circuitry configured to load vertex data to be processed by the vertex program into the memory of a tile of the plurality of tiles.

9. The hardware accelerator of claim 8, wherein a processing element of a tile of the plurality of tiles is configured to:
stream edge data from the memory into the input buffer for the edge data; and
perform a function provided by the customizable circuitry on the edge data.

10. The hardware accelerator of claim 9, the DMU configured to write output from the processing element to a memory external to the tile.

11. A graphics processor comprising:
a host interface; and
a data management unit (DMU) coupled with the host interface, the DMU including a scheduler to schedule matrix operations and a buffer to store active input operands; and
a plurality of processing elements coupled to the DMU, each processing element includes an input buffer for edge data and message data, and customizable circuitry to:
support a vertex program for an arbitrary neural network, and
wherein the customizable circuitry is dynamically synthesized based on input including the vertex program for the arbitrary neural network.

12. The graphics processor of claim 11, wherein the vertex program to specify types of data associated with edges and vertices in a graph that defines the arbitrary neural network and messages to be sent across vertices in the graph.

13. The graphics processor of claim 12, the plurality of processing elements configured to execute the vertex program via the customizable circuitry.

14. The graphics processor of claim 13, the customizable circuitry configured to support customized functions to be used to execute the vertex program.

15. The graphics processor of claim 14, the customized functions including a multiply, accumulate, activate, and send message function.

16. The graphics processor of claim 11, including a plurality of tiles, each tile including an instance of the DMU and the plurality of processing elements.

17. The graphics processor of claim 16, each tile of the plurality of tiles including memory coupled with the plurality of processing elements of the tile.

18. The graphics processor of claim 17, including circuitry configured to load vertex data to be processed by the vertex program into the memory of a tile of the plurality of tiles.

19. The graphics processor of claim 18, wherein a processing element of a tile of the plurality of tiles is configured to:
stream edge data from the memory into the input buffer for the edge data; and
perform a function provided by the customizable circuitry on the edge data.

20. The graphics processor of claim 19, the DMU configured to write output from the processing element to a memory external to the tile.

* * * * *